(12) United States Patent
Kitada et al.

(10) Patent No.: US 11,384,249 B2
(45) Date of Patent: Jul. 12, 2022

(54) AQUEOUS INK JET COMPOSITION

(71) Applicant: SEIKO EPSON CORPORATION, Tokyo (JP)

(72) Inventors: Kenji Kitada, Shiojiri (JP); Hiroko Hayashi, Shiojiri (JP); Yasunari Ikeda, Shiojiri (JP); Hirofumi Hokari, Chino (JP); Hisashi Okamura, Shiojiri (JP); Kenta Kikuchi, Suwa (JP); Seiji Kagami, Chino (JP); Shinichi Naito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 133 days.

(21) Appl. No.: 16/365,889

(22) Filed: Mar. 27, 2019

(65) Prior Publication Data
US 2019/0300736 A1    Oct. 3, 2019

(30) Foreign Application Priority Data

| Mar. 28, 2018 | (JP) | JP2018-062961 |
| Mar. 28, 2018 | (JP) | JP2018-062962 |
| Mar. 28, 2018 | (JP) | JP2018-062963 |
| Mar. 28, 2018 | (JP) | JP2018-062964 |
| Mar. 28, 2018 | (JP) | JP2018-062965 |
| Mar. 28, 2018 | (JP) | JP2018-062966 |
| Nov. 27, 2018 | (JP) | JP2018-221458 |

(51) Int. Cl.
| *C09D 11/328* | (2014.01) |
| *C09D 11/033* | (2014.01) |
| *C09D 11/037* | (2014.01) |
| *C09D 11/08* | (2006.01) |
| *C09D 11/103* | (2014.01) |
| *C09D 11/107* | (2014.01) |
| *C09D 11/38* | (2014.01) |
| *D06P 5/30* | (2006.01) |
| *C09D 11/106* | (2014.01) |
| *C09D 11/102* | (2014.01) |
| *C09D 11/326* | (2014.01) |
| *C08K 5/3415* | (2006.01) |
| *C08K 5/42* | (2006.01) |

(52) U.S. Cl.
CPC .......... *C09D 11/328* (2013.01); *C08K 5/3415* (2013.01); *C08K 5/42* (2013.01); *C09D 11/033* (2013.01); *C09D 11/037* (2013.01); *C09D 11/08* (2013.01); *C09D 11/102* (2013.01); *C09D 11/103* (2013.01); *C09D 11/106* (2013.01); *C09D 11/107* (2013.01); *C09D 11/326* (2013.01); *C09D 11/38* (2013.01); *D06P 5/30* (2013.01); *C08L 2201/54* (2013.01)

(58) Field of Classification Search
CPC ..... C09D 11/328; C09D 11/38; C09D 11/107; C08L 2201/54; C08K 5/3415; C08K 5/42
USPC ................................................. 523/160, 161
See application file for complete search history.

(56) References Cited

U.S. PATENT DOCUMENTS

| 5,418,277 | A   | * | 5/1995  | Ma ............... C08G 73/0233 347/100 |
| 6,423,785 | B1  | * | 7/2002  | Esselborn ......... C09B 67/009 525/327.6 |
| 2003/0018120 | A1 | * | 1/2003 | Lee ................. C09D 11/30 524/543 |
| 2003/0125415 | A1 | * | 7/2003 | Nakano ............. C09D 11/40 523/160 |
| 2004/0232262 | A1 |   | 11/2004 | Itoh et al. |
| 2006/0014856 | A1 | * | 1/2006 | McGorrin ......... C09D 11/326 523/160 |
| 2008/0070009 | A1 |   | 3/2008  | Akatani et al. |
| 2015/0116418 | A1 | * | 4/2015  | Oura ................ D06P 5/004 347/20 |
| 2015/0337153 | A1 |   | 11/2015 | Oguchi et al. |
| 2016/0075879 | A1 | * | 3/2016  | Ikeda ............. C09B 67/0033 8/641 |
| 2016/0208435 | A1 |   | 7/2016  | Oguchi et al. |
| 2019/0031898 | A1 |   | 1/2019  | Tange et al. |

(Continued)

FOREIGN PATENT DOCUMENTS

| CN | 101709177 B | 6/2012 |
| CN | 102229761 B | 7/2013 |
| EP | 2975092 A1 | 1/2016 |

(Continued)

OTHER PUBLICATIONS

English Abstract translation of JP 62-253667 (Year: 1987).*
Aug. 29, 2019 European Search Report issued in European Patent Application No. 19165700.6.

*Primary Examiner* — Doris L Lee
(74) *Attorney, Agent, or Firm* — Oliff PLC

(57) ABSTRACT

An aqueous ink jet composition contains at least one disperse dye selected from the group consisting of C.I. Disperse Yellow 54, C.I. Disperse Red 60, and C.I. Disperse Blue 359, and a styrene maleic acid-based dispersing agent represented by Formula (1).

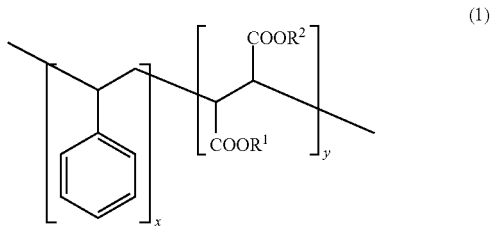

8 Claims, No Drawings

(56) References Cited

U.S. PATENT DOCUMENTS

2019/0359736 A1* 11/2019 Aihara .................... B29C 41/14

FOREIGN PATENT DOCUMENTS

| JP | 62-253667 | * | 11/1987 |
|----|-----------|---|---------|
| JP | H04-126781 A | | 4/1992 |
| JP | 2003-082269 A | | 3/2003 |
| WO | 2005/121263 A1 | | 12/2005 |
| WO | 2017/038747 A1 | | 3/2017 |

* cited by examiner

AQUEOUS INK JET COMPOSITION

BACKGROUND

1. Technical Field

The present invention relates to an aqueous ink jet composition.

2. Related Art

In recent years, ink jet printing has been expanding in use thereof, and is applied not only to printing machines for office or home use but also to commercial printing, textile printing, or the like.

An ink jet ink containing a disperse dye is also used.

As a printing method for such an ink jet ink, there are a direct printing method in which an ink is given to (printed on) a recording medium (usually composed of fibers) to be dyed and then a dye is fixed by heat treatment such as steaming, and a thermal transfer printing method in which a dye ink is given to (printed on) an intermediate transfer medium (dedicated transfer paper) and then a dye is sublimated and transferred from a side on the intermediate transfer medium to a recording medium to be dyed.

An ink jet ink containing a disperse dye generally has problems that ink storage stability is low and discharge stability in an ink jet method is also poor, due to a problem in long-term dispersion stability of the disperse dye.

For the purpose of solving such problems, an ink composition described in International Publication NO. WO 2005/121263 has been proposed.

However, with such an ink composition, in a case where a specific disperse dye is contained, storage stability of the ink composition cannot be made sufficiently excellent, so that there is a problem that clogging occurs in a head filter or a nozzle during discharge by an ink jet method after long-term storage. The present inventor has found that such a problem becomes remarkable, in particular, in a case of using, as a disperse dye, C.I. Disperse Yellow 54 which is a yellow disperse dye that exhibits an excellent color developing property, C.I. Disperse Blue 359 which is a blue disperse dye that exhibits an excellent color developing property, or C.I. Disperse Red 60 which is a red disperse dye that exhibits an excellent color developing property.

SUMMARY

The invention can be realized in the following application examples.

[1] An aqueous ink jet composition, containing: at least one disperse dye selected from the group consisting of C.I. Disperse Yellow 54, C.I. Disperse Red 60, and C.I. Disperse Blue 359; and a styrene maleic acid-based dispersing agent represented by Formula (1).

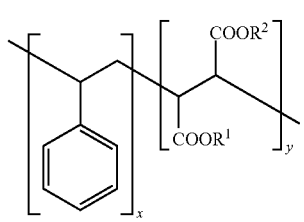

(1)

(In Formula (1), one of $R^1$ and $R^2$ is $-(CH_2CH_2O)_nR^3$ (where $R^3$ is H, $CH_3$, or $C_2H_5$, and n is an integer of equal to or greater than 1), $-CH_2CH(CH_3)_2$, or $-(CH_2)_3CH_3$, the other is $-H$, $-(CH_2CH_2O)_nR^3$ (where $R^3$ is H, $CH_3$, or $C_2H_5$, and n is an integer of equal to or greater than 1), $-CH_2CH(CH_3)_2$, $-(CH_2)_3CH_3$, or a counterion constituting a salt, and x and y have a relationship such that when x is 1, y is equal to or greater than 0.2 and equal to or less than 1.0.)

[2] The aqueous ink jet composition according to [1], in which when a content of the disperse dye is set as XD [% by mass] and a content of the styrene maleic acid-based dispersing agent is set as XM [% by mass], a relationship of $0.04 \leq XM/XD \leq 25$ is satisfied.

[3] The aqueous ink jet composition according to [1] or [2], in which a content of the disperse dye is equal to or greater than 0.1% by mass and equal to or less than 30% by mass.

[4] The aqueous ink jet composition according to any one of [1] to [3], in which a content of the styrene maleic acid-based dispersing agent is equal to or greater than 0.1% by mass and equal to or less than 30% by mass.

[5] The aqueous ink jet composition according to any one of [1] to [4], in which the styrene maleic acid-based dispersing agent has a weight average molecular weight of equal to or greater than 7,000 and equal to or less than 20,000.

[6] The aqueous ink jet composition according to any one of [1] to [5], further containing: an acetylene-based surfactant, in which a content of the acetylene-based surfactant is equal to or greater than 5.0 parts by mass and equal to or less than 75 parts by mass with respect to 100 parts by mass of the disperse dye.

[7] An aqueous ink jet composition, containing: at least one disperse dye selected from the group consisting of C.I. Disperse Yellow 54, C.I. Disperse Red 60, and C.I. Disperse Blue 359; a substance A which is at least one type of compound selected from the group consisting of a compound represented by Formula (2-1), a compound represented by Formula (2-2), an ethylene oxide adduct of tristyrylphenol, and a derivative of the ethylene oxide adduct of tristyrylphenol; and an anionic dispersing agent.

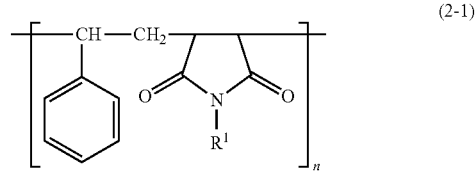

(2-1)

(In Formula (2-1), $R^1$ is a hydrocarbon group having 6 or less carbon atoms, or $-(CH_2)_m-NR^8R^9$ (where m is an integer of equal to or less than 6, and $R^8$ and $R^9$ are each independently a hydrogen atom or a hydrocarbon group having 6 or less carbon atoms), and n is an integer of equal to or greater than 1)

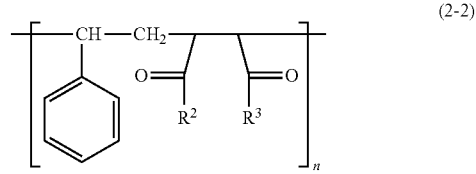

(2-2)

(In Formula (2-2), one of $R^2$ and $R^3$ is —OH, the other is —$NR^4R^5$ (where $R^4$ and $R^5$ are each independently a hydrogen atom or a hydrocarbon group having 6 or less carbon atoms), and n is an integer of equal to or greater than 1.)

[8] The aqueous ink jet composition according to [7], in which the anionic dispersing agent is at least one of a compound represented by Formula (2-3), a sodium salt of a naphthalene sulfonic acid formalin condensate, and lignin sulfonic acid.

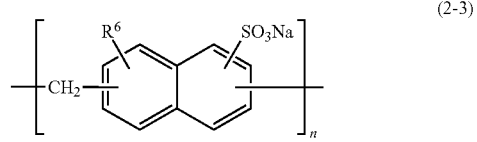

(2-3)

(In Formula (2-3), $R^6$ is a hydrocarbon group having 4 or less carbon atoms, and n is an integer of equal to or greater than 1.)

[9] The aqueous ink jet composition according to [7] or [8], in which when a content of the disperse dye is set as XD [% by mass] and a content of the substance A is set as XA [% by mass], a relationship of $0.002 \leq XA/XD \leq 1.5$ is satisfied.

[10] The aqueous ink jet composition according to any one of [7] to [9], in which when a content of the disperse dye is set as XD [% by mass] and a content of the anionic dispersing agent is set as XB [% by mass], a relationship of $0.3 \leq XB/XD \leq 2.0$ is satisfied.

[11] The aqueous ink jet composition according to any one of [7] to [10], in which when a content of the substance A is set as XA [% by mass] and a content of the anionic dispersing agent is set as XB [% by mass], a relationship of $0.002 \leq XA/XB \leq 1.5$ is satisfied.

[12] The aqueous ink jet composition according to any one of [7] to [11], in which a content of the disperse dye is equal to or greater than 0.1% by mass and equal to or less than 30% by mass.

[13] The aqueous ink jet composition according to any one of [7] to [12], in which a content of the substance A is equal to or greater than 0.05% by mass and equal to or less than 8.0% by mass.

[14] The aqueous ink jet composition according to any one of [7] to [13], in which a content of the anionic dispersing agent is equal to or greater than 0.1% by mass and equal to or less than 30% by mass.

[15] The aqueous ink jet composition according to any one of [7] to [14], in which the anionic dispersing agent has a weight average molecular weight of equal to or greater than 1,000 and equal to or less than 20,000.

DESCRIPTION OF EXEMPLARY EMBODIMENTS

Hereinafter, a first suitable embodiment of the invention will be described in detail.

Aqueous Ink Jet Composition

Among various disperse dyes, C.I. Disperse Yellow 54 has features such as an excellent color developing property while having the following problems. That is, in a case where C.I. Disperse Yellow 54 is used as a constituent component of an aqueous ink jet composition in the related art, the C.I. Disperse Yellow 54 does not make it possible for the aqueous ink jet composition to have a sufficiently excellent storage stability, which remarkably causes a problem that clogging occurs in a head filter or a nozzle during discharge by an ink jet method after long-term storage.

Regarding such a problem, as a result of intensive studies, the present inventor found that the problem is due to weak flocculation of components containing C.I. Disperse Yellow 54.

Therefore, the present inventor has conducted further intensive studies, which are aimed at suppressing generation of weakly-flocculated bodies due to weak flocculation while taking advantage of excellent characteristics of C.I. Disperse Yellow 54. As a result, the present inventor has reached the invention.

That is, an aqueous ink jet composition of the invention contains C.I. Disperse Yellow 54 and a styrene maleic acid-based dispersing agent represented by Formula (1).

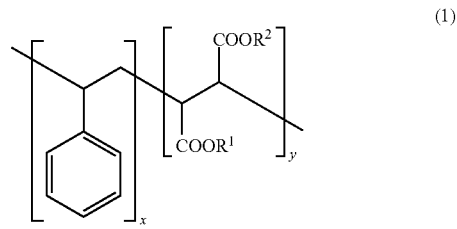

(1)

(In Formula (1), one of $R^1$ and $R^2$ is —$(CH_2CH_2O)_nR^3$ (where $R^3$ is H, $CH_3$, or $C_2H_5$, and n is an integer of equal to or greater than 1), —$CH_2CH(CH_3)_2$, or —$(CH_2)_3CH_3$, and the other is —H, —$(CH_2CH_2O)_nR^3$ (where $R^3$ is H, $CH_3$, or $C_2H_5$, and n is an integer of equal to or greater than 1), —$CH_2CH(CH_3)_2$, —$(CH_2)_3CH_3$, or a counterion constituting a salt, and x and y have a relationship such that when x is 1, y is equal to or greater than 0.2 and equal to or less than 1.0.)

With such a constitution, it is possible to provide an aqueous ink jet composition which has effects obtained by containing C.I. Disperse Yellow 54 that is a disperse dye having features such as an excellent color developing property in a low-temperature process due to a relatively small molecular weight, while hardly causing remarkable generation of weakly-flocculated bodies and clogging in a head filter or a nozzle during discharge by an ink jet method, which are due to long-term storage.

On the contrary, in a case where the styrene maleic acid-based dispersing agent is not used, or in a case where another dispersing agent (for example, a dispersing agent other than a styrene maleic acid-based dispersing agent, a dispersing agent which is a styrene maleic acid-based dispersing agent but is other than the styrene maleic acid-based dispersing agent represented by the above formula, or the like) is used in place of the styrene maleic acid-based dispersing agent, the above-mentioned excellent effects cannot be obtained.

For example, in a case of Formula (1) in which there is a relationship such that when x is 1, y is less than 0.2, a maleic acid skeleton is small relative to a styrene skeleton, so that dispersion stability of C.I. Disperse Yellow 54 in an aqueous ink jet composition cannot be ensured and weakly-flocculated bodies are easily generated during long-term storage of the aqueous ink jet composition, or the like.

In addition, in a case of Formula (1) in which there is a relationship such that when x is 1, y is greater than 1.0, the styrene skeleton is small relative to the maleic acid skeleton, so that adsorptivity of the dispersing agent onto C.I. Disperse Yellow 54 is poor, and desorption of the dispersing agent easily occurs. Thus, weakly-flocculated bodies are easily generated during long-term storage of the aqueous ink jet composition, or the like.

In the present specification, "weak flocculation" refers to a softly flocculated state in which particles are not present as flocculated particles having a predetermined particle diameter unlike ordinary strong flocculation (hard flocculation) and which does not have a definite particle diameter and easily causes deformation like "fluffy mass".

An extent of progression of such weak flocculation can be determined, for example, by measurement with FPIA (a wet-type flow-type particle diameter and particle shape analyzer). That is, before and after a lapse of a predetermined time, for an aqueous ink jet composition, measurement is performed with FPIA to obtain the number of particles having a particle diameter of equal to or greater than 0.5 µm and equal to or less than 40.0 µm. It can be said that formation of weakly-flocculated bodies progresses more as a variation rate of the number of particles in such a particle diameter range before and after the lapse of a predetermined time is larger. As the FPIA, for example, FPIA-2100, FPIA-3000, and FPIA-3000S which are flow-type particle image analyzers manufactured by Sysmex Corporation, and the like can be used.

In addition, in the present specification, the aqueous ink jet composition is a concept including not only an ink itself to be discharged by an ink jet method but also a stock solution used for preparing the ink. In other words, the aqueous ink jet composition of the invention may be subjected to discharge by an ink jet method as it is, or may be subjected to discharge by an ink jet method after treatments such as dilution.

Styrene Maleic Acid-Based Dispersing Agent

The aqueous ink jet composition of the invention contains a styrene maleic acid-based dispersing agent represented by Formula (1).

By using the styrene maleic acid-based dispersing agent in combination with C.I. Disperse Yellow 54, dispersion stability of C.I. Disperse Yellow 54 in the aqueous ink jet composition and storage stability of the aqueous ink jet composition can be made excellent, and remarkable generation of weakly-flocculated bodies and occurrence of clogging in a head filter or a nozzle during discharge by an ink jet method, which are due to long-term storage, can be effectively prevented. As a result, it is possible to stably perform discharge of the aqueous ink jet composition for a long period of time, and it is possible to keep quality of a recorded matter obtained by an ink jet method in a stable and excellent manner. In addition, the styrene maleic acid-based dispersing agent is a component which hardly causes an adverse effect on quality of a recorded matter and an adverse effect in sublimation printing.

As described above, the styrene maleic acid-based dispersing agent may have a counterion constituting a salt, and the counterion is preferably a monovalent ion.

As the monovalent ion, for example, ammonium, amines, an alkali metal, and the like are mentioned.

It is sufficient that n is an integer of equal to or greater than 1. n is preferably an integer of equal to or greater than 1 and equal to or less than 10, and more preferably an integer of equal to or greater than 1 and equal to or less than 5.

Accordingly, storage stability of the aqueous ink jet composition is further improved, and generation of weakly-flocculated bodies during long-term storage or the like is more effectively prevented.

As described above, it is sufficient that one of $R^1$ and $R^2$ is $-(CH_2CH_2O)_nR^3$ (where $R^3$ is H, $CH_3$, or $C_2H_5$, and n is an integer of equal to or greater than 1), $-CH_2CH(CH_3)_2$, or $-(CH_2)_3CH_3$, and the other is $-H$, $-(CH_2CH_2O)_nR^3$ (where $R^3$ is H, $CH_3$, or $C_2H_5$, and n is an integer of equal to or greater than 1), $-CH_2CH(CH_3)_2$, $-(CH_2)_3CH_3$, or a counterion constituting a salt. It is preferable that one be $-CH_2CH(CH_3)_2$ and the other be $-H$.

Accordingly, dispersion stability of C.I. Disperse Yellow 54 in the aqueous ink jet composition and storage stability of the aqueous ink jet composition can be made further excellent, and remarkable generation of weakly-flocculated bodies and occurrence of clogging in a head filter or a nozzle during discharge by an ink jet method, which are due to long-term storage, can be more effectively prevented. As a result, it is possible to more stably perform discharge of the aqueous ink jet composition for a long period of time, and it is possible to keep quality of a recorded matter obtained by an ink jet method in a more stable and excellent manner.

In addition, as described above, it is sufficient that a proportion between x and y satisfies a relationship such that when x is 1, y is equal to or greater than 0.2 and equal to or less than 1.0. It is preferable that when x is 1, a value of y be equal to or greater than 0.3 and equal to or less than 0.9, and it is more preferable that when x is 1, a value of y be equal to or greater than 0.4 and equal to or less than 0.8.

Accordingly, as for dispersion stability of C.I. Disperse Yellow 54, a ratio of hydrophilic groups to hydrophobic groups is made more suitable, and long-term stability of the aqueous ink jet composition is made further excellent.

A weight average molecular weight Mw of the styrene maleic acid-based dispersing agent is not particularly limited. The weight average molecular weight Mw is preferably equal to or greater than 7,000 and equal to or less than 20,000, more preferably equal to or greater than 8,000 and equal to or less than 18,000, and even more preferably equal to or greater than 10,000 and equal to or less than 15,000.

Accordingly, storage stability of the aqueous ink jet composition is further improved, and generation of weakly-flocculated bodies during long-term storage or the like is more effectively prevented.

The aqueous ink jet composition may contain two or more types of compounds represented by General Formula (1).

A content of the styrene maleic acid-based dispersing agent represented by Formula (1) in the aqueous ink jet composition is preferably equal to or greater than 0.1% by mass and equal to or less than 25% by mass, more preferably equal to or greater than 0.5% by mass and equal to or less than 20% by mass, and even more preferably equal to or greater than 1.0% by mass and equal to or less than 15% by mass.

Accordingly, storage stability of the aqueous ink jet composition is further improved, and generation of weakly-flocculated bodies during long-term storage or the like is more effectively prevented.

In particular, in a case where the aqueous ink jet composition is an ink itself to be discharged by an ink jet method, a content of the styrene maleic acid-based dispersing agent represented by Formula (1) in the ink is preferably equal to or greater than 0.1% by mass and equal to or less than 10% by mass, more preferably equal to or greater than 1.0% by mass and equal to or less than 9.0% by mass, and even more preferably equal to or greater than 2.0% by mass and equal to or less than 8.0% by mass.

In addition, in a case where the aqueous ink jet composition is a stock solution used for preparing an ink to be discharged by an ink jet method, a content of the styrene maleic acid-based dispersing agent represented by Formula (1) in the stock solution is preferably equal to or greater than 1.0% by mass and equal to or less than 30% by mass, more preferably equal to or greater than 5.0% by mass and equal to or less than 25% by mass, and even more preferably equal to or greater than 10% by mass and equal to or less than 20% by mass.

In a case where the aqueous ink jet composition contains two or more types of compounds represented by General Formula (1), for the content, a sum of contents of these plural types of compounds is adopted.

C.I. Disperse Yellow 54

The aqueous ink jet composition contains C.I. Disperse Yellow 54 as a disperse dye.

A content of C.I. Disperse Yellow 54 in the aqueous ink jet composition is preferably equal to or greater than 0.1% by mass and equal to or less than 25% by mass, more preferably equal to or greater than 1.0% by mass and equal to or less than 20% by mass, and even more preferably equal to or greater than 2.0% by mass and equal to or less than 15% by mass.

Accordingly, it is possible to obtain a higher color density in a recorded portion formed by using the aqueous ink jet composition, while further improving storage stability of the aqueous ink jet composition and more effectively preventing generation of weakly-flocculated bodies during long-term storage or the like.

In addition, in the aqueous ink jet composition, in a case where a content of C.I. Disperse Yellow 54 is set as XD [% by mass] and a content of the styrene maleic acid-based dispersing agent is set as XM [% by mass], it is preferable that a relationship of $0.04 \leq XM/XD \leq 25$ be satisfied, it is more preferable that a relationship of $0.1 \leq XM/XD \leq 5.0$ be satisfied, and it is even more preferable that a relationship of $0.35 \leq XM/XD \leq 1.3$ be satisfied.

Accordingly, storage stability of the aqueous ink jet composition is further improved, and generation of weakly-flocculated bodies during long-term storage or the like is more effectively prevented.

An average particle diameter of C.I. Disperse Yellow 54 in the aqueous ink jet composition is preferably equal to or greater than 50 nm and equal to or less than 250 nm, more preferably equal to or greater than 75 nm and equal to or less than 200 nm, and even more preferably equal to or greater than 100 nm and equal to or less than 150 nm.

Accordingly, storage stability of the aqueous ink jet composition is further improved. In addition, a recorded portion formed by using the aqueous ink jet composition can be more effectively sublimated, and application to sublimation printing can be more suitably achieved.

In the present specification, the average particle diameter refers to an average particle diameter on a volume basis unless otherwise specified. The average particle diameter can be obtained, for example, by measurement using Microtrac UPA (manufactured by Nikkiso CO., LTD.).

As commercially available products of C.I. Disperse Yellow 54, for example, Resolin Yellow 4GL (manufactured by Lanxess), Foron Yellow SE3GL (manufactured by Clariant), Kayaset Yellow A-G (manufactured by Nippon Kayaku Co., Ltd.), and the like are mentioned.

Water

The aqueous ink jet composition contains water.

A content of water in the aqueous ink jet composition is not particularly limited. The content of water is preferably equal to or greater than 30% by mass and equal to or less than 85% by mass, more preferably equal to or greater than 35% by mass and equal to or less than 80% by mass, and even more preferably equal to or greater than 40% by mass and equal to or less than 75% by mass.

Accordingly, a viscosity of the aqueous ink jet composition can be more reliably adjusted to a suitable value, and discharge stability according to an ink jet method can be further improved.

Solvent Other than Water

The aqueous ink jet composition may contain a solvent other than water.

Accordingly, a viscosity of the aqueous ink jet composition can be suitably adjusted, and a moisture retaining property of the aqueous ink jet composition can be increased. As a result, liquid droplet discharge by an ink jet method can be performed in a more stable manner.

As the solvent other than water which is contained in the aqueous ink jet composition, for example, glycerin, propylene glycol, 2-pyrrolidone, and the like are mentioned.

By containing these solvents, a slow evaporation rate is achieved due to an excellent moisture retaining capability, which makes it possible to perform liquid droplet discharge in a more stable manner.

A content of the solvent other than water which is contained in the aqueous ink jet composition is preferably equal to or greater than 0% by mass and equal to or less than 45% by mass, more preferably equal to or greater than 10% by mass and equal to or less than 43% by mass, and even more preferably equal to or greater than 15% by mass and equal to or less than 40% by mass.

Accordingly, effects obtained by containing the solvent other than water as described above are exerted in a more remarkable manner.

Surfactant

The aqueous ink jet composition may contain a surfactant.

Accordingly, it is possible to achieve more suitable wettability of the aqueous ink jet composition with respect to a recording medium (base material), which is advantageous for obtaining better image quality.

As the surfactant contained in the aqueous ink jet composition, for example, various surfactants such as an anionic surfactant, a cationic surfactant, and a nonionic surfactant can be used.

More specifically, as the surfactant contained in the aqueous ink jet composition, for example, an acetylene-based surfactant, a silicone-based surfactant, a fluorine-based surfactant, and the like are mentioned.

In a case where the aqueous ink jet composition contains the acetylene-based surfactant, dynamic surface tension of the aqueous ink jet composition can be suitably decreased, and quick orientation can be made with respect to meniscus. As a result, discharge stability according to an ink jet method can be made further excellent.

In a case where the aqueous ink jet composition contains the acetylene-based surfactant, a content of the acetylene-based surfactant in the aqueous ink jet composition is preferably equal to or greater than 5.0 parts by mass and equal to or less than 75 parts by mass, more preferably equal to or greater than 6.0 parts by mass and equal to or less than 60 parts by mass, and even more preferably equal to or greater than 7.0 parts by mass and equal to or less than 40 parts by mass, with respect to 100 parts by mass of C.I. Disperse Yellow 54.

Accordingly, effects obtained by containing the acetylene-based surfactant as described above are exerted in a more remarkable manner.

As commercially available acetylene-based surfactants, for example, Olfine E1004, Olfine E1010, Olfine E1020, Olfine PD-001, Olfine PD-002W, Olfine PD-004, Olfine PD-005, Olfine EXP4001, Olfine EXP4200, Olfine EXP4123, Olfine EXP4300, Olfine WE-001, Olfine WE-003

(all of which are manufactured by Nissin Chemical Industry Co., Ltd.), and the like are mentioned.

Other Components

The aqueous ink jet composition may contain a component (another component) other than the components as described above.

As the other component, for example, a coloring agent other than C.I. Disperse Yellow 54, a dispersing agent other than the styrene maleic acid-based dispersing agent as described above, a penetrating agent such as triethylene glycol monomethyl ether, triethylene glycol monobutyl ether, diethylene glycol monomethyl ether, 1,2-hexanediol, 1,2-pentanediol, 1,2-butanediol, and 3-methyl-1,5-pentanediol, a pH adjusting agent, a chelating agent such as ethylenediamine tetraacetate (EDTA), an antiseptic or antifungal agent, an antirust agent, and the like are mentioned. As the antiseptic or antifungal agent, for example, a compound having an isothiazoline ring structure in a molecule can be suitably used.

A content (in a case where plural types of components are contained as the other component, the content is a sum of contents thereof) of the other component is preferably equal to or less than 6% by mass, and more preferably equal to or less than 4% by mass.

In particular, in a case where the aqueous ink jet composition of the invention contains a dispersing agent (another dispersing agent) other than the styrene maleic acid-based dispersing agent as described above, a content of the dispersing agent (the other dispersing agent) is preferably equal to or less than 5% by mass, and more preferably equal to or less than 3% by mass.

Surface tension of the aqueous ink jet composition at 20° C. is preferably equal to or greater than 20 mN/m and equal to or less than 50 mN/m, more preferably equal to or greater than 21 mN/m and equal to or less than 40 mN/m, and even more preferably equal to or greater than 23 mN/m and equal to or less than 30 mN/m.

Accordingly, clogging in a nozzle of a discharge apparatus, which is caused by an ink jet method, becomes harder to occur, and discharge stability of the aqueous ink jet composition is further improved. In addition, even in a case where clogging in the nozzle occurs, recoverability achieved by making the nozzle capped (nozzle capping) can be made further excellent.

As the surface tension, a value measured by the Wilhelmy method can be adopted. For measurement of the surface tension, a surface tension meter (for example, CBVP-7, manufactured by Kyowa Interface Science Co., Ltd., and the like) can be used.

A viscosity of the aqueous ink jet composition at 20° C. is preferably equal to or greater than 2 mPa·s and equal to or less than 30 mPa·s, more preferably equal to or greater than 3 mPa·s and equal to or less than 20 mPa·s, and even more preferably equal to or greater than 4 mPa·s and equal to or less than 10 mPa·s.

Accordingly, discharge stability of the aqueous ink jet composition is further improved.

For the viscosity, measurement can be performed at 20° C. using a viscoelasticity tester (for example, MCR-300, manufactured by Physica) by raising Shear Rate from $10\ s^{-1}$ to $1,000\ s^{-1}$ and reading a viscosity at the time of Shear Rate 200.

The aqueous ink jet composition of the invention is usually applied to a recording apparatus by an ink jet method in a state of being held in a container such as a cartridge, a bag, and a tank. In other words, the recording apparatus according to the invention includes a container (an ink cartridge or the like) for holding the aqueous ink jet composition of the invention.

Recording Method

The aqueous ink jet composition of the invention can be applied, for example, to a direct printing method, a thermal transfer printing method (for example, sublimation printing), and the like, and can be suitably applied to the thermal transfer printing method from the viewpoint that C.I. Disperse Yellow 54 has sublimability.

As a recording method using the aqueous ink jet composition of the invention, an example of the thermal transfer printing method (sublimation printing) will be described below.

A recording method according to the present embodiment has an ink adhering step of adhering an aqueous ink jet composition to an intermediate transfer medium by an ink jet method and a transfer step of heating the intermediate transfer medium to which the aqueous ink jet composition has been adhered, to transfer, to a recording medium, C.I. Disperse Yellow 54 as a sublimable dye which is contained in the aqueous ink jet composition.

Ink Adhering Step

In the ink adhering step, the aqueous ink jet composition is adhered to the intermediate transfer medium by an ink jet method. Discharge of the aqueous ink jet composition by an ink jet method can be carried out using a known ink jet recording apparatus. As a discharge method, a piezo method, a method of discharging an ink by foams (bubbles) generated by heating the ink, or the like can be used. Among these, the piezo method is preferable from the viewpoints of difficulty in deterioration of the aqueous ink jet composition, and the like.

In the ink adhering step, an ink other than the aqueous ink jet composition according to the invention may be used in combination.

Intermediate Transfer Medium

As the intermediate transfer medium, for example, paper such as plain paper, a recording medium (referred to as ink jet special paper, coated paper, or the like) provided with an ink receiving layer, or the like can be used. Among these, paper provided with an ink receiving layer formed of inorganic fine particles such as silica is preferable. Accordingly, it is possible to obtain an intermediate transfer medium, in which bleeding or the like is suppressed, by a process of drying the aqueous ink jet composition which has been adhered to the intermediate transfer medium. In addition, in a subsequent transfer step, sublimation of C.I. Disperse Yellow 54 tends to progress more smoothly.

Transfer Step

Thereafter, the intermediate transfer medium to which the aqueous ink jet composition has been adhered is heated to transfer, to a recording medium, C.I. Disperse Yellow 54 as a constituent component of the aqueous ink jet composition. Accordingly, a recorded matter is obtained.

A heating temperature in the present step is preferably equal to or higher than 160° C. and equal to or lower than 220° C., and more preferably equal to or higher than 170° C. and equal to or lower than 200° C.

Accordingly, energy required for transfer can be further decreased, and productivity of the recorded matter can be further improved. In addition, a color developing property of the obtained recorded matter can be further improved.

A heating time in the present step varies depending on a heating temperature. The heating time is preferably equal to or longer than 30 seconds and equal to or shorter than 90 seconds, and more preferably equal to or longer than 45 seconds and equal to or shorter than 80 seconds.

Accordingly, energy required for transfer can be further decreased, and productivity of the recorded matter can be further improved. In addition, a color developing property of the obtained recorded matter can be further improved.

In addition, the present step may be carried out by heating a surface of the intermediate transfer medium, to which the aqueous ink jet composition has been adhered, in a state of being spaced apart at a certain distance from the recording medium and facing the same, or in a state of being in close contact with a surface of the recording medium. Preferably, the present step is carried out by heating the surface of the intermediate transfer medium, to which the aqueous ink jet composition has been adhered, in a state of being in close contact with the surface of the recording medium.

Accordingly, energy required for transfer can be further decreased, and productivity of the recorded matter can be further improved. In addition, a color developing property of the obtained recorded matter can be further improved.

Recording Medium

For the recording medium, there is no particular limitation thereto, and, for example, cloth (hydrophobic fiber cloth or the like), a resin (plastic) film, paper, glass, a metal, ceramics, and the like are mentioned. In addition, as the recording medium, an article having a three-dimensional shape such as a sheet shape, a spherical shape, and a rectangular parallelepiped shape may be used.

In a case where the recording medium is cloth, as fibers constituting the cloth, for example, polyester fibers, nylon fibers, triacetate fibers, diacetate fibers, polyamide fibers, a blended product obtained by using two or more types of these fibers, and the like are mentioned. In addition, blended products of these with recycled fibers such as rayon or natural fibers such as cotton, silk, and wool may be used.

In addition, in a case where the recording medium is a resin (plastic) film, as the resin (plastic) film, for example, a polyester film, a polyurethane film, a polycarbonate film, a polyphenylene sulfide film, a polyimide film, a polyamideimide film, and the like are mentioned.

The resin (plastic) film may be a stacked body in which a plurality of layers are stacked, or may be composed of a gradient material in which a material composition changes in a gradient manner.

Suitable embodiments of the invention have been described as above. However, the invention is not limited thereto.

For example, it is sufficient that the aqueous ink jet composition of the invention is used for discharge by an ink jet method. The aqueous ink jet composition of the invention may not be applied to the recording method as described above.

For example, the aqueous ink jet composition of the invention may be applied to a method having other further steps (pre-treatment step, intermediate treatment step, and post-treatment step) in addition to the above-described steps.

In this case, as the pre-treatment step, for example, a step of applying a coat layer to the recording medium, and the like are mentioned.

In addition, as the intermediate treatment step, for example, a step of preliminarily heating the recording medium, and the like are mentioned.

In addition, as the post-treatment step, for example, a step of washing the recording medium, and the like are mentioned.

Ink Adhering Step

In addition, the aqueous ink jet composition of the invention can also be suitably applied to sublimation transfer that does not use an intermediate transfer medium. As the sublimation transfer that does not use an intermediate transfer medium, for example, a method having a step of adhering the aqueous ink jet composition to an ink receiving layer of a recording medium (a film product or the like) by an ink jet method, in which the ink receiving layer is peelable and provided on the recording medium, a step of directly heating the recording medium provided with the ink receiving layer, to which the aqueous ink jet composition has been adhered, to perform sublimation and diffusion dyeing from the ink receiving layer to the recording medium at a lower layer side of the ink receiving layer, and a step of peeling the ink receiving layer from the recording medium, to obtain a recorded matter, and the like are mentioned.

EXAMPLES

Next, specific examples of the invention will be described.

[1] Preparation of Stock Solution (Aqueous Ink Jet Composition) for Producing Ink Jet Ink Example A1

First, C.I. Disperse Yellow 54 as a disperse dye, a styrene maleic acid-based dispersing agent represented by Formula (1) (which is a compound of Formula (1) having a relationship such that one of $R^1$ and $R^2$ is —H, and the other is —$CH_2CH(CH_3)_2$, and when x is 1, y is 1, and having a weight average molecular weight Mw of 13,000), and pure water were mixed in a proportion shown in Table 2, and the mixture was stirred with High Shear Mixer (manufactured by Silverson Machines, Inc.) at 3,000 rpm to produce a slurry. Thereafter, the produced slurry and glass beads having a diameter of 0.5 mm were stirred and dispersed in a bead mill (LMZ015, Ashizawa Finetech Ltd.) under water cooling, so that a stock solution for producing an ink jet ink as an aqueous ink jet composition was produced.

An average particle diameter of C.I. Disperse Yellow 54 in the stock solution for producing an ink jet ink was 150 nm.

Examples A2 to A21

Stock solutions for producing ink jet inks as aqueous ink jet compositions were produced in the same manner as in Example A1, except that chemical structures of the styrene maleic acid-based dispersing agents and blending proportions of the respective components were as shown in Tables 1 and 2.

Comparative Examples A1 to A9

Stock solutions for producing ink jet inks as aqueous ink jet compositions were produced in the same manner as in Example A1, except that types of the disperse dyes, types of the dispersing agents, and blending proportions of the respective components were as shown in Tables 1 and 2.

Relationship between abbreviations and conditions for dispersing agents used for preparing the aqueous ink jet compositions (stock solutions for producing ink jet inks) of the respective Examples and Comparative Examples is shown in Table 1, and compositions of the aqueous ink jet compositions (stock solutions for producing ink jet inks) of the respective Examples and Comparative Examples are shown in Table 2. In the tables, C.I. Disperse Yellow 54 is indicated as "DY54", C.I. Disperse Yellow 33 is indicated as "DY33", C.I. Disperse Yellow 42 is indicated as "DY42", J-67 (manufactured by BASF SE) as a dispersing agent other than the styrene maleic acid-based dispersing agent is indicated as "H6", and X310 (manufactured by SEIKO PMC CORPORATION) as a dispersing agent other than the styrene maleic acid-based dispersing agent is indicated as "H7". In addition, each of the stock solutions for producing ink jet inks of Examples A1 to A21 had a viscosity which is a value within a range of equal to or greater than 2.0 mPa·s and equal to or less than 30 mPa·s, and surface tension which is a value within a range of equal to or greater than 25 mN/m and equal to or less than 50 mN/m. For the viscosity, measurement was performed at 20° C. using a viscoelasticity tester MCR-300 (manufactured by Physica) by raising Shear Rate from 10 s$^{-1}$ to 1,000 s$^{-1}$ and reading a viscosity at the time of Shear Rate 200. In addition, for the surface tension, measurement was performed by the Wilhelmy method at 20° C. using a surface tension meter (CBVP-7, manufactured by Kyowa Interface Science Co., Ltd.).

TABLE 1

| Abbreviation for dispersing agent | Combination of $R^1$ and $R^2$ | Value of y when x = 1 | MW |
|---|---|---|---|
| SM1 | —H, —CH$_2$CH(CH$_3$)$_2$ | 1 | 13,000 |
| SM2 | —H, —(CH$_2$CH$_2$O)$_3$CH$_2$CH$_3$ | 1 | 13,000 |
| SM3 | —H, —(CH$_2$CH$_2$O)H | 1 | 13,000 |
| SM4 | —H, —(CH$_2$CH$_2$O)$_3$H | 1 | 13,000 |
| SM5 | —H, —(CH$_2$CH$_2$O)$_5$H | 1 | 13,000 |
| SM6 | —H, —(CH$_2$CH$_2$O)$_3$CH$_3$ | 1 | 13,000 |
| SM7 | —H, —(CH$_2$)$_3$CH$_3$ | 1 | 13,000 |
| SM8 | —H, (CH$_2$CH$_2$O)$_2$CH$_2$CH$_3$ | 1 | 13,000 |
| SM9 | —H, CH$_2$CH(CH$_3$)$_2$ | 1 | 6,000 |
| SM10 | —H, CH$_2$CH(CH$_3$)$_2$ | 1 | 21,000 |
| SM11 | —H, CH$_2$CH(CH$_3$)$_2$ | 0.2 | 13,000 |
| H1 | —H, —H | 1 | 13,000 |
| H2 | —Na, —Na | 1 | 13,000 |
| H3 | —C$_2$H$_5$, —C$_2$H$_5$ | 1 | 13,000 |
| H4 | —H, CH$_2$CH(CH$_3$)$_2$ | 0.1 | 13,000 |
| H5 | —H, CH$_2$CH(CH$_3$)$_2$ | 1.1 | 13,000 |
| H6 | J-67 (BASF SE) | | 12,500 |
| H7 | X310 (SEIKO PMC CORPORATION) | | 14,000 |

TABLE 2

| | Blending amount [parts by mass] | | | | | | | | | | |
|---|---|---|---|---|---|---|---|---|---|---|---|
| | Disperse dye | | | Dispersing agent | | | | | | | |
| | DY54 | DY33 | DY42 | SM1 | SM2 | SM3 | SM4 | SM5 | SM6 | SM7 | SM8 |
| Example A1 | 15.0 | 0 | 0 | 15.0 | 0 | 0 | 0 | 0 | 0 | 0 | 0 |
| Example A2 | 15.0 | 0 | 0 | 7.5 | 0 | 0 | 0 | 0 | 0 | 0 | 0 |
| Example A3 | 25.0 | 0 | 0 | 12.5 | 0 | 0 | 0 | 0 | 0 | 0 | 0 |
| Example A4 | 30.0 | 0 | 0 | 15.0 | 0 | 0 | 0 | 0 | 0 | 0 | 0 |
| Example A5 | 7.5 | 0 | 0 | 15.0 | 0 | 0 | 0 | 0 | 0 | 0 | 0 |
| Example A6 | 15.0 | 0 | 0 | 30.0 | 0 | 0 | 0 | 0 | 0 | 0 | 0 |
| Example A7 | 15.0 | 0 | 0 | 20.0 | 0 | 0 | 0 | 0 | 0 | 0 | 0 |
| Example A8 | 25.0 | 0 | 0 | 25.0 | 0 | 0 | 0 | 0 | 0 | 0 | 0 |
| Example A9 | 30.0 | 0 | 0 | 30.0 | 0 | 0 | 0 | 0 | 0 | 0 | 0 |
| Example A10 | 15.0 | 0 | 0 | 0 | 7.5 | 0 | 0 | 0 | 0 | 0 | 0 |
| Example A11 | 15.0 | 0 | 0 | 0 | 0 | 7.5 | 0 | 0 | 0 | 0 | 0 |
| Example A12 | 15.0 | 0 | 0 | 0 | 0 | 0 | 7.5 | 0 | 0 | 0 | 0 |
| Example A13 | 15.0 | 0 | 0 | 0 | 0 | 0 | 0 | 7.5 | 0 | 0 | 0 |
| Example A14 | 15.0 | 0 | 0 | 0 | 0 | 0 | 0 | 0 | 7.5 | 0 | 0 |
| Example A15 | 15.0 | 0 | 0 | 0 | 0 | 0 | 0 | 0 | 0 | 7.5 | 0 |
| Example A16 | 15.0 | 0 | 0 | 0 | 0 | 0 | 0 | 0 | 0 | 0 | 7.5 |
| Example A17 | 15.0 | 0 | 0 | 0 | 0 | 0 | 0 | 0 | 0 | 0 | 0 |
| Example A18 | 15.0 | 0 | 0 | 0 | 0 | 0 | 0 | 0 | 0 | 0 | 0 |
| Example A19 | 15.0 | 0 | 0 | 0 | 0 | 0 | 0 | 0 | 0 | 0 | 0 |
| Example A20 | 15.0 | 0 | 0 | 0 | 0 | 20.0 | 0 | 0 | 0 | 0 | 0 |
| Example A21 | 15.0 | 0 | 0 | 0 | 0 | 3.0 | 0 | 0 | 0 | 0 | 0 |
| Comparative Example A1 | 0 | 15.0 | 0 | 7.5 | 0 | 0 | 0 | 0 | 0 | 0 | 0 |
| Comparative Example A2 | 0 | 0 | 15.0 | 7.5 | 0 | 0 | 0 | 0 | 0 | 0 | 0 |
| Comparative Example A3 | 15.0 | 0 | 0 | 0 | 0 | 0 | 0 | 0 | 0 | 0 | 0 |
| Comparative Example A4 | 15.0 | 0 | 0 | 0 | 0 | 0 | 0 | 0 | 0 | 0 | 0 |
| Comparative Example A5 | 15.0 | 0 | 0 | 0 | 0 | 0 | 0 | 0 | 0 | 0 | 0 |
| Comparative Example A6 | 15.0 | 0 | 0 | 0 | 0 | 0 | 0 | 0 | 0 | 0 | 0 |
| Comparative Example A7 | 15.0 | 0 | 0 | 0 | 0 | 0 | 0 | 0 | 0 | 0 | 0 |
| Comparative Example A8 | 15.0 | 0 | 0 | 0 | 0 | 0 | 0 | 0 | 0 | 0 | 0 |
| Comparative Example A9 | 15.0 | 0 | 0 | 0 | 0 | 0 | 0 | 0 | 0 | 0 | 0 |

TABLE 2-continued

| | | Blending amount [parts by mass] | | | | | | | | | Pure water | XM/XD |
|---|---|---|---|---|---|---|---|---|---|---|---|---|
| | | Dispersing agent | | | | | | | | | | |
| | SM9 | SM10 | SM11 | H1 | H2 | H3 | H4 | H5 | H6 | H7 | | |
| Example A1 | 0 | 0 | 0 | 0 | 0 | 0 | 0 | 0 | 0 | 0 | 70.0 | 1.00 |
| Example A2 | 0 | 0 | 0 | 0 | 0 | 0 | 0 | 0 | 0 | 0 | 77.5 | 0.50 |
| Example A3 | 0 | 0 | 0 | 0 | 0 | 0 | 0 | 0 | 0 | 0 | 62.5 | 0.50 |
| Example A4 | 0 | 0 | 0 | 0 | 0 | 0 | 0 | 0 | 0 | 0 | 55.0 | 0.50 |
| Example A5 | 0 | 0 | 0 | 0 | 0 | 0 | 0 | 0 | 0 | 0 | 77.5 | 2.00 |
| Example A6 | 0 | 0 | 0 | 0 | 0 | 0 | 0 | 0 | 0 | 0 | 55.0 | 2.00 |
| Example A7 | 0 | 0 | 0 | 0 | 0 | 0 | 0 | 0 | 0 | 0 | 65.0 | 1.33 |
| Example A8 | 0 | 0 | 0 | 0 | 0 | 0 | 0 | 0 | 0 | 0 | 50.0 | 1.00 |
| Example A9 | 0 | 0 | 0 | 0 | 0 | 0 | 0 | 0 | 0 | 0 | 40.0 | 1.00 |
| Example A10 | 0 | 0 | 0 | 0 | 0 | 0 | 0 | 0 | 0 | 0 | 77.5 | 0.50 |
| Example A11 | 0 | 0 | 0 | 0 | 0 | 0 | 0 | 0 | 0 | 0 | 77.5 | 0.50 |
| Example A12 | 0 | 0 | 0 | 0 | 0 | 0 | 0 | 0 | 0 | 0 | 77.5 | 0.50 |
| Example A13 | 0 | 0 | 0 | 0 | 0 | 0 | 0 | 0 | 0 | 0 | 77.5 | 0.50 |
| Example A14 | 0 | 0 | 0 | 0 | 0 | 0 | 0 | 0 | 0 | 0 | 77.5 | 0.50 |
| Example A15 | 0 | 0 | 0 | 0 | 0 | 0 | 0 | 0 | 0 | 0 | 77.5 | 0.50 |
| Example A16 | 0 | 0 | 0 | 0 | 0 | 0 | 0 | 0 | 0 | 0 | 77.5 | 0.50 |
| Example A17 | 7.5 | 0 | 0 | 0 | 0 | 0 | 0 | 0 | 0 | 0 | 77.5 | 0.50 |
| Example A18 | 0 | 7.5 | 0 | 0 | 0 | 0 | 0 | 0 | 0 | 0 | 77.5 | 0.50 |
| Example A19 | 0 | 0 | 7.5 | 0 | 0 | 0 | 0 | 0 | 0 | 0 | 77.5 | 0.50 |
| Example A20 | 0 | 0 | 0 | 0 | 0 | 0 | 0 | 0 | 0 | 0 | 65.0 | 1.33 |
| Example A21 | 0 | 0 | 0 | 0 | 0 | 0 | 0 | 0 | 0 | 0 | 82.0 | 0.20 |
| Comparative Example A1 | 0 | 0 | 0 | 0 | 0 | 0 | 0 | 0 | 0 | 0 | 77.5 | — |
| Comparative Example A2 | 0 | 0 | 0 | 0 | 0 | 0 | 0 | 0 | 0 | 0 | 77.5 | — |
| Comparative Example A3 | 0 | 0 | 0 | 7.5 | 0 | 0 | 0 | 0 | 0 | 0 | 77.5 | — |
| Comparative Example A4 | 0 | 0 | 0 | 0 | 7.5 | 0 | 0 | 0 | 0 | 0 | 77.5 | — |
| Comparative Example A5 | 0 | 0 | 0 | 0 | 0 | 7.5 | 0 | 0 | 0 | 0 | 77.5 | — |
| Comparative Example A6 | 0 | 0 | 0 | 0 | 0 | 0 | 0 | 0 | 7.5 | 0 | 77.5 | — |
| Comparative Example A7 | 0 | 0 | 0 | 0 | 0 | 0 | 0 | 0 | 0 | 7.5 | 77.5 | — |
| Comparative Example A8 | 0 | 0 | 0 | 0 | 0 | 7.5 | 0 | 0 | 0 | 0 | 77.5 | — |
| Comparative Example A9 | 0 | 0 | 0 | 0 | 0 | 0 | 0 | 7.5 | 0 | 0 | 77.5 | — |

[2] Evaluation on Stock Solution for Producing Ink Jet Ink

[2-1] Storage Stability (Change in Particle Diameter)

For each of the aqueous ink jet compositions (stock solutions for producing ink jet inks) of the respective Examples and Comparative Examples, an average particle diameter of the disperse dye immediately after production and an average particle diameter of the disperse dye after being placed in a predetermined container and left to stand for one week in an environment of 60° C. were obtained. From these values, a variation rate of the average particle diameter of the disperse dye after being left to stand for one week in an environment of 60° C. with respect to the average particle diameter of the disperse dye immediately after production was obtained, and evaluation was performed according to the following criteria. For measurement of the average particle diameter, Microtrac UPA (manufactured by Nikkiso CO., LTD.) was used. It can be said that a larger variation rate of the average particle diameter indicates lower storage stability.

A: Variation rate of average particle diameter is less than 2%.

B: Variation rate of average particle diameter is equal to or greater than 2% and less than 5%.

C: Variation rate of average particle diameter is equal to or greater than 5% and less than 10%.

D: Variation rate of average particle diameter is equal to or greater than 10% and less than 15%.

E: Variation rate of average particle diameter is equal to or greater than 15%.

[2-2] Storage Stability (Change in Viscosity)

For each of the aqueous ink jet compositions (stock solutions for producing ink jet inks) of the respective Examples and Comparative Examples, a viscosity immediately after production and a viscosity after being placed in a predetermined container and left to stand for one week in an environment of 60° C. were obtained. From these values, a variation rate of the viscosity after being left to stand for one week in an environment of 60° C. with respect to the viscosity immediately after production was obtained, and evaluation was performed according to the following criteria. As a viscosity value, a value obtained using a viscoelasticity tester MCR-300 (manufactured by Physica) by raising Shear Rate from 10 s$^{-1}$ to 1,000 s$^{-1}$ at 20° C. and reading a viscosity at the time of Shear Rate 200 was adopted. It can be said that a larger variation rate of the viscosity indicates lower storage stability.

A: Variation rate of viscosity is less than 2%.

B: Variation rate of viscosity is equal to or greater than 2% and less than 5%.

C: Variation rate of viscosity is equal to or greater than 5% and less than 10%.

D: Variation rate of viscosity is equal to or greater than 10% and less than 15%.

E: Variation rate of viscosity is equal to or greater than 15%.

[2-3] Extent of Weak Flocculation

For each of the aqueous ink jet compositions (stock solutions for producing ink jet inks) of the respective Examples and Comparative Examples, immediately after production and immediately after being placed in a predetermined container and left to stand for one week in an environment of 60° C., the number of particles having a particle diameter of equal to or greater than 0.5 µm and equal to or less than 40.0 µm was measured, at a 100-fold dilution with pure water, using a particle diameter and particle size distribution measuring device (FPIA-3000S, manufactured by Sysmex Corporation) in HPF measurement mode and standard photographing unit. From these values, a variation rate of the number of particles having a particle diameter of equal to or greater than 0.5 µm and equal to or less than 40.0 µm from immediately after production until a time point after being left to stand for one week in an environment of 60° C. was obtained, and evaluation was performed according to the following criteria. It can be said that a larger variation rate indicates more progression of formation of weakly-flocculated bodies.

A: Variation rate is less than 5%.

B: Variation rate is equal to or greater than 5% and less than 10%.

C: Variation rate is equal to or greater than 10% and less than 30%.

D: Variation rate is equal to or greater than 30% and less than 50%.

E: Variation rate is equal to or greater than 50%.

These results are summarized in Table 3.

TABLE 3

|  | Storage stability | | Extent of weak flocculation |
|---|---|---|---|
|  | Change in particle diameter | Change in viscosity |  |
| Example A1 | A | A | A |
| Example A2 | A | A | A |
| Example A3 | C | C | C |
| Example A4 | D | D | D |
| Example A5 | B | B | C |
| Example A6 | C | C | C |
| Example A7 | C | C | C |
| Example A8 | C | C | C |
| Example A9 | D | D | D |
| Example A10 | B | B | A |
| Example A11 | C | C | C |
| Example A12 | C | C | C |
| Example A13 | B | B | C |
| Example A14 | B | B | B |
| Example A15 | B | B | B |
| Example A16 | B | B | B |
| Example A17 | C | C | C |
| Example A18 | C | C | C |
| Example A19 | C | C | C |
| Example A20 | C | C | C |
| Example A21 | C | C | C |
| Comparative Example A1 | C | E | B |
| Comparative Example A2 | C | E | B |
| Comparative Example A3 | E | E | E |
| Comparative Example A4 | E | E | E |
| Comparative Example A5 | E | E | E |
| Comparative Example A6 | E | E | E |
| Comparative Example A7 | E | E | E |
| Comparative Example A8 | E | E | E |
| Comparative Example A9 | E | E | E |

As is apparent from Table 3, excellent results were obtained in the invention. On the contrary, satisfactory results were not obtained in the Comparative Examples.

[3] Preparation of Ink Jet Ink (Aqueous Ink Jet Composition)

Example B1

The stock solution for producing an ink jet in which had been prepared in Example A1, glycerin, 2-pyrrolidone, propylene glycol, Olfine EXP4300 (manufactured by Nissin Chemical Industry Co., Ltd.) as an acetylene-based surfactant, and pure water were mixed at a proportion as shown in Table 4, and the mixture was stirred with High Shear Mixer (manufactured by Silverson Machines, Inc.) at 3,000 rpm to produce an ink jet ink as an aqueous ink jet composition.

An average particle diameter of C.I. Disperse Yellow 54 in the ink jet ink was 150 nm.

Examples B2 to B23

Ink jet inks as aqueous ink jet compositions were produced in the same manner as in Example B1, except that types of the stock solutions for producing ink jet inks were as shown in Tables 4 and 5 and blending proportions of the respective components were as shown in Tables 4 and 5.

Comparative Examples B1 to B9

Ink jet inks as aqueous ink jet compositions were produced in the same manner as in Example B1, except that types of the stock solutions for producing ink jet inks were as shown in Table 5 and blending proportions of the respective components were as shown in Table 5.

Conditions for the aqueous ink jet compositions (ink jet inks) of the respective Examples and Comparative Examples are summarized in Tables 4 and 5. In the tables, glycerin is indicated as "Gly", 2-pyrrolidone is indicated as "2-Py", propylene glycol is indicated as "PG", BYK 348 (manufactured by BYK Chemie Japan) as a silicone-based surfactant is indicated as "BYK 348", and Olfine EXP4300 (manufactured by Nissin Chemical Industry Co., Ltd.) as an acetylene-based surfactant is indicated as "EXP 4300". In addition, each of the ink jet inks of Examples B1 to B23 had a viscosity which is a value within a range of equal to or greater than 2.0 mPa·s and equal to or less than 5.0 mPa·s, and surface tension which is a value within a range of equal to or greater than 20 mN/m and equal to or less than 35 mN/m. For the viscosity, measurement was performed at 20° C. using a viscoelasticity tester MCR-300 (manufactured by Physica) by raising Shear Rate from 10 s$^{-1}$ to 1,000 s$^{-1}$ and reading a viscosity at the time of Shear Rate 200. In addition, for the surface tension, measurement was performed by the Wilhelmy method at 20° C. using a surface tension meter (CBVP-7, manufactured by Kyowa Interface Science Co., Ltd.).

TABLE 4

| | Stock solution | | Solvent other than water | | | Surfactant | | Pure water |
|---|---|---|---|---|---|---|---|---|
| | Type | | Gly | 2-Py | PG | BYK 348 | EXP 4300 | |
| Example B1 | Example A1 | 20 | 10 | 5 | 5 | 0 | 1 | 59 |
| Example B2 | Example A2 | 20 | 10 | 5 | 5 | 0 | 1 | 59 |
| Example B3 | Example A10 | 20 | 10 | 5 | 5 | 0 | 1 | 59 |
| Example B4 | Example A11 | 20 | 10 | 5 | 5 | 0 | 1 | 59 |
| Example B5 | Example A12 | 20 | 10 | 5 | 5 | 0 | 1 | 59 |
| Example B6 | Example A13 | 20 | 10 | 5 | 5 | 0 | 1 | 59 |
| Example B7 | Example A14 | 20 | 10 | 5 | 5 | 0 | 1 | 59 |
| Example B8 | Example A5 | 0.66 | 15 | 5 | 5 | 0 | 1 | 73.34 |
| Example B9 | Example A5 | 1.33 | 15 | 5 | 5 | 0 | 1 | 72.67 |
| Example B10 | Example A15 | 20 | 10 | 5 | 5 | 0 | 1 | 59 |
| Example B11 | Example A16 | 20 | 10 | 5 | 5 | 0 | 1 | 59 |
| Example B12 | Example A17 | 20 | 10 | 5 | 5 | 0 | 1 | 59 |
| Example B13 | Example A18 | 20 | 10 | 5 | 5 | 0 | 1 | 59 |
| Example B14 | Example A20 | 20 | 10 | 5 | 5 | 0 | 1 | 59 |
| Example B15 | Example A21 | 20 | 10 | 5 | 5 | 0 | 1 | 59 |
| Example B16 | Example A1 | 0.33 | 15 | 5 | 5 | 0 | 1 | 73.67 |
| Example B17 | Example A1 | 0.66 | 15 | 5 | 5 | 0 | 1 | 73.34 |

TABLE 5

| | Stock solution | | Solvent other than water | | | Surfactant | | Pure water |
|---|---|---|---|---|---|---|---|---|
| | Type | | Gly | 2-Py | PG | BYK 348 | EXP 4300 | |
| Example B18 | Example A2 | 0.66 | 15 | 5 | 5 | 0 | 1 | 73.34 |
| Example B19 | Example A2 | 1.33 | 15 | 5 | 5 | 0 | 1 | 72.67 |
| Example B20 | Example A2 | 66 | 10 | 5 | 5 | 0 | 1 | 13 |
| Example B21 | Example A1 | 1.33 | 15 | 5 | 5 | 0 | 1 | 72.67 |
| Example B22 | Example A20 | 20 | 5 | 5 | 5 | 0 | 1 | 64 |
| Example B23 | Example A2 | 20 | 10 | 5 | 5 | 1 | 0 | 59 |
| Comparative Example B1 | Comparative Example A1 | 20 | 10 | 5 | 5 | 0 | 1 | 59 |
| Comparative Example B2 | Comparative Example A2 | 20 | 10 | 5 | 5 | 0 | 1 | 59 |
| Comparative Example B3 | Comparative Example A3 | 20 | 10 | 5 | 5 | 0 | 1 | 59 |
| Comparative Example B4 | Comparative Example A4 | 20 | 10 | 5 | 5 | 0 | 1 | 59 |
| Comparative Example B5 | Comparative Example A5 | 20 | 10 | 5 | 5 | 0 | 1 | 59 |
| Comparative Example B6 | Comparative Example A6 | 20 | 10 | 5 | 5 | 0 | 1 | 59 |
| Comparative Example B7 | Comparative Example A7 | 20 | 10 | 5 | 5 | 0 | 1 | 59 |
| Comparative Example B8 | Comparative Example A8 | 20 | 10 | 5 | 5 | 0 | 1 | 59 |
| Comparative Example B9 | Comparative Example A9 | 20 | 10 | 5 | 5 | 0 | 1 | 59 |

[4] Evaluation on Ink Jet Ink
[4-1] Storage Stability (Change in Particle Diameter)

For each of the aqueous ink jet compositions (ink jet inks) of the respective Examples and Comparative Examples, an average particle diameter of the disperse dye immediately after production and an average particle diameter of the disperse dye after being placed in a predetermined ink-holding container and left to stand for one week in an environment of 60° C. were obtained. From these values, a variation rate of the average particle diameter of the disperse dye after being left to stand for one week in an environment of 60° C. with respect to the average particle diameter of the disperse dye immediately after production was obtained, and evaluation was performed according to the following criteria. For measurement of the average particle diameter, Microtrac UPA (manufactured by Nikkiso Co., Ltd.) was used. It can be said that a larger variation rate of the average particle diameter indicates lower storage stability and a larger adverse effect on discharge stability.

A: Variation rate of average particle diameter is less than 2%.

B: Variation rate of average particle diameter is equal to or greater than 2% and less than 5%.

C: Variation rate of average particle diameter is equal to or greater than 5% and less than 10%.

D: Variation rate of average particle diameter is equal to or greater than 10% and less than 15%.

E: Variation rate of average particle diameter is equal to or greater than 15%.

[4-2] Storage Stability (Change in Viscosity)

For each of the aqueous ink jet compositions (ink jet inks) of the respective Examples and Comparative Examples, a viscosity immediately after production and a viscosity after being placed in a predetermined ink-holding container and left to stand for one week in an environment of 60° C. were obtained. From these values, a variation rate of the viscosity after being left to stand for one week in an environment of 60° C. with respect to the viscosity immediately after production was obtained, and evaluation was performed according to the following criteria. As a viscosity value, a value obtained using a viscoelasticity tester MCR-300 (manufactured by Physica) by raising Shear Rate from 10 $s^{-1}$ to 1,000 $s^{-1}$ at 20° C. and reading a viscosity at the time of Shear Rate 200 was adopted. It can be said that a larger variation rate of the viscosity indicates lower storage stability and a larger adverse effect on discharge stability.

A: Variation rate of viscosity is less than 2%.

B: Variation rate of viscosity is equal to or greater than 2% and less than 5%.

C: Variation rate of viscosity is equal to or greater than 5% and less than 10%.

D: Variation rate of viscosity is equal to or greater than 10% and less than 15%.

E: Variation rate of viscosity is equal to or greater than 15%.

[4-3] Extent of Weak Flocculation

For each of the aqueous ink jet compositions (ink jet inks) of the respective Examples and Comparative Examples, immediately after production and after being placed in a predetermined ink-holding container and left to stand for one week in an environment of 60° C., the number of particles having a particle diameter of equal to or greater than 0.5 μm and equal to or less than 40.0 μm was measured, at a 100-fold dilution with pure water, using a particle diameter and particle size distribution measuring device (FPIA-3000S, manufactured by Sysmex Corporation) in HPF measurement mode and standard photographing unit. From these values, a variation rate of the number of particles having a particle diameter of equal to or greater than 0.5 μm and equal to or less than 40.0 μm from immediately after production until a time point after being left to stand for one week in an environment of 60° C. was obtained, and evaluation was performed according to the following criteria. It can be said that a larger variation rate indicates more progression of formation of weakly-flocculated bodies.

A: Variation rate is less than 5%.

B: Variation rate is equal to or greater than 5% and less than 10%.

C: Variation rate is equal to or greater than 10% and less than 30%.

D: Variation rate is equal to or greater than 30% and less than 50%.

E: Variation rate is equal to or greater than 50%.

[4-4] Evaluation on Liquid Passing (Flocculated Matters on Filter)

An ink cartridge for an ink jet printer (PX-H6000, manufactured by Seiko Epson Corporation) was filled with each of the aqueous ink jet compositions (ink jet inks) of the respective Examples and Comparative Examples. Then, the ink cartridge was mounted on an ink jet printer (PX-H6000, manufactured by Seiko Epson Corporation) to fill the ink jet printer.

Thereafter, solid printing was performed on an A4-sized recording medium (plain paper) at 300 sheets/day, and the ink jet printer was allowed to pause for a time when printing was not performed. In addition, replacing (refreshing) an ink existing in a head and an ink path for supplying an ink from an ink cartridge to the head with a new ink by sucking an ink in the head from a nozzle was carried out once a week. After 30 days, a coating rate of a filter member in the head by flocculated matters was calculated. It can be said that a larger coating rate indicates generation of more flocculated matters that have an adverse effect on droplet discharge.

A: Coating rate of filter member is less than 2%.

B: Coating rate of filter member is equal to or greater than 2% and less than 5%.

C: Coating rate of filter member is equal to or greater than 5% and less than 10%.

D: Coating rate of filter member is equal to or greater than 10% and less than 15%.

E: Coating rate of filter member is equal to or greater than 15%.

[4-5] Discharge Stability by Ink Jet Method

A predetermined ink-holding container was filled with each of the aqueous ink jet compositions (ink jet inks) of the respective Examples and Comparative Examples and was left to stand for 5 days in an environment of 60° C.

Thereafter, the holding container was mounted on a recording apparatus PX-H 6000 (manufactured by Seiko Epson Corporation), and the ink jet ink was discharged so that a solid pattern was adhered on TRANSJET Classic (manufactured by Cham Paper), which is an intermediate transfer medium, at a recording resolution of 1440×720 dpi. An operating environment of the recording apparatus (printer) was set at 40° C. and 20 RH %.

The number of times of nozzle omission at the time of recording 30 solid patterns on the intermediate transfer medium was examined, and evaluation was performed according to the following criteria.

A: Number of times of nozzle omission is 0.

B: Number of times of nozzle omission is equal to or greater than 1 and equal to or less than 9.

C: Number of times of nozzle omission is equal to or greater than 10 and equal to or less than 19.

D: Number of times of nozzle omission is equal to or greater than 20 and equal to or less than 29.

E: Number of times of nozzle omission is equal to or greater than 30.

[4-6] Color Developing Property (OD Value)

An adhesion side of aqueous ink jet composition on the thirtieth intermediate transfer medium to which the ink jet ink had been adhered in [4-5] was brought into close contact with cloth (polyester 100%, Amina, manufactured by Toray Industries, Inc.) which is a white recording medium. In this state, sublimation transfer was carried out by performing heating using a heat press machine (TP-608M, manufactured by Taiyo Seiki Co., Ltd.) at a condition of 180° C. and 60 seconds, so that each recorded matter was obtained.

For each recorded matter obtained, evaluation on color developing property was performed. Specifically, for each recorded matter obtained, an OD value was measured using a colorimeter (Gretag Macbeth Spectrolino, manufactured by X-Rite), and evaluation was performed according to the following criteria.

A: OD value is equal to or greater than 1.50.

B: OD value is equal to or greater than 1.45 and less than 1.50.

C: OD value is equal to or greater than 1.40 and less than 1.45.

D: OD value is equal to or greater than 1.35 and less than 1.40.

E: OD value is less than 1.35.

These results are summarized in Tables 6 and 7.

TABLE 6

|  | Storage stability | | | | | |
|---|---|---|---|---|---|---|
|  | Change in particle diameter | Change in viscosity | Extent of weak flocculation | Evaluation on liquid passing | Discharge stability | Color developing property |
| Example B1 | A | A | A | A | A | A |
| Example B2 | A | A | A | A | A | A |
| Example B3 | B | B | A | A | A | A |
| Example B4 | C | C | C | C | A | A |
| Example B5 | C | C | C | C | A | A |
| Example B6 | B | B | C | C | A | A |
| Example B7 | B | B | B | B | A | A |
| Example B8 | C | C | C | C | C | E |
| Example B9 | C | C | C | C | C | E |
| Example B10 | B | B | B | B | A | A |
| Example B11 | B | B | B | B | A | A |
| Example B12 | C | C | C | C | B | A |
| Example B13 | C | C | C | C | D | A |
| Example B14 | C | C | C | C | B | A |
| Example B15 | C | C | C | C | A | A |
| Example B16 | C | C | C | C | C | E |
| Example B17 | C | C | C | C | C | E |

TABLE 7

|  | Storage stability | | | | | |
|---|---|---|---|---|---|---|
|  | Change in particle diameter | Change in viscosity | Extent of weak flocculation | Evaluation on liquid passing | Discharge stability | Color developing property |
| Example B18 | C | C | C | C | C | E |
| Example B19 | C | C | C | C | C | E |
| Example B20 | C | C | C | C | D | A |
| Example B21 | C | C | C | C | C | E |
| Example B22 | C | C | C | C | A | A |
| Example B23 | B | B | B | B | A | A |
| Comparative Example B1 | C | E | B | B | C | E |
| Comparative Example B2 | C | E | B | B | C | E |
| Comparative Example B3 | E | E | E | E | E | A |
| Comparative Example B4 | E | E | E | E | E | A |
| Comparative Example B5 | E | E | E | E | E | B |
| Comparative Example B6 | E | E | E | E | E | A |
| Comparative Example B7 | E | E | E | E | E | A |
| Comparative Example B8 | E | E | E | E | E | A |
| Comparative Example B9 | E | E | E | E | E | A |

As is apparent from Tables 6 and 7, excellent results were obtained in the invention. On the contrary, satisfactory results were not obtained in the Comparative Examples.

Hereinafter, a second suitable embodiment of the invention will be described in detail.

Aqueous Ink Jet Composition

Among various disperse dyes, C.I. Disperse Yellow 54 has features such as an excellent color developing property while having the following problems. That is, in a case where C.I. Disperse Yellow 54 is used as a constituent component of an aqueous ink jet composition in the related art, the C.I. Disperse Yellow 54 does not make it possible for the aqueous ink jet composition to have a sufficiently excellent storage stability, which remarkably causes a problem that clogging occurs in a head filter or a nozzle during discharge by an ink jet method after long-term storage.

Regarding such a problem, as a result of intensive studies, the present inventor found that the problem is due to weak flocculation of components containing C.I. Disperse Yellow 54.

Therefore, the present inventor has conducted further intensive studies, which are aimed at suppressing generation of weakly-flocculated bodies due to weak flocculation while taking advantage of excellent characteristics of C.I. Disperse Yellow 54. As a result, the present inventor has reached the invention.

That is, the aqueous ink jet composition of the invention contains C.I. Disperse Yellow 54, a substance A which is at least one type of compound selected from the group consisting of a compound represented by Formula (2-1), a compound represented by Formula (2-2), an ethylene oxide adduct of tristyrylphenol, and a derivative of the ethylene oxide adduct of tristyrylphenol, and an anionic dispersing agent.

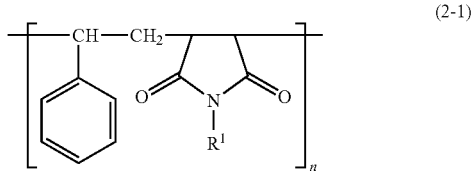

(2-1)

(In Formula (2-1), $R^1$ is a hydrocarbon group having 6 or less carbon atoms, or $-(CH_2)_m-NR^8R^9$ (where m is an integer of equal to or less than 6, and $R^8$ and $R^9$ are each independently a hydrogen atom or a hydrocarbon group having 6 or less carbon atoms), and n is an integer of equal to or greater than 1)

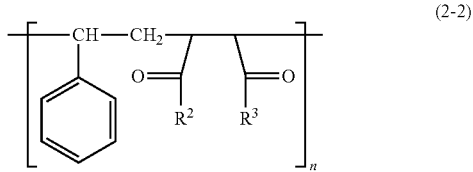

(2-2)

(In Formula (2-2), one of $R^2$ and $R^3$ is —OH and the other is $-NR^4R^5$ (where $R^4$ and $R^5$ are each independently a hydrogen atom or a hydrocarbon group having 6 or less carbon atoms), and n is an integer of equal to or greater than 1.)

With such a constitution, it is possible to provide an aqueous ink jet composition which has effects obtained by containing C.I. Disperse Yellow 54 that is a disperse dye having features such as an excellent color developing property in a low-temperature process due to a relatively small molecular weight, while hardly causing remarkable generation of weakly-flocculated bodies and clogging in a head filter or a nozzle during discharge by an ink jet method, which are due to long-term storage.

On the contrary, in a case where the above conditions are not satisfied, satisfactory results cannot be obtained.

For example, in a case where the above-mentioned substance A is not used, dispersion stability of C.I. Disperse Yellow 54 in the aqueous ink jet composition cannot be ensured, so that weakly-flocculated bodies are easily generated during long-term storage of the aqueous ink jet composition, or the like.

In addition, in a case where the anionic dispersing agent is not used or in a case where another dispersing agent (for example, a nonionic dispersing agent, a cationic dispersing agent, or the like) is used in place of the anionic dispersing agent, dispersion stability of C.I. Disperse Yellow 54 in the aqueous ink jet composition cannot be ensured, so that weakly-flocculated bodies are easily generated during long-term storage of the aqueous ink jet composition, or the like.

In the present specification, "weak flocculation" refers to a softly flocculated state in which particles are not present as flocculated particles having a predetermined particle diameter unlike ordinary strong flocculation (hard flocculation) and which does not have a definite particle diameter and easily causes deformation like "fluffy mass".

An extent of progression of such weak flocculation can be determined, for example, by measurement with FPIA (a wet-type flow-type particle diameter and particle shape analyzer). That is, before and after a lapse of a predetermined time, for an aqueous ink jet composition, measurement is performed with FPIA to obtain the number of particles having a particle diameter of equal to or greater than 0.5 μm and equal to or less than 40.0 μm. It can be said that formation of weakly-flocculated bodies progresses more as a variation rate of the number of particles in such a particle diameter range before and after the lapse of a predetermined time is larger. As the FPIA, for example, FPIA-2100, FPIA-3000, and FPIA-3000S which are flow-type particle image analyzers manufactured by Sysmex Corporation, and the like can be used.

In addition, in the present specification, the aqueous ink jet composition is a concept including not only an ink itself to be discharged by an ink jet method but also a stock solution used for preparing the ink. In other words, the aqueous ink jet composition of the invention may be subjected to discharge by an ink jet method as it is, or may be subjected to discharge by an ink jet method after treatments such as dilution.

Substance A

The aqueous ink jet composition of the invention contains a substance A which is at least one type of compound selected from the group consisting of a compound represented by Formula (2-1), a compound represented by Formula (2-2), an ethylene oxide adduct of tristyrylphenol, and the derivative of the ethylene oxide adduct of tristyrylphenol.

By using the substance A in combination with C.I. Disperse Yellow 54 and the anionic dispersing agent, dispersion stability of C.I. Disperse Yellow 54 in the aqueous ink jet composition and storage stability of the aqueous ink jet composition can be made excellent, and remarkable generation of weakly-flocculated bodies and occurrence of clogging in a head filter or a nozzle during discharge by an ink jet method, which are due to long-term storage, can be effectively prevented. As a result, it is possible to stably perform discharge of the aqueous ink jet composition for a long period of time, and it is possible to keep quality of a recorded matter obtained by an ink jet method in a stable and excellent manner. In addition, the substance A is a component which hardly causes an adverse effect on quality of a recorded matter and an adverse effect in sublimation printing.

For the substance A, the aqueous ink jet composition of the invention may contain one type of compound or may contain plural types of compounds. More specifically, the substance A may be, for example, a mixture of the compound represented by Formula (2-1) and the compound represented by Formula (2-2).

A content of the substance A in the aqueous ink jet composition is preferably equal to or greater than 0.13% by mass and equal to or less than 6.0% by mass, more preferably equal to or greater than 0.20% by mass and equal to or less than 4.0% by mass, and even more preferably equal to or greater than 0.50% by mass and equal to or less than 3.0% by mass.

Accordingly, storage stability of the aqueous ink jet composition is further improved, and generation of weakly-flocculated bodies during long-term storage or the like is more effectively prevented.

In particular, in a case where the aqueous ink jet composition is an ink itself to be discharged by an ink jet method, a content of the substance A in the ink is preferably equal to or greater than 0.13% by mass and equal to or less than 1.0% by mass, more preferably equal to or greater than 0.20% by mass to equal to or less than 0.80% by mass, and even more preferably equal to or greater than 0.50% by mass and equal to or less than 0.70% by mass.

In addition, in a case where the aqueous ink jet composition is a stock solution used for preparing an ink to be discharged by an ink jet method, a content of the substance A in the stock solution is preferably equal to or greater than 0.5% by mass and equal to or less than 6.0% by mass, more preferably equal to or greater than 1.0% by mass and equal to or less than 4.0% by mass, and even more preferably equal to or greater than 1.3% by mass and equal to or less than 3.0% by mass.

In a case where the substance A constituting the aqueous ink jet composition contains plural types of compounds, for the content, a sum of contents of these plural types of compounds is adopted.

Anionic Dispersing Agent

The aqueous ink jet composition of the invention contains an anionic dispersing agent.

The anionic dispersing agent is not particularly limited as long as the anionic dispersing agent is ionized to form an anion, and is preferably at least one of a compound represented by Formula (2-3), a sodium salt of a naphthalene sulfonic acid formalin condensate, and lignin sulfonic acid.

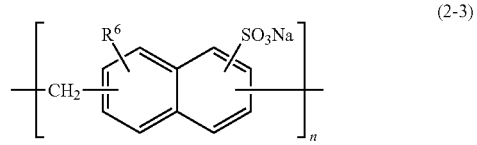

(2-3)

(In Formula (2-3), $R^6$ is a hydrocarbon group having 4 or less carbon atoms, and n is an integer of equal to or greater than 1.)

Accordingly, hydrophobicity of the dispersing agent is improved, and adsorption of the dispersing agent onto C.I. Disperse Yellow 54 is promoted, so that long-term stability of the aqueous ink jet composition is further improved.

It is sufficient that $R^6$ in Formula (2-3) is a hydrocarbon group having 4 or less carbon atoms. Among these, $R^6$ is preferably a hydrocarbon group (a methyl group or an ethyl group) having 2 or less carbon atoms.

Accordingly, it is possible to make more suitable balance between hydrophobicity and hydrophilicity of the anionic dispersing agent, and it is possible to achieve further excellent dispersion stability of C.I. Disperse Yellow 54 in the aqueous ink jet composition.

A weight average molecular weight Mw of the anionic dispersing agent is preferably equal to or greater than 1,000 and equal to or less than 20,000, more preferably equal to or greater than 2,000 and equal to or less than 10,000, and even more preferably equal to or greater than 3,000 and equal to or less than 5,000.

Accordingly, storage stability of the aqueous ink jet composition is further improved, and generation of weakly-flocculated bodies during long-term storage or the like is more effectively prevented.

For the anionic dispersing agent, the aqueous ink jet composition may contain two or more types of compounds.

A content of the anionic dispersing agent in the aqueous ink jet composition is preferably equal to or greater than 0.13% by mass and equal to or less than 25% by mass, more preferably equal to or greater than 0.2% by mass and equal to or less than 15% by mass, and even more preferably equal to or greater than 0.3% by mass and equal to or less than 10% by mass.

Accordingly, storage stability of the aqueous ink jet composition is further improved, and generation of weakly-flocculated bodies during long-term storage or the like is more effectively prevented.

In particular, in a case where the aqueous ink jet composition is an ink itself to be discharged by an ink jet method, a content of the anionic dispersing agent in the ink is preferably equal to or greater than 0.13% by mass and equal to or less than 5.0% by mass, more preferably equal to or greater than 0.2% by mass and equal to or less than 4.0% by mass, and even more preferably equal to or greater than 0.3% by mass and equal to or less than 3.0% by mass.

In addition, in a case where the aqueous ink jet composition is a stock solution used for preparing an ink to be discharged by an ink jet method, a content of the anionic dispersing agent in the stock solution is preferably equal to or greater than 5.0% by mass and equal to or less than 25% by mass, more preferably equal to or greater than 8.0% by mass and equal to or less than 18% by mass, and even more preferably equal to or greater than 10% by mass and equal to or less than 15% by mass.

In a case where the anionic dispersing agent constituting the aqueous ink jet composition contains plural types of compounds, for the content, a sum of contents of these plural types of compounds is adopted.

C.I. Disperse Yellow 54

The aqueous ink jet composition contains C.I. Disperse Yellow 54 as a disperse dye.

An average particle diameter of C.I. Disperse Yellow 54 in the aqueous ink jet composition is preferably equal to or greater than 50 nm and equal to or less than 250 nm, more preferably equal to or greater than 75 nm and equal to or less than 200 nm, and even more preferably equal to or greater than 100 nm and equal to or less than 150 nm.

Accordingly, storage stability of the aqueous ink jet composition is further improved. In addition, a recorded portion formed by using the aqueous ink jet composition can be more effectively sublimated, and application to sublimation printing can be more suitably achieved.

In the present specification, the average particle diameter refers to an average particle diameter on a volume basis unless otherwise specified. The average particle diameter can be obtained, for example, by measurement using Microtrac UPA (manufactured by Nikkiso CO., LTD.).

As commercially available products of C.I. Disperse Yellow 54, for example, Resolin Yellow 4GL (manufactured by Lanxess), Foron Yellow SE3GL (manufactured by Clariant), and the like are mentioned.

A content of C.I. Disperse Yellow 54 in the aqueous ink jet composition is preferably equal to or greater than 0.25% by mass and equal to or less than 25% by mass, more preferably equal to or greater than 0.5% by mass and equal to or less than 20% by mass, and even more preferably equal to or greater than 2.0% by mass and equal to or less than 15% by mass.

Accordingly, it is possible to obtain a higher color density in a recorded portion formed by using the aqueous ink jet composition, while further improving storage stability of the aqueous ink jet composition and more effectively preventing generation of weakly-flocculated bodies during long-term storage or the like.

In particular, in a case where the aqueous ink jet composition is an ink itself to be discharged by an ink jet method, a content of C.I. Disperse Yellow 54 in the ink is preferably equal to or greater than 0.25% by mass and equal to or less than 100/% by mass, more preferably equal to or greater than 0.5% by mass and equal to or less than 8.0% by mass, and even more preferably equal to or greater than 2.0% by mass and equal to or less than 5.0% by mass.

In addition, in a case where the aqueous ink jet composition is a stock solution used for preparing an ink to be discharged by an ink jet method, a content of C.I. Disperse Yellow 54 in the stock solution is preferably equal to or greater than 5.0% by mass and equal to or less than 25% by mass, more preferably equal to or greater than 8.0% by mass and equal to or less than 20% by mass, and even more preferably equal to or greater than 10% by mass and equal to or less than 15% by mass.

In the aqueous ink jet composition, in a case where a content of C.I. Disperse Yellow 54 is set as XD [% by mass] and a content of the substance A is set as XA [% by mass], it is preferable that a relationship of $0.03 \leq XA/XD \leq 1.0$ be satisfied, it is more preferable that a relationship of $0.04 \leq XA/XD \leq 0.8$ be satisfied, and it is even more preferable that a relationship of $0.05 \leq XA/XD \leq 0.7$ be satisfied.

Accordingly, storage stability of the aqueous ink jet composition is further improved, and generation of weakly-flocculated bodies during long-term storage or the like is more effectively prevented.

In the aqueous ink jet composition, in a case where a content of C.I. Disperse Yellow 54 is set as XD [% by mass] and a content of the anionic dispersing agent is set as XB [% by mass], it is preferable that a relationship of $0.3 \leq XB/XD \leq 1.0$ be satisfied, it is more preferable that a relationship $0.4 \leq XB/XD \leq 0.9$ be satisfied, and it is even more preferable that a relationship of $0.5 \leq XB/XD \leq 0.8$ be satisfied.

Accordingly, storage stability of the aqueous ink jet composition is further improved, and generation of weakly-flocculated bodies during long-term storage or the like is more effectively prevented.

In the aqueous ink jet composition, in a case where a content of the substance A is set as XA [% by mass] and a content of the anionic dispersing agent is set as XB [% by mass], it is preferable that a relationship of $0.03 \leq XA/XB \leq 1.2$ be satisfied, it is more preferable that a relationship of $0.1 \leq XA/XB \leq 1.0$ be satisfied, and it is more preferable that a relationship of $0.2 \leq XA/XB \leq 0.5$ be satisfied.

Accordingly, storage stability of the aqueous ink jet composition is further improved, and generation of weakly-flocculated bodies during long-term storage or the like is more effectively prevented.

Water

The aqueous ink jet composition contains water.

A content of water in the aqueous ink jet composition is not particularly limited. The content of water is preferably equal to or greater than 30% by mass and equal to or less than 85% by mass, more preferably equal to or greater than 35% by mass and equal to or less than 80% by mass, and even more preferably equal to or greater than 40% by mass and equal to or less than 75% by mass.

Accordingly, a viscosity of the aqueous ink jet composition can be more reliably adjusted to a suitable value, and discharge stability according to an ink jet method can be further improved.

Solvent Other than Water

The aqueous ink jet composition may contain a solvent other than water.

Accordingly, a viscosity of the aqueous ink jet composition can be suitably adjusted, and a moisture retaining property of the aqueous ink jet composition can be increased. As a result, liquid droplet discharge by an ink jet method can be performed in a more stable manner.

As the solvent other than water which is contained in the aqueous ink jet composition, for example, glycerin, propylene glycol, 2-pyrrolidone, and the like are mentioned.

By containing these solvents, a slow evaporation rate is achieved due to an excellent moisture retaining capability, which makes it possible to perform liquid droplet discharge in a more stable manner.

A content of the solvent other than water which is contained in the aqueous ink jet composition is preferably equal to or greater than 0% by mass and equal to or less than 45% by mass, more preferably equal to or greater than 10% by mass and equal to or less than 43% by mass, and even more preferably equal to or greater than 15% by mass and equal to or less than 40% by mass.

Accordingly, effects obtained by containing the solvent other than water as described above are exerted in a more remarkable manner.

Surfactant

The aqueous ink jet composition may contain a surfactant.

Accordingly, it is possible to achieve more suitable wettability of the aqueous ink jet composition with respect to a recording medium (base material), which is advantageous for obtaining better image quality.

As the surfactant contained in the aqueous ink jet composition, for example, various surfactants such as an anionic surfactant, a cationic surfactant, and a nonionic surfactant can be used.

More specifically, as the surfactant contained in the aqueous ink jet composition, for example, an acetylene-based surfactant, a silicone-based surfactant, a fluorine-based surfactant, and the like are mentioned.

In a case where the aqueous ink jet composition contains a silicone-based surfactant, it is possible to achieve more suitable wettability of the aqueous ink jet composition with respect to a recording medium (base material), and it is possible to form an image (recorded portion) with further excellent gradation properties.

In a case where the aqueous ink jet composition contains the silicone-based surfactant, a content of the silicone-based surfactant in the aqueous ink jet composition is preferably equal to or greater than 5.0 parts by mass and equal to or less than 150 parts by mass, more preferably equal to or greater than 7.0 parts by mass and equal to or less than 140 parts by mass, and even more preferably equal to or greater than 10 parts by mass and equal to or less than 70 parts by mass, with respect to 100 parts by mass of C.I. Disperse Yellow 54.

Accordingly, effects obtained by containing the silicone-based surfactant as described above are exerted in a more remarkable manner.

As commercially available silicone-based surfactants, for example, BYK-306, BYK-307, BYK-333, BYK-337, BYK-341, BYK-345, BYK-346, BYK-347, BYK-348, BYK-349, BYK-378 (all trade names, manufactured by BYK Chemie Japan), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (all trade names, manufactured by Shin-Etsu Chemical Co., Ltd.), and the like are mentioned.

Other Components

The aqueous ink jet composition may contain a component (another component) other than the components as described above.

As the other component, for example, a coloring agent other than C.I. Disperse Yellow 54, a dispersing agent other than the styrene maleic acid-based dispersing agent as described above, a penetrating agent such as triethylene glycol monomethyl ether, triethylene glycol monobutyl ether, diethylene glycol monomethyl ether, 1,2-hexanediol, 1,2-pentanediol, 1,2-butanediol, and 3-methyl-1,5-pentanediol, a pH adjusting agent, a chelating agent such as ethylenediamine tetraacetate (EDTA), an antiseptic or antifungal agent, an antirust agent, and the like are mentioned. As the antiseptic or antifungal agent, for example, a compound having an isothiazoline ring structure in a molecule can be suitably used.

A content (in a case where plural types of components are contained as the other component, the content is a sum of contents thereof) of the other component is preferably equal to or less than 6% by mass, and more preferably equal to or less than 4% by mass.

In particular, in a case where the aqueous ink jet composition of the invention contains a dispersing agent (another dispersing agent) other than the above-mentioned dispersing agents, a content of the dispersing agent (the other dispersing agent) is preferably equal to or less than 5% by mass, and more preferably equal to or less than 3% by mass.

Surface tension of the aqueous ink jet composition at 20° C. is preferably equal to or greater than 20 mN/m and equal to or less than 50 mN/m, more preferably equal to or greater than 21 mN/m and equal to or less than 40 mN/m, and even more preferably equal to or greater than 23 mN/m and equal to or less than 30 mN/m.

Accordingly, clogging in a nozzle of a discharge apparatus, which is caused by an ink jet method, becomes harder to occur, and discharge stability of the aqueous ink jet composition is further improved. In addition, even in a case where clogging in the nozzle occurs, recoverability achieved by making the nozzle capped (nozzle capping) can be made further excellent.

As the surface tension, a value measured by the Wilhelmy method can be adopted. For measurement of the surface tension, a surface tension meter (for example, CBVP-7, manufactured by Kyowa Interface Science Co., Ltd., and the like) can be used.

A viscosity of the aqueous ink jet composition at 20° C. is preferably equal to or greater than 2 mPa·s and equal to or less than 30 mPa·s, more preferably equal to or greater than 3 mPa·s and equal to or less than 20 mPa·s, and even more preferably equal to or greater than 4 mPa·s and equal to or less than 10 mPa·s.

Accordingly, discharge stability of the aqueous ink jet composition is further improved.

For the viscosity, measurement can be performed at 20° C. using a viscoelasticity tester (for example, MCR-300, manufactured by Physica) by raising Shear Rate from $10\ s^{-1}$ to $1,000\ s^{-1}$ and reading a viscosity at the time of Shear Rate 200.

The aqueous ink jet composition of the invention is usually applied to a recording apparatus by an ink jet method in a state of being held in a container such as a cartridge, a bag, and a tank. In other words, the recording apparatus according to the invention includes a container (an ink cartridge or the like) for holding the aqueous ink jet composition of the invention.

Recording Method

The aqueous ink jet composition of the invention can be applied, for example, to a direct printing method, a thermal transfer printing method (for example, sublimation printing), and the like, and can be suitably applied to the thermal transfer printing method from the viewpoint that C.I. Disperse Yellow 54 has sublimability.

As a recording method using the aqueous ink jet composition of the invention, an example of the thermal transfer printing method (sublimation printing) will be described below.

A recording method according to the present embodiment has an ink adhering step of adhering an aqueous ink jet composition to an intermediate transfer medium by an ink jet method and a transfer step of heating the intermediate transfer medium to which the aqueous ink jet composition has been adhered, to transfer, to a recording medium, C.I. Disperse Yellow 54 as a sublimable dye which is contained in the aqueous ink jet composition.

Ink Adhering Step

In the ink adhering step, the aqueous ink jet composition is adhered to the intermediate transfer medium by an ink jet method. Discharge of the aqueous ink jet composition by an ink jet method can be carried out using a known ink jet recording apparatus. As a discharge method, a piezo method, a method of discharging an ink by foams (bubbles) generated by heating the ink, or the like can be used. Among these, the piezo method is preferable from the viewpoints of difficulty in deterioration of the aqueous ink jet composition, and the like.

In the ink adhering step, an ink other than the aqueous ink jet composition according to the invention may be used in combination.

Intermediate Transfer Medium

As the intermediate transfer medium, for example, paper such as plain paper, a recording medium (referred to as ink jet special paper, coated paper, or the like) provided with an ink receiving layer, or the like can be used. Among these, paper provided with an ink receiving layer formed of inorganic fine particles such as silica is preferable. Accordingly, it is possible to obtain an intermediate transfer medium, in which bleeding or the like is suppressed, by a process of drying the aqueous ink jet composition which has been adhered to the intermediate transfer medium. In addition, in a subsequent transfer step, sublimation of C.I. Disperse Yellow 54 tends to progress more smoothly.

Transfer Step

Thereafter, the intermediate transfer medium to which the aqueous ink jet composition has been adhered is heated to transfer, to a recording medium, C.I. Disperse Yellow 54 as a constituent component of the aqueous ink jet composition. Accordingly, a recorded matter is obtained.

A heating temperature in the present step is preferably equal to or higher than 160° C. and equal to or lower than 220° C., and more preferably equal to or higher than 170° C. and equal to or lower than 200° C.

Accordingly, energy required for transfer can be further decreased, and productivity of the recorded matter can be further improved. In addition, a color developing property of the obtained recorded matter can be further improved.

A heating time in the present step varies depending on a heating temperature. The heating time is preferably equal to or longer than 30 seconds and equal to or shorter than 90 seconds, and more preferably equal to or longer than 45 seconds and equal to or shorter than 80 seconds.

Accordingly, energy required for transfer can be further decreased, and productivity of the recorded matter can be further improved. In addition, a color developing property of the obtained recorded matter can be further improved.

In addition, the present step may be carried out by heating a surface of the intermediate transfer medium, to which the aqueous ink jet composition has been adhered, in a state of being spaced apart at a certain distance from the recording medium and facing the same, or in a state of being in close contact with a surface of the recording medium. Preferably, the present step is carried out by heating the surface of the intermediate transfer medium, to which the aqueous ink jet composition has been adhered, in a state of being in close contact with the surface of the recording medium.

Accordingly, energy required for transfer can be further decreased, and productivity of the recorded matter can be further improved. In addition, a color developing property of the obtained recorded matter can be further improved.

Recording Medium

For the recording medium, there is no particular limitation thereto, and, for example, cloth (hydrophobic fiber cloth or the like), a resin (plastic) film, paper, glass, a metal, ceramics, and the like are mentioned. In addition, as the recording medium, an article having a three-dimensional shape such as a sheet shape, a spherical shape, and a rectangular parallelepiped shape may be used.

In a case where the recording medium is cloth, as fibers constituting the cloth, for example, polyester fibers, nylon fibers, triacetate fibers, diacetate fibers, polyamide fibers, a blended product obtained by using two or more types of these fibers, and the like are mentioned. In addition, blended products of these with recycled fibers such as rayon or natural fibers such as cotton, silk, and wool may be used.

In addition, in a case where the recording medium is a resin (plastic) film, as the resin (plastic) film, for example, a polyester film, a polyurethane film, a polycarbonate film, a polyphenylene sulfide film, a polyimide film, a polyamideimide film, and the like are mentioned.

The resin (plastic) film may be a stacked body in which a plurality of layers are stacked, or may be composed of a gradient material in which a material composition changes in a gradient manner.

Suitable embodiments of the invention have been described as above. However, the invention is not limited thereto.

For example, it is sufficient that the aqueous ink jet composition of the invention is used for discharge by an ink jet method. The aqueous ink jet composition of the invention may not be applied to the recording method as described above.

For example, the aqueous ink jet composition of the invention may be applied to a method having other further steps (pre-treatment step, intermediate treatment step, and post-treatment step) in addition to the above-described steps.

In this case, as the pre-treatment step, for example, a step of applying a coat layer to the recording medium, and the like are mentioned.

In addition, as the intermediate treatment step, for example, a step of preliminarily heating the recording medium, and the like are mentioned.

In addition, as the post-treatment step, for example, a step of washing the recording medium, and the like are mentioned.

In addition, the aqueous ink jet composition of the invention can also be suitably applied to sublimation transfer that does not use an intermediate transfer medium. As the sublimation transfer that does not use an intermediate transfer medium, for example, a method having a step of adhering the aqueous ink jet composition to an ink receiving layer of a recording medium (a film product or the like) by an ink jet method, in which the ink receiving layer is peelable and provided on the recording medium, a step of directly heating the recording medium provided with the ink receiving layer, to which the aqueous ink jet composition has been adhered, to perform sublimation and diffusion dyeing from the ink receiving layer to the recording medium at a lower layer side of the ink receiving layer, and a step of peeling the ink receiving layer from the recording medium, to obtain a recorded matter, and the like are mentioned.

Examples

Next, specific examples of the invention will be described.

[1] Preparation of Stock Solution (Aqueous Ink Jet Composition) for Producing Ink Jet Ink Example A2-1

First, C.I. Disperse Yellow 54 as a disperse dye, an ethylene oxide adduct of tristyrylphenol (a substance of Formula (2-4) in which $R^7$ is H and an average value of n is 60 (EO60)) as a substance A, a methylnaphthalene sulfonic acid formalin condensate Na (a substance of Formula (2-3) in which $R^6$ is —$CH_3$) as an anionic dispersing agent, and pure water were mixed in a proportion shown in Table 3, and the mixture was stirred with High Shear Mixer (manufactured by Silverson Machines, Inc.) at 3,000 rpm to produce a slurry. Thereafter, the produced slurry and glass beads having a diameter of 0.5 mm were stirred and dispersed in a bead mill (LMZ015, Ashizawa Finetech Ltd.) under water cooling, so that a stock solution for producing an ink jet ink as an aqueous ink jet composition was produced.

An average particle diameter of C.I. Disperse Yellow 54 in the stock solution for producing an ink jet ink was 150 nm.

(2-4)

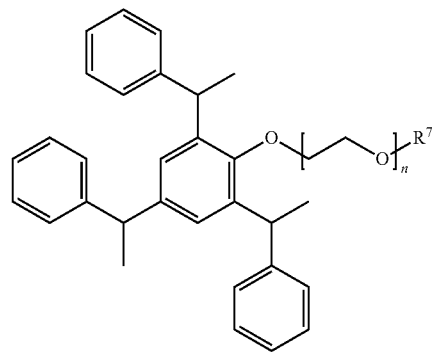

Examples A2-2 to A2-21

Stock solutions for producing ink jet inks as aqueous ink jet compositions were produced in the same manner as in Example A2-1, except that types of the substance A's and the anionic dispersing agents, and blending proportions of the respective components were as shown in Tables 2-1, 2-2, and 2-3.

Comparative Examples A2-1 to A2-5

Stock solutions for producing ink jet inks as aqueous ink jet compositions were produced in the same manner as in Example A2-1, except that types of the disperse dyes, the substance A's, and the anionic dispersing agents, and blending proportions of the respective components were as shown in Tables 2-1, 2-2, and 2-3.

Relationship between abbreviations and conditions for the substance A's used for preparing the aqueous ink jet compositions (stock solutions for producing ink jet inks) of the respective Examples and Comparative Examples is shown in Table 2-1, relationship between abbreviations and conditions for the dispersing agents is shown in Table 2-2, and compositions of the aqueous ink jet compositions (stock solutions for producing ink jet inks) of the respective Examples and Comparative Examples are shown in Table 2-3. In the tables, C.I. Disperse Yellow 54 is indicated as "DY54", C.I. Disperse Yellow 33 is indicated as "DY33", C.I. Disperse Yellow 42 is indicated as "DY42", a polycarboxylic acid-based activator (CARRYBON L-400, manufactured by Sanyo Chemical Industries, Ltd.) is indicated as "A1'", and polyoxyethylene sorbitan fatty acid ester (Sorbon T-40, manufactured by Toho Chemical Industry Co., Ltd.) as a dispersing agent (a nonionic dispersing agent) other than the anionic dispersing agent is indicated as "B1'". A2-3 as the substance A used in Example A2-3 and the like is represented by Formula (2-5). In addition, each of the stock solutions for producing ink jet inks of Examples A2-1 to A2-21 had a viscosity which is a value within a range of equal to or greater than 2.0 mPa·s and equal to or less than 30 mPa·s, and surface tension which is a value within a range of equal to or greater than 25 mN/m and equal to or less than 50 mN/m. For the viscosity, measurement was performed at 20° C. using a viscoelasticity tester MCR-300 (manufactured by Physica) by raising Shear Rate from 10 s$^{-1}$ to 1,000 s$^{-1}$ and reading a viscosity at the time of Shear Rate 200. In addition, for the surface tension, measurement was performed by the Wilhelmy method at 20° C. using a surface tension meter (CBVP-7, manufactured by Kyowa Interface Science Co., Ltd.).

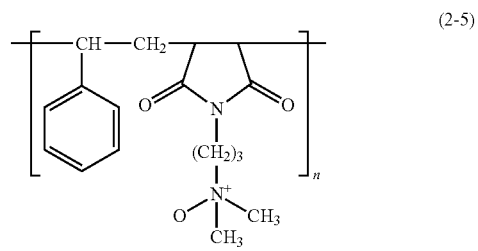

(2-5)

TABLE 2-1

| Abbreviation for substance A | Chemical formula | Condition in formula |
|---|---|---|
| A1 | Formula (4) | $R^7$ = H (average value of n is 60) |
| A2 | Formula (4) | $R^7$ = $SO_3H$ |
| A3 | Formula (1) (Formula (5)) | $R^1$ = $(CH_2)_3N^+(CH_3)_2O^-$ |
| A4 | Formula (2) | One of $R^2$ and $R^3$ is —OH, and the other is —$N(CH_2)_3N(CH_3)_2O^-$ |
| A5 | Formula (4) | $R^7$ = H (average value of n is 20) |

TABLE 2-2

| Abbreviation for anionic dispersing agent | Chemical formula or substance name | Condition in formula | Mw |
|---|---|---|---|
| B1 | Formula (3) | $R^6$ = $CH_3$ | 5,000 |
| B2 | Formula (3) | $R^6$ = $CH_2CH_3$ | 5,000 |
| B3 | Formula (3) | $R^6$ = $CH_2CH_2CH_3$ | 5,000 |
| B4 | Formula (3) | $R^6$ = $CH_2CH_2CH_2CH_3$ | 5,000 |
| B5 | Sodium salt of naphthalene sulfonic acid formalin condensate | — | 5,000 |
| B6 | Lignin sulfonic acid | — | 5,000 |

TABLE 2-3

| | Blending amount (parts by weight) | | | | | | | | | | | | | | | | | | |
|---|---|---|---|---|---|---|---|---|---|---|---|---|---|---|---|---|---|---|---|
| | Disperse dye | | | Substance A | | | | | Substance B | | | | | | Another component | | Pure | XA/ | | |
| | DY54 | DY33 | DY42 | A1 | A2 | A3 | A4 | A5 | B1 | B2 | B3 | B4 | B5 | B6 | A1' | B1' | water | XD | XB/XD | XA/XB |
| Example A2-1 | 15 | 0 | 0 | 1.5 | 0 | 0 | 0 | 0 | 15 | 0 | 0 | 0 | 0 | 0 | 0 | 0 | 68.5 | 0.1 | 1.00 | 0.10 |
| Example A2-2 | 15 | 0 | 0 | 0 | 3 | 0 | 0 | 0 | 12 | 0 | 0 | 0 | 0 | 0 | 0 | 0 | 70 | 0.2 | 0.80 | 0.25 |
| Example A2-3 | 15 | 0 | 0 | 0 | 0 | 2 | 0 | 0 | 7.5 | 0 | 0 | 0 | 0 | 0 | 0 | 0 | 71 | 0.13 | 0.50 | 0.26 |
| Example A2-4 | 15 | 0 | 0 | 0 | 0 | 0 | 3 | 0 | 0 | 15 | 0 | 0 | 0 | 0 | 0 | 0 | 67 | 0.20 | 1.00 | 0.20 |
| Example A2-5 | 15 | 0 | 0 | 0 | 6 | 0 | 0 | 0 | 0 | 5 | 0 | 0 | 0 | 0 | 0 | 0 | 64 | 0.33 | 0.33 | 1.20 |
| Example A2-6 | 25 | 0 | 0 | 0 | 5 | 0 | 0 | 0 | 0 | 25 | 0 | 0 | 0 | 0 | 0 | 0 | 45 | 0.13 | 1.00 | 0.20 |
| Example A2-7 | 20 | 0 | 0 | 0 | 4 | 0 | 0 | 0 | 0 | 20 | 0 | 0 | 0 | 0 | 0 | 0 | 56 | 0.13 | 1.00 | 0.20 |
| Example A2-8 | 15 | 0 | 0 | 5 | 0 | 0 | 0 | 0 | 15 | 0 | 0 | 0 | 0 | 0 | 0 | 0 | 65 | 0.33 | 1.00 | 0.33 |
| Example A2-9 | 10 | 0 | 0 | 5 | 0 | 0 | 0 | 0 | 10 | 0 | 0 | 0 | 0 | 0 | 0 | 0 | 75 | 0.5 | 1.00 | 0.50 |
| Example A2-10 | 5 | 0 | 0 | 5 | 0 | 0 | 0 | 0 | 5 | 0 | 0 | 0 | 0 | 0 | 0 | 0 | 85 | 1.0 | 1.00 | 1.00 |
| Example A2-11 | 15 | 0 | 0 | 0 | 0.5 | 0 | 0 | 0 | 15 | 0 | 0 | 0 | 0 | 0 | 0 | 0 | 69.95 | 0.03 | 1.00 | 0.03 |
| Example A2-12 | 15 | 0 | 0 | 0 | 0 | 1.75 | 0 | 0 | 10 | 0 | 0 | 0 | 0 | 0 | 0 | 0 | 73.25 | 0.12 | 0.67 | 0.18 |
| Example A2-13 | 15 | 0 | 0 | 0 | 0 | 2 | 0 | 0 | 10 | 0 | 0 | 0 | 0 | 0 | 0 | 0 | 73 | 0.13 | 0.67 | 0.20 |
| Example A2-14 | 15 | 0 | 0 | 0 | 0 | 0 | 4 | 0 | 0 | 8 | 0 | 0 | 0 | 0 | 0 | 0 | 73 | 0.27 | 0.53 | 0.50 |
| Example A2-15 | 20 | 0 | 0 | 0 | 0 | 0 | 0 | 1.5 | 0 | 12 | 0 | 0 | 0 | 0 | 0 | 0 | 66.5 | 0.08 | 0.60 | 0.13 |
| Example A2-16 | 15 | 0 | 0 | 0 | 5 | 0 | 0 | 0 | 0 | 0 | 5 | 0 | 0 | 0 | 0 | 0 | 72 | 0.33 | 0.33 | 1.00 |
| Example A2-17 | 15 | 0 | 0 | 4 | 0 | 0 | 0 | 0 | 0 | 0 | 10 | 0 | 0 | 0 | 0 | 0 | 71 | 0.27 | 0.67 | 0.40 |
| Example A2-18 | 15 | 0 | 0 | 0 | 0 | 0.8 | 0 | 0 | 10 | 0 | 0 | 0 | 0 | 0 | 0 | 0 | 74.2 | 0.05 | 0.67 | 0.08 |
| Example A2-19 | 15 | 0 | 0 | 0 | 0 | 0 | 0 | 8 | 0 | 10 | 0 | 0 | 0 | 0 | 0 | 0 | 67 | 0.53 | 0.67 | 0.80 |
| Example A2-20 | 15 | 0 | 0 | 4 | 0 | 0 | 0 | 0 | 0 | 0 | 0 | 10 | 0 | 0 | 0 | 0 | 71 | 0.27 | 0.67 | 0.40 |
| Example A2-21 | 15 | 0 | 0 | 0 | 2 | 0 | 0 | 0 | 0 | 0 | 0 | 0 | 10 | 0 | 0 | 0 | 73 | 0.13 | 0.67 | 0.20 |
| Comparative Example A2-1 | 0 | 15 | 0 | 1.5 | 0 | 0 | 0 | 0 | 15 | 0 | 0 | 0 | 0 | 0 | 0 | 0 | 68.5 | — | — | 0.10 |

TABLE 2-3-continued

| | Blending amount (parts by weight) | | | | | | | | | | | | | | | | | | |
|---|---|---|---|---|---|---|---|---|---|---|---|---|---|---|---|---|---|---|---|
| | Disperse dye | | | Substance A | | | | | Substance B | | | | | | Another component | | Pure | XA/ | |
| | DY54 | DY33 | DY42 | A1 | A2 | A3 | A4 | A5 | B1 | B2 | B3 | B4 | B5 | B6 | A1' | B1' | water | XD | XB/XD | XA/XB |
| Comparative Example A2-2 | 0 | 0 | 15 | 1.5 | 0 | 0 | 0 | 0 | 15 | 0 | 0 | 0 | 0 | 0 | 0 | 0 | 68.5 | — | — | 0.10 |
| Comparative Example A2-3 | 15 | 0 | 0 | 0 | 0 | 0 | 0 | 0 | 15 | 0 | 0 | 0 | 0 | 0 | 0 | 0 | 70 | 0 | 1.00 | 0 |
| Comparative Example A2-4 | 15 | 0 | 0 | 1.5 | 0 | 0 | 0 | 0 | 0 | 15 | 0 | 0 | 0 | 0 | 1.5 | 0 | 68.5 | 0 | 1.00 | 0 |
| Comparative Example A2-5 | 15 | 0 | 0 | 1.5 | 0 | 0 | 0 | 0 | 0 | 0 | 0 | 0 | 0 | 0 | 0 | 15 | 68.5 | 0.1 | 0 | — |

[2] Evaluation on Stock Solution for Producing Ink Jet Ink

[2-1] Storage Stability (Change in Particle Diameter)

For each of the aqueous ink jet compositions (stock solutions for producing ink jet inks) of the respective Examples and Comparative Examples, an average particle diameter of the disperse dye immediately after production and an average particle diameter of the disperse dye after being placed in a predetermined container and left to stand for one week in an environment of 60° C. were obtained. From these values, a variation rate of the average particle diameter of the disperse dye after being left to stand for one week in an environment of 60° C. with respect to the average particle diameter of the disperse dye immediately after production was obtained, and evaluation was performed according to the following criteria. For measurement of the average particle diameter, Microtrac UPA (manufactured by Nikkiso CO., LTD.) was used. It can be said that a larger variation rate of the average particle diameter indicates lower storage stability.

A: Variation rate of average particle diameter is less than 2%.

B: Variation rate of average particle diameter is equal to or greater than 2% and less than 5%.

C: Variation rate of average particle diameter is equal to or greater than 5% and less than 10%.

D: Variation rate of average particle diameter is equal to or greater than 10% and less than 15%.

E: Variation rate of average particle diameter is equal to or greater than 15%.

[2-2] Storage Stability (Change in Viscosity)

For each of the aqueous ink jet compositions (stock solutions for producing ink jet inks) of the respective Examples and Comparative Examples, a viscosity immediately after production and a viscosity after being placed in a predetermined container and left to stand for one week in an environment of 60° C. were obtained. From these values, a variation rate of the viscosity after being left to stand for one week in an environment of 60° C. with respect to the viscosity immediately after production was obtained, and evaluation was performed according to the following criteria. As a viscosity value, a value obtained using a viscoelasticity tester MCR-300 (manufactured by Physica) by raising Shear Rate from 10 s$^{-1}$ to 1,000 s$^{-1}$ at 20° C. and reading a viscosity at the time of Shear Rate 200 was adopted. It can be said that a larger variation rate of the viscosity indicates lower storage stability.

A: Variation rate of viscosity is less than 2%.

B: Variation rate of viscosity is equal to or greater than 2% and less than 5%.

C: Variation rate of viscosity is equal to or greater than 5% and less than 10%.

D: Variation rate of viscosity is equal to or greater than 10% and less than 15%.

E: Variation rate of viscosity is equal to or greater than 15%.

[2-3] Extent of Weak Flocculation

For each of the aqueous ink jet compositions (stock solutions for producing ink jet inks) of the respective Examples and Comparative Examples, immediately after production and after being placed in a predetermined container and left to stand for one week in an environment of 60° C., the number of particles having a particle diameter of equal to or greater than 0.5 μm and equal to or less than 40.0 μm was measured, at a 100-fold dilution with pure water, using a particle diameter and particle size distribution measuring device (FPIA-3000S, manufactured by Sysmex Corporation) in HPF measurement mode and standard photographing unit. From these values, a variation rate of the number of particles having a particle diameter of equal to or greater than 0.5 μm and equal to or less than 40.0 μm from immediately after production until a time point after being left to stand for one week in an environment of 60° C. was obtained, and evaluation was performed according to the following criteria. It can be said that a larger variation rate indicates more progression of formation of weakly-flocculated bodies.

A: Variation rate is less than 5%.

B: Variation rate is equal to or greater than 5% and less than 10%.

C: Variation rate is equal to or greater than 10% and less than 30%.

D: Variation rate is equal to or greater than 30% and less than 50%.

E: Variation rate is equal to or greater than 50%.

These results are summarized in Table 2-4.

TABLE 2-4

| | Storage stability | | Extent of weak flocculation |
|---|---|---|---|
| | Change in particle diameter | Change in viscosity | |
| Example A2-1 | A | A | A |
| Example A2-2 | A | A | A |
| Example A2-3 | A | A | A |
| Example A2-4 | B | B | B |
| Example A2-5 | D | D | D |
| Example A2-6 | D | D | D |
| Example A2-7 | B | B | B |
| Example A2-8 | A | A | A |

TABLE 2-4-continued

|  | Storage stability | | Extent of weak flocculation |
|---|---|---|---|
|  | Change in particle diameter | Change in viscosity |  |
| Example A2-9 | D | D | D |
| Example A2-10 | B | B | A |
| Example A2-11 | C | C | C |
| Example A2-12 | A | A | A |
| Example A2-13 | A | A | A |
| Example A2-14 | B | B | B |
| Example A2-15 | B | B | B |
| Example A2-16 | B | B | B |
| Example A2-17 | C | C | C |
| Example A2-18 | D | D | D |
| Example A2-19 | D | D | D |
| Example A2-20 | D | D | D |
| Example A2-21 | B | B | B |
| Comparative Example A2-1 | E | E | D |
| Comparative Example A2-2 | E | E | E |
| Comparative Example A2-3 | E | E | E |
| Comparative Example A2-4 | E | E | E |
| Comparative Example A2-5 | E | E | E |

As is apparent from Table 2-4, excellent results were obtained in the invention. On the contrary, satisfactory results were not obtained in the Comparative Examples.

[3] Preparation of Ink Jet Ink (Aqueous Ink Jet Composition)

Example B2-1

The stock solution for producing an ink jet ink prepared in Example A2-1, glycerin, 2-pyrrolidone, propylene glycol, BYK 348 (manufactured by BYK Chemie Japan) as a silicone-based surfactant, and pure water were mixed at a proportion as shown in Table 2-5, and the mixture was stirred with High Shear Mixer (manufactured by Silverson Machines, Inc.) at 3,000 rpm to produce an ink jet ink as an aqueous ink jet composition.

An average particle diameter of C.I. Disperse Yellow 54 in the ink jet ink was 150 nm.

Examples B2-2 to B2-19

Ink jet inks as aqueous ink jet compositions were produced in the same manner as in Example B2-1, except that types of the stock solutions for producing ink jet inks were as shown in Table 2-5 and blending proportions of the respective components were as shown in Table 2-5.

Comparative Examples B2-1 to B2-5

Ink jet inks as aqueous ink jet compositions were produced in the same manner as in Example B2-1, except that types of the stock solutions for producing ink jet inks were as shown in Table 2-5 and blending proportions of the respective components were as shown in Table 2-5.

Conditions for the aqueous ink jet compositions (ink jet inks) of the respective Examples and Comparative Examples are summarized in Table 2-5. In the tables, glycerin is indicated as "Gly", 2-pyrrolidone is indicated as "2-Py", propylene glycol is indicated as "PG", BYK 348 (manufactured by BYK Chemie Japan) as a silicone-based surfactant is indicated as "BYK 348", and Olfine EXP4300 (manufactured by Nissin Chemical Industry Co., Ltd.) as an acetylene-based surfactant is indicated as "EXP 4300". In addition, each of the ink jet inks of Examples B1 to B19 had a viscosity which is a value within a range of equal to or greater than 2.0 mPa·s and equal to or less than 5.0 mPa·s, and surface tension which is a value within a range of equal to or greater than 20 mN/m and equal to or less than 35 mN/m. For the viscosity, measurement was performed at 20° C. using a viscoelasticity tester MCR-300 (manufactured by Physica) by raising Shear Rate from 10 s$^{-1}$ to 1,000 s$^{-1}$ and reading a viscosity at the time of Shear Rate 200. In addition, for the surface tension, measurement was performed by the Wilhelmy method at 20° C. using a surface tension meter (CBVP-7, manufactured by Kyowa Interface Science Co., Ltd.).

TABLE 2-5

| | Stock solution | | Solvent other than water | | | Surfactant | | Pure water |
|---|---|---|---|---|---|---|---|---|
| | Type | | Gly | 2-Py | PG | BYK 348 | EXP 4300 | |
| Example B2-1 | Example A2-1 | 20.0 | 10.00 | 5.00 | 5.00 | 1.00 | 0 | 59.0 |
| Example B2-2 | Example A2-1 | 5.0 | 20.00 | 5.00 | 5.00 | 1.00 | 0 | 64.0 |
| Example B2-3 | Example A2-2 | 20.0 | 10.00 | 5.00 | 5.00 | 1.00 | 0 | 59.0 |
| Example B2-4 | Example A2-3 | 20.0 | 10.00 | 5.00 | 5.00 | 1.00 | 0 | 59.0 |
| Example B2-5 | Example A2-4 | 20.0 | 10.00 | 5.00 | 5.00 | 0 | 1.00 | 59.0 |
| Example B2-6 | Example A2-7 | 20.0 | 10.00 | 5.00 | 5.00 | 1.00 | 0 | 59.0 |
| Example B2-7 | Example A2-8 | 2.5 | 20.00 | 5.00 | 5.00 | 0 | 1.00 | 66.5 |
| Example B2-8 | Example A2-9 | 2.5 | 20.00 | 5.00 | 5.00 | 0 | 1.00 | 66.5 |
| Example B2-9 | Example A2-10 | 2.5 | 20.00 | 5.00 | 5.00 | 0 | 1.00 | 66.5 |
| Example B2-10 | Example A2-12 | 20.0 | 10.00 | 5.00 | 5.00 | 1.00 | 0 | 59.0 |
| Example B2-11 | Example A2-13 | 20.0 | 10.00 | 5.00 | 5.00 | 1.00 | 0 | 59.0 |
| Example B2-12 | Example A2-14 | 20.0 | 10.00 | 5.00 | 5.00 | 0 | 1.00 | 59.0 |
| Example B2-13 | Example A2-15 | 2.5 | 20.00 | 5.00 | 5.00 | 1.00 | 0 | 66.5 |
| Example B2-14 | Example A2-16 | 20.0 | 10.00 | 5.00 | 5.00 | 1.00 | 0 | 59.0 |
| Example B2-15 | Example A2-17 | 20.0 | 10.00 | 5.00 | 5.00 | 1.00 | 0 | 59.0 |
| Example B2-16 | Example A2-18 | 20.0 | 10.00 | 5.00 | 5.00 | 1.00 | 0 | 59.0 |
| Example B2-17 | Example A2-19 | 20.0 | 10.00 | 5.00 | 5.00 | 0 | 1.00 | 59.0 |
| Example B2-18 | Example A2-20 | 20.0 | 10.00 | 5.00 | 5.00 | 1.00 | 0 | 59.0 |
| Example B2-19 | Example A2-21 | 20.0 | 10.00 | 5.00 | 5.00 | 0 | 1.00 | 59.0 |
| Comparative Example B2-1 | Comparative Example A2-1 | 20.0 | 10.00 | 5.00 | 5.00 | 1.00 | 0 | 59.0 |
| Comparative Example B2-2 | Comparative Example A2-2 | 20.0 | 10.00 | 5.00 | 5.00 | 1.00 | 0 | 59.0 |

TABLE 2-5-continued

| | | Blending amount [parts by mass] | | | | | | |
|---|---|---|---|---|---|---|---|---|
| | Stock solution | | Solvent other than water | | | Surfactant | | Pure |
| | Type | | Gly | 2-Py | PG | BYK 348 | EXP 4300 | water |
| Comparative Example B2-3 | Comparative Example A2-3 | 20.0 | 10.00 | 5.00 | 5.00 | 1.00 | 0 | 59.0 |
| Comparative Example B2-4 | Comparative Example A2-4 | 5.0 | 20.00 | 5.00 | 5.00 | 1.00 | 0 | 64.0 |
| Comparative Example B2-5 | Comparative Example A2-5 | 20.0 | 10.00 | 5.00 | 5.00 | 1.00 | 0 | 59.0 |

[4] Evaluation on Ink Jet Ink

[4-1] Storage Stability (Change in Particle Diameter)

For each of the aqueous ink jet compositions (ink jet inks) of the respective Examples and Comparative Examples, an average particle diameter of the disperse dye immediately after production and an average particle diameter of the disperse dye after being placed in a predetermined ink-holding container and left to stand for one week in an environment of 60° C. were obtained. From these values, a variation rate of the average particle diameter of the disperse dye after being left to stand for one week in an environment of 60° C. with respect to the average particle diameter of the disperse dye immediately after production was obtained, and evaluation was performed according to the following criteria. For measurement of the average particle diameter, Microtrac UPA (manufactured by Nikkiso Co., Ltd.) was used. It can be said that a larger variation rate of the average particle diameter indicates lower storage stability and a larger adverse effect on discharge stability.

A: Variation rate of average particle diameter is less than 2%.

B: Variation rate of average particle diameter is equal to or greater than 2% and less than 5%.

C: Variation rate of average particle diameter is equal to or greater than 5% and less than 10%.

D: Variation rate of average particle diameter is equal to or greater than 10% and less than 15%.

E: Variation rate of average particle diameter is equal to or greater than 15%.

[4-2] Storage Stability (Change in Viscosity)

For each of the aqueous ink jet compositions (ink jet inks) of the respective Examples and Comparative Examples, a viscosity immediately after production and a viscosity after being placed in a predetermined ink-holding container and left to stand for one week in an environment of 60° C. were obtained. From these values, a variation rate of the viscosity after being left to stand for one week in an environment of 60° C. with respect to the viscosity immediately after production was obtained, and evaluation was performed according to the following criteria. As a viscosity value, a value obtained using a viscoelasticity tester MCR-300 (manufactured by Physica) by raising Shear Rate from 10 $s^{-1}$ to 1,000 $s^{-1}$ at 20° C. and reading a viscosity at the time of Shear Rate 200 was adopted. It can be said that a larger variation rate of the viscosity indicates lower storage stability and a larger adverse effect on discharge stability.

A: Variation rate of viscosity is less than 2%.

B: Variation rate of viscosity is equal to or greater than 2% and less than 5%.

C: Variation rate of viscosity is equal to or greater than 5% and less than 10%.

D: Variation rate of viscosity is equal to or greater than 10% and less than 15%.

E: Variation rate of viscosity is equal to or greater than 15%.

[4-3] Extent of Weak Flocculation

For each of the aqueous ink jet compositions (ink jet inks) of the respective Examples and Comparative Examples, immediately after production and after being placed in a predetermined ink-holding container and left to stand for one week in an environment of 60° C., the number of particles having a particle diameter of equal to or greater than 0.5 µm and equal to or less than 40.0 µm was measured, at a 100-fold dilution with pure water, using a particle diameter and particle size distribution measuring device (FPIA-3000S, manufactured by Sysmex Corporation) in HPF measurement mode and standard photographing unit. From these values, a variation rate of the number of particles having a particle diameter of equal to or greater than 0.5 µm and equal to or less than 40.0 µm from immediately after production until a time point after being left to stand for one week in an environment of 60° C. was obtained, and evaluation was performed according to the following criteria. It can be said that a larger variation rate indicates more progression of formation of weakly-flocculated bodies.

A: Variation rate is less than 5%.

B: Variation rate is equal to or greater than 5% and less than 10%.

C: Variation rate is equal to or greater than 10% and less than 30%.

D: Variation rate is equal to or greater than 30% and less than 50%.

E: Variation rate is equal to or greater than 50%.

[4-4] Evaluation on Liquid Passing (Flocculated Matters on Filter)

An ink cartridge for an ink jet printer (PX-H6000, manufactured by Seiko Epson Corporation) was filled with each of the aqueous ink jet compositions (ink jet inks) of the respective Examples and Comparative Examples. Then, the ink cartridge was mounted on an ink jet printer (PX-H6000, manufactured by Seiko Epson Corporation) to fill the ink jet printer.

Thereafter, solid printing was performed on an A4-sized recording medium (plain paper) at 300 sheets/day, and the ink jet printer was allowed to pause for a time when printing was not performed. In addition, replacing (refreshing) an ink existing in a head and an ink path for supplying an ink from an ink cartridge to the head with a new ink by sucking an ink in the head from a nozzle was carried out once a week. After 30 days, a coating rate of a filter member in the head by flocculated matters was calculated. It can be said that a larger coating rate indicates generation of more flocculated matters that have an adverse effect on droplet discharge.

A: Coating rate of filter member is less than 2%.

B: Coating rate of filter member is equal to or greater than 2% and less than 5%.

C: Coating rate of filter member is equal to or greater than 5% and less than 10%.

D: Coating rate of filter member is equal to or greater than 10% and less than 15%.

E: Coating rate of filter member is equal to or greater than 15%.

[4-5] Discharge Stability by Ink Jet Method

A predetermined ink-holding container was filled with each of the aqueous ink jet compositions (ink jet inks) of the respective Examples and Comparative Examples and was left to stand for 5 days in an environment of 60° C.

Thereafter, the holding container was mounted on a recording apparatus PX-H 6000 (manufactured by Seiko Epson Corporation), and the ink jet ink was discharged so that a solid pattern was adhered on TRANSJET Classic (manufactured by Cham Paper), which is an intermediate transfer medium, at a recording resolution of 1440×720 dpi. An operating environment of the recording apparatus (printer) was set at 40° C. and 20 RH %.

The number of times of nozzle omission at the time of recording 30 solid patterns on the intermediate transfer medium was examined, and evaluation was performed according to the following criteria.

A: Number of times of nozzle omission is 0.

B: Number of times of nozzle omission is equal to or greater than 1 and equal to or less than 9.

C: Number of times of nozzle omission is equal to or greater than 10 and equal to or less than 19.

D: Number of times of nozzle omission is equal to or greater than 20 and equal to or less than 29.

E: Number of times of nozzle omission is equal to or greater than 30.

[4-6] Color Developing Property (OD Value)

An adhesion side of aqueous ink jet composition on the thirtieth intermediate transfer medium to which the ink jet ink had been adhered in [4-5] was brought into close contact with cloth (polyester 100%, Amina, manufactured by Toray Industries, Inc.) which is a white recording medium. In this state, sublimation transfer was carried out by performing heating using a heat press machine (TP-608M, manufactured by Taiyo Seiki Co., Ltd.) at a condition of 180° C. and 60 seconds, so that each recorded matter was obtained.

For each recorded matter obtained, evaluation on color developing property was performed. Specifically, for each recorded matter obtained, an OD value was measured using a colorimeter (Gretag Macbeth Spectrolino, manufactured by X-Rite), and evaluation was performed according to the following criteria.

A: OD value is equal to or greater than 1.50.

B: OD value is equal to or greater than 1.45 and less than 1.50.

C: OD value is equal to or greater than 1.40 and less than 1.45.

D: OD value is equal to or greater than 1.35 and less than 1.40.

E: OD value is less than 1.35.

These results are summarized in Table 2-6.

TABLE 2-6

|  | Storage stability | | | | | |
|---|---|---|---|---|---|---|
|  | Change in particle diameter | Change in viscosity | Extent of weak flocculation | Evaluation on liquid passing | Discharge stability | Color developing property |
| Example B2-1 | A | A | A | A | A | A |
| Example B2-2 | B | C | B | B | C | E |
| Example B2-3 | A | A | A | A | A | A |
| Example B2-4 | A | B | A | A | B | A |
| Example B2-5 | B | B | B | B | B | A |
| Example B2-6 | B | B | B | B | B | A |
| Example B2-7 | C | C | C | C | B | E |
| Example B2-8 | D | D | D | D | D | E |
| Example B2-9 | D | D | D | D | D | E |
| Example B2-10 | A | A | A | A | A | A |
| Example B2-11 | A | A | A | A | A | A |
| Example B2-12 | B | B | B | B | B | A |
| Example B2-13 | C | B | C | C | B | E |
| Example B2-14 | B | B | B | B | B | A |
| Example B2-15 | C | C | C | C | B | A |
| Example B2-16 | D | D | D | D | D | A |
| Example B2-17 | D | D | D | D | D | A |
| Example B2-18 | D | D | D | D | D | A |
| Example B2-19 | D | D | D | D | D | A |
| Comparative Example B2-1 | D | C | D | D | B | E |
| Comparative Example B2-2 | D | D | D | D | B | E |
| Comparative Example B2-3 | E | E | E | E | C | A |
| Comparative Example B2-4 | E | E | E | E | D | E |
| Comparative Example B2-5 | E | E | E | E | C | A |

As is apparent from Table 2-6, excellent results were obtained in the invention. On the contrary, satisfactory results were not obtained in the Comparative Examples.

Hereinafter, a third suitable embodiment of the invention will be described in detail.

Aqueous Ink Jet Composition

Among various disperse dyes, C.I. Disperse Red 60 has features such as an excellent color developing property while having the following problems. That is, in a case where C.I. Disperse Red 60 is used as a constituent component of an aqueous ink jet composition in the related art, the C.I. Disperse Red 60 does not make it possible for the aqueous ink jet composition to have a sufficiently excellent storage stability, which remarkably causes generation of foreign matters and a problem that clogging occurs in a head filter or a nozzle during discharge by an ink jet method after long-term storage.

Therefore, the present inventor has conducted intensive studies aimed at providing an aqueous ink jet composition capable of effectively preventing occurrence of the problems as mentioned above while making full use of the features of C.I. Disperse Red 60.

As a result, the present inventor has reached the invention.

That is, the aqueous ink jet composition of the invention contains C.I. Disperse Red 60 and a styrene maleic acid-based dispersing agent represented by Formula (1).

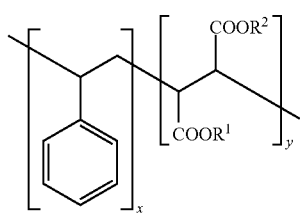

(1)

(In Formula (1), one of $R^1$ and $R^2$ is $-(CH_2CH_2O)_nR^3$ (where $R^3$ is H, $CH_3$, or $C_2H_5$, and n is an integer of equal to or greater than 1), $-CH_2CH(CH_3)_2$, or $-(CH_2)_3CH_3$, and the other is $-H$, $-(CH_2CH_2O)_nR^3$ (where $R^3$ is H, $CH_3$, or $C_2H_5$, and n is an integer of equal to or greater than 1), $-CH_2CH(CH_3)_2$, $-(CH_2)_3CH_3$, or a counterion constituting a salt, and x and y have a relationship such that when x is 1, y is equal to or greater than 0.2 and equal to or less than 1.0.)

With such a constitution, it is possible to provide an aqueous ink jet composition which has effects obtained by containing C.I. Disperse Red 60 that is a disperse dye having features such as an excellent color developing property in a low-temperature process due to a relatively small molecular weight, while hardly causing remarkable generation of foreign matters (in particular, crystalline foreign matters at a gas-liquid interface) and clogging in a head filter or a nozzle during discharge by an ink jet method, which are due to long-term storage.

On the contrary, in a case where the styrene maleic acid-based dispersing agent is not used, or in a case where another dispersing agent (for example, a dispersing agent other than a styrene maleic acid-based dispersing agent, a dispersing agent which is a styrene maleic acid-based dispersing agent but is other than the styrene maleic acid-based dispersing agent represented by the above formula, or the like) is used in place of the styrene maleic acid-based dispersing agent, the above-mentioned excellent effects cannot be obtained.

For example, in a case of Formula (1) in which there is a relationship such that when x is 1, y is less than 0.2, a maleic acid skeleton is small relative to a styrene skeleton, so that dispersion stability of C.I. Disperse Red 60 in the aqueous ink jet composition cannot be ensured and foreign matters are easily generated during long-term storage of the aqueous ink jet composition, or the like.

In addition, in a case of Formula (1) in which there is a relationship such that when x is 1, y is greater than 1.0, the styrene skeleton is small relative to the maleic acid skeleton, so that adsorptivity of the dispersing agent onto C.I. Disperse Red 60 is poor, and desorption of the dispersing agent easily occurs. Thus, foreign matters are easily generated during long-term storage of the aqueous ink jet composition, or the like.

In the present specification, the aqueous ink jet composition is a concept including not only an ink itself to be discharged by an ink jet method but also a stock solution used for preparing the ink. In other words, the aqueous ink jet composition of the invention may be subjected to discharge by an ink jet method as it is, or may be subjected to discharge by an ink jet method after treatments such as dilution.

Styrene Maleic Acid-Based Dispersing Agent

The aqueous ink jet composition of the invention contains a styrene maleic acid-based dispersing agent represented by Formula (1).

By using the styrene maleic acid-based dispersing agent in combination with C.I. Disperse Red 60, dispersion stability of C.I. Disperse Red 60 in the aqueous ink jet composition and storage stability of the aqueous ink jet composition can be made excellent, and remarkable generation of foreign matters and occurrence of clogging in a head filter or a nozzle during discharge by an ink jet method, which are due to long-term storage, can be effectively prevented. As a result, it is possible to stably perform discharge of the aqueous ink jet composition for a long period of time, and it is possible to keep quality of a recorded matter obtained by an ink jet method in a stable and excellent manner. In addition, the styrene maleic acid-based dispersing agent is a component which hardly causes an adverse effect on quality of a recorded matter and an adverse effect in sublimation printing.

As described above, the styrene maleic acid-based dispersing agent may have a counterion constituting a salt. As the counterion, for example, a divalent or higher ion such as an alkaline earth metal ion may be used. The counterion is preferably a monovalent ion.

As the monovalent ion, for example, ammonium, amines, an alkali metal, and the like are mentioned.

It is sufficient that n is an integer of equal to or greater than 1. n is preferably an integer of equal to or greater than 1 and equal to or less than 10, and more preferably an integer of equal to or greater than 1 and equal to or less than 5.

Accordingly, storage stability of the aqueous ink jet composition is further improved, and generation of foreign matters during long-term storage or the like is more effectively prevented.

As described above, it is sufficient that one of $R^1$ and $R^2$ is $-(CH_2CH_2O)_nR^3$ (where $R^3$ is H, $CH_3$, or $C_2H_5$, and n is an integer of equal to or greater than 1), $-CH_2CH(CH_3)_2$, or $-(CH_2)_3CH_3$, and the other is $-H$, $-(CH_2CH_2O)_nR^3$ (where $R^3$ is H, $CH_3$, or $C_2H_5$, and n is an integer of equal to or greater than 1), $-CH_2CH(CH_3)_2$, $-(CH_2)_3CH_3$, or a counterion constituting a salt. It is preferable that one be $-CH_2CH(CH_3)_2$ and the other be $-H$.

Accordingly, dispersion stability of C.I. Disperse Red 60 in the aqueous ink jet composition and storage stability of the aqueous ink jet composition can be made further excellent, and remarkable generation of foreign matters and occurrence of clogging in a head filter or a nozzle during discharge by an ink jet method, which are due to long-term storage, can be more effectively prevented. As a result, it is possible to more stably perform discharge of the aqueous ink jet composition for a long period of time, and it is possible to keep quality of a recorded matter obtained by an ink jet method in a more stable and excellent manner.

In addition, as described above, it is sufficient that a proportion between x and y satisfies a relationship such that when x is 1, y is equal to or greater than 0.2 and equal to or less than 1.0. It is preferable that when x is 1, a value of y be equal to or greater than 0.3 and equal to or less than 1.0, and it is more preferable that when x is 1, a value of y be equal to or greater than 0.4 and equal to or less than 1.0.

Accordingly, as for dispersion stability of C.I. Disperse Red 60, a ratio of hydrophilic groups to hydrophobic groups is made more suitable, and long-term stability of the aqueous ink jet composition is made further excellent.

A weight average molecular weight Mw of the styrene maleic acid-based dispersing agent is not particularly limited. The weight average molecular weight Mw is preferably equal to or greater than 7,000 and equal to or less than 20,000, more preferably equal to or greater than 8,000 and equal to or less than 18,000, and even more preferably equal to or greater than 10,000 and equal to or less than 15,000.

Accordingly, storage stability of the aqueous ink jet composition is further improved, and generation of foreign matters during long-term storage or the like is more effectively prevented.

The aqueous ink jet composition may contain two or more types of compounds represented by General Formula (1).

A content of the styrene maleic acid-based dispersing agent represented by Formula (1) in the aqueous ink jet composition is preferably equal to or greater than 0.1% by mass and equal to or less than 30% by mass, more preferably equal to or greater than 1.0% by mass and equal to or less than 25% by mass, and even more preferably equal to or greater than 2.0% by mass and equal to or less than 20% by mass.

Accordingly, storage stability of the aqueous ink jet composition is further improved, and generation of foreign matters during long-term storage or the like is more effectively prevented.

In particular, in a case where the aqueous ink jet composition is an ink itself to be discharged by an ink jet method, a content of the styrene maleic acid-based dispersing agent represented by Formula (1) in the ink is preferably equal to or greater than 0.1% by mass and equal to or less than 10% by mass, more preferably equal to or greater than 1.0% by mass and equal to or less than 9.0% by mass, and even more preferably equal to or greater than 2.0% by mass and equal to or less than 8.0% by mass.

In addition, in a case where the aqueous ink jet composition is a stock solution used for preparing an ink to be discharged by an ink jet method, a content of the styrene maleic acid-based dispersing agent represented by Formula (1) in the stock solution is preferably equal to or greater than 1.0% by mass and equal to or less than 30% by mass, more preferably equal to or greater than 2.0% by mass and equal to or less than 25% by mass, and even more preferably equal to or greater than 5.0% by mass and equal to or less than 20% by mass.

In a case where the aqueous ink jet composition contains two or more types of compounds represented by General Formula (1), for the content, a sum of contents of these plural types of compounds is adopted.

C.I. Disperse Red 60

The aqueous ink jet composition contains C.I. Disperse Red 60 as a disperse dye.

A content of C.I. Disperse Red 60 in the aqueous ink jet composition is preferably equal to or greater than 0.1% by mass and equal to or less than 30% by mass, more preferably equal to or greater than 2.0% by mass and equal to or less than 25% by mass, and even more preferably equal to or greater than 5.0% by mass and equal to or less than 20% by mass.

Accordingly, it is possible to obtain a higher color density in a recorded portion formed using the aqueous ink jet composition, while further improving storage stability of the aqueous ink jet composition and more effectively preventing generation of foreign matters during long-term storage or the like.

In addition, in the aqueous ink jet composition, in a case where a content of C.I. Disperse Red 60 is set as XD [% by mass] and a content of the styrene maleic acid-based dispersing agent is set as XM [% by mass], it is preferable that a relationship of $0.04 \leq XM/XD \leq 25$ be satisfied, it is more preferable that a relationship of $0.1 \leq XM/XD \leq 5.0$ be satisfied, and it is even more preferable that a relationship of $0.35 \leq XM/XD \leq 1.3$ be satisfied.

Accordingly, storage stability of the aqueous ink jet composition is further improved, and generation of foreign matters during long-term storage or the like is more effectively prevented.

An average particle diameter of C.I. Disperse Red 60 in the aqueous ink jet composition is preferably equal to or greater than 50 nm and equal to or less than 300 nm, more preferably equal to or greater than 75 nm and equal to or less than 250 nm or less, and even more preferably equal to or greater than 100 nm and equal to or less than 200 nm.

Accordingly, storage stability of the aqueous ink jet composition is further improved, and generation of foreign matters during long-term storage or the like is more effectively prevented. In addition, a recorded portion formed by using the aqueous ink jet composition can be more effectively sublimated, and application to sublimation printing can be more suitably achieved.

In the present specification, the average particle diameter refers to an average particle diameter on a volume basis unless otherwise specified. The average particle diameter can be obtained, for example, by measurement using Microtrac UPA (manufactured by Nikkiso CO., LTD.).

As commercially available products of C.I. Disperse Red 60, for example, Plast Red 8375 (manufactured by Arimoto Chemical Co., Ltd.) and the like are mentioned.

Water

The aqueous ink jet composition contains water.

A content of water in the aqueous ink jet composition is not particularly limited. The content of water is preferably equal to or greater than 30% by mass and equal to or less than 85% by mass, more preferably equal to or greater than 35% by mass and equal to or less than 80% by mass, and even more preferably equal to or greater than 40% by mass and equal to or less than 75% by mass.

Accordingly, a viscosity of the aqueous ink jet composition can be more reliably adjusted to a suitable value, and discharge stability according to an ink jet method can be further improved.

Solvent Other than Water

The aqueous ink jet composition may contain a solvent other than water.

Accordingly, a viscosity of the aqueous ink jet composition can be suitably adjusted, and a moisture retaining property of the aqueous ink jet composition can be increased. As a result, liquid droplet discharge by an ink jet method can be performed in a more stable manner.

As the solvent other than water which is contained in the aqueous ink jet composition, for example, glycerin, propylene glycol, 2-pyrrolidone, and the like are mentioned.

By containing these solvents, a slow evaporation rate is achieved due to an excellent moisture retaining capability, which makes it possible to perform liquid droplet discharge in a more stable manner.

A content of the solvent other than water which is contained in the aqueous ink jet composition is preferably equal to or greater than 0% by mass and equal to or less than 45% by mass, more preferably equal to or greater than 10% by mass and equal to or less than 43% by mass, and even more preferably equal to or greater than 15% by mass and equal to or less than 40% by mass.

Accordingly, effects obtained by containing the solvent other than water as described above are exerted in a more remarkable manner.

Surfactant

The aqueous ink jet composition may contain a surfactant.

Accordingly, it is possible to achieve more suitable wettability of the aqueous ink jet composition with respect to a recording medium (base material), which is advantageous for obtaining better image quality.

As the surfactant contained in the aqueous ink jet composition, for example, various surfactants such as an anionic surfactant, a cationic surfactant, and a nonionic surfactant can be used.

More specifically, as the surfactant contained in the aqueous ink jet composition, for example, an acetylene-based surfactant, a silicone-based surfactant, a fluorine-based surfactant, and the like are mentioned.

In a case where the aqueous ink jet composition contains the acetylene-based surfactant, dynamic surface tension of the aqueous ink jet composition can be suitably decreased, and quick orientation can be made with respect to meniscus. As a result, discharge stability according to an ink jet method can be made further excellent.

In a case where the aqueous ink jet composition contains the acetylene-based surfactant, a content of the acetylene-based surfactant in the aqueous ink jet composition is preferably equal to or greater than 5.0 parts by mass and equal to or less than 75 parts by mass, more preferably equal to or greater than 6.0 parts by mass and equal to or less than 50 parts by mass, and even more preferably equal to or greater than 7.0 parts by mass and equal to or less than 30 parts by mass, with respect to 100 parts by mass of C.I. Disperse Red 60.

Accordingly, effects obtained by containing the acetylene-based surfactant as described above are exerted in a more remarkable manner.

As commercially available acetylene-based surfactants, for example, Olfine E1004, Olfine E1010, Olfine E1020, Olfine PD-001, Olfine PD-002W, Olfine PD-004, Olfine PD-005, Olfine EXP4001, Olfine EXP4200, Olfine EXP4123, Olfine EXP4300, Olfine WE-001, Olfine WE-003 (all of which are manufactured by Nissin Chemical Industry Co., Ltd.), and the like are mentioned.

Other Components

The aqueous ink jet composition may contain a component (another component) other than the components as described above.

As the other component, for example, a coloring agent other than C.I. Disperse Red 60, a dispersing agent other than the styrene maleic acid-based dispersing agent as described above, a penetrating agent such as triethylene glycol monomethyl ether, triethylene glycol monobutyl ether, diethylene glycol monomethyl ether, 1,2-hexanediol, 1,2-pentanediol, 1,2-butanediol, and 3-methyl-1,5-pentanediol, a pH adjusting agent, a chelating agent such as ethylenediamine tetraacetate (EDTA), an antiseptic or antifungal agent, an antirust agent, and the like are mentioned. As the antiseptic or antifungal agent, for example, a compound having an isothiazoline ring structure in a molecule can be suitably used.

A content (in a case where plural types of components are contained as the other component, the content is a sum of contents thereof) of the other component is preferably equal to or less than 6% by mass, and more preferably equal to or less than 5% by mass.

In particular, in a case where the aqueous ink jet composition of the invention contains a dispersing agent (another dispersing agent) other than the styrene maleic acid-based dispersing agent as described above, a content of the dispersing agent (the other dispersing agent) is preferably equal to or less than 5% by mass, and more preferably equal to or less than 3% by mass.

Surface tension of the aqueous ink jet composition at 25° C. is preferably equal to or greater than 20 mN/m and equal to or less than 50 mN/m, more preferably equal to or greater than 21 mN/m and equal to or less than 40 mN/m, and even more preferably equal to or greater than 23 mN/m and equal to or less than 30 mN/m.

Accordingly, clogging in a nozzle of a discharge apparatus, which is caused by an ink jet method, becomes harder to occur, and discharge stability of the aqueous ink jet composition is further improved. In addition, even in a case where clogging in the nozzle occurs, recoverability achieved by making the nozzle capped (nozzle capping) can be made further excellent.

As the surface tension, a value measured by the Wilhelmy method can be adopted. For measurement of the surface tension, a surface tension meter (for example, CBVP-7, manufactured by Kyowa Interface Science Co., Ltd., and the like) can be used.

A viscosity of the aqueous ink jet composition at 25° C. is preferably equal to or greater than 2 mPa·s and equal to or less than 30 mPa·s, more preferably equal to or greater than 3 mPa·s and equal to or less than 20 mPa·s, and even more preferably equal to or greater than 4 mPa·s and equal to or less than 10 mPa·s.

Accordingly, discharge stability of the aqueous ink jet composition is further improved.

For the viscosity, measurement can be performed at 25° C. using a viscoelasticity tester (for example, MCR-300, manufactured by Physica) by raising Shear Rate from 10 s$^{-1}$ to 1,000 s$^{-1}$ and reading a viscosity at the time of Shear Rate 200.

The aqueous ink jet composition of the invention is usually applied to a recording apparatus by an ink jet method in a state of being held in a container such as a cartridge, a bag, and a tank. In other words, the recording apparatus according to the invention includes a container (an ink cartridge or the like) for holding the aqueous ink jet composition of the invention.

It is sufficient that the aqueous ink jet composition of the invention is an ink to be discharged by an ink jet method or a stock solution used for preparing the ink. A specific configuration of an apparatus for carrying out liquid droplet discharge is not limited. It is preferable that the aqueous ink jet composition of the invention be a composition (including a stock solution) which is applied to an open-to-atmosphere type recording apparatus (more specifically, for example, an ink jet recording apparatus which includes an ink-holding container provided with an ink pour that allows refill of an ink and a recording head having a nozzle hole for discharging the ink).

In such a recording apparatus, in a case where an ink containing C.I. Disperse Red 60 is applied thereto, there is a problem that generation of foreign matters (in particular, crystalline foreign matters) at the gas-liquid interface is particularly likely to occur due to contact of the ink with the atmosphere. However, according to the invention, even in a case of being applied to such a recording apparatus, it is possible to effectively prevent occurrence of such a problem. That is, in a case of being applied to an open-to-atmosphere type recording apparatus, effects of the invention are exerted in a more remarkable manner.

Recording Method

The aqueous ink jet composition of the invention can be applied, for example, to a direct printing method, a thermal transfer printing method (for example, sublimation printing), and the like, and can be suitably applied to the thermal transfer printing method from the viewpoint that C.I. Disperse Red 60 has sublimability.

An example of the thermal transfer printing method (sublimation printing) will be described below as a recording method using the aqueous ink jet composition of the invention.

The recording method according to the present embodiment has an ink adhering step of adhering the aqueous ink jet composition to an intermediate transfer medium by an ink jet method and a transfer step of heating the intermediate transfer medium to which the aqueous ink jet composition has been adhered, to transfer, to a recording medium, C.I. Disperse Red 60 as a sublimable dye which is contained in the aqueous ink jet composition.

Ink Adhering Step

In the ink adhering step, the aqueous ink jet composition is adhered to the intermediate transfer medium by an ink jet method. Discharge of the aqueous ink jet composition by an ink jet method can be carried out using a known ink jet recording apparatus. As a discharge method, a piezo method, a method of discharging an ink by foams (bubbles) generated by heating the ink, or the like can be used. Among these, the piezo method is preferable from the viewpoints of difficulty in deterioration of the aqueous ink jet composition, and the like.

In the ink adhering step, an ink other than the aqueous ink jet composition according to the invention may be used in combination.

Intermediate Transfer Medium

As the intermediate transfer medium, for example, paper such as plain paper, a recording medium (referred to as ink jet special paper, coated paper, or the like) provided with an ink receiving layer, or the like can be used. Among these, paper provided with an ink receiving layer formed of inorganic fine particles such as silica is preferable. Accordingly, it is possible to obtain an intermediate transfer medium, in which bleeding or the like is suppressed, by a process of drying the aqueous ink jet composition which has been adhered to the intermediate transfer medium. In addition, in a subsequent transfer step, sublimation of C.I. Disperse Red 60 tends to progress more smoothly.

Transfer Step

Thereafter, the intermediate transfer medium to which the aqueous ink jet composition has been adhered is heated to transfer, to a recording medium, C.I. Disperse Red 60 as a constituent component of the aqueous ink jet composition. Accordingly, a recorded matter is obtained.

A heating temperature in the present step is preferably equal to or higher than 160° C. and equal to or lower than 220° C., and more preferably equal to or higher than 170° C. and equal to or lower than 200° C.

Accordingly, energy required for transfer can be further decreased, and productivity of the recorded matter can be further improved. In addition, a color developing property of the obtained recorded matter can be further improved.

A heating time in the present step varies depending on a heating temperature. The heating time is preferably equal to or longer than 30 seconds and equal to or shorter than 90 seconds, and more preferably equal to or longer than 45 seconds and equal to or shorter than 80 seconds.

Accordingly, energy required for transfer can be further decreased, and productivity of the recorded matter can be further improved. In addition, a color developing property of the obtained recorded matter can be further improved.

In addition, the present step may be carried out by heating a surface of the intermediate transfer medium, to which the aqueous ink jet composition has been adhered, in a state of being spaced apart at a certain distance from the recording medium and facing the same, or in a state of being in close contact with a surface of the recording medium. Preferably, the present step is carried out by heating the surface of the intermediate transfer medium, to which the aqueous ink jet composition has been adhered, in a state of being in close contact with the surface of the recording medium.

Accordingly, energy required for transfer can be further decreased, and productivity of the recorded matter can be further improved. In addition, a color developing property of the obtained recorded matter can be further improved.

Recording Medium

For the recording medium, there is no particular limitation thereto, and, for example, cloth (hydrophobic fiber cloth or the like), a resin (plastic) film, paper, glass, a metal, ceramics, and the like are mentioned. In addition, as the recording medium, an article having a three-dimensional shape such as a sheet shape, a spherical shape, and a rectangular parallelepiped shape may be used.

In a case where the recording medium is cloth, as fibers constituting the cloth, for example, polyester fibers, nylon fibers, triacetate fibers, diacetate fibers, polyamide fibers, a blended product obtained by using two or more types of these fibers, and the like are mentioned. In addition, blended products of these with recycled fibers such as rayon or natural fibers such as cotton, silk, and wool may be used.

In addition, in a case where the recording medium is a resin (plastic) film, as the resin (plastic) film, for example, a polyester film, a polyurethane film, a polycarbonate film, a polyphenylene sulfide film, a polyimide film, a polyamideimide film, and the like are mentioned.

The resin (plastic) film may be a stacked body in which a plurality of layers are stacked, or may be composed of a gradient material in which a material composition changes in a gradient manner.

Suitable embodiments of the invention have been described as above. However, the invention is not limited thereto.

For example, it is sufficient that the aqueous ink jet composition of the invention is used for discharge by an ink jet method. The aqueous ink jet composition of the invention may not be applied to the recording method as described above.

For example, the aqueous ink jet composition of the invention may be applied to a method having other further steps (pre-treatment step, intermediate treatment step, and post-treatment step) in addition to the above-described steps.

In this case, as the pre-treatment step, for example, a step of applying a coat layer to the recording medium, and the like are mentioned.

In addition, as the intermediate treatment step, for example, a step of preliminarily heating the recording medium, and the like are mentioned.

In addition, as the post-treatment step, for example, a step of washing the recording medium, and the like are mentioned.

In addition, the aqueous ink jet composition of the invention can also be suitably applied to sublimation transfer that does not use an intermediate transfer medium. As the sublimation transfer that does not use an intermediate transfer medium, for example, a method having a step of adhering the aqueous ink jet composition to an ink receiving layer of a recording medium (a film product or the like) by an ink jet method, in which the ink receiving layer is peelable and provided on the recording medium, a step of directly heating the recording medium provided with the ink receiving layer, to which the aqueous ink jet composition has been adhered, to perform sublimation and diffusion dyeing from the ink receiving layer to the recording medium at a lower layer side of the ink receiving layer, and a step of peeling the ink receiving layer from the recording medium, to obtain a recorded matter, and the like are mentioned.

Examples

Next, specific examples of the invention will be described.

[1] Preparation of Stock Solution (Aqueous Ink Jet Composition) for Producing Ink Jet Ink Example A3-1

First, C.I. Disperse Red 60 as a disperse dye, a styrene maleic acid-based dispersing agent represented by Formula (1) (which is a compound of Formula (1) having a relationship such that one of $R^1$ and $R^2$ is —H, and the other is —$CH_2CH(CH_3)_2$, and when x is 1, y is 1, and having a weight average molecular weight Mw of 13,000), and pure water were mixed in a proportion shown in Table 3-2, and the mixture was stirred with High Shear Mixer (manufactured by Silverson Machines, Inc.) at 3,000 rpm to produce a slurry. Thereafter, the produced slurry and glass beads having a diameter of 0.5 mm were stirred and dispersed in a bead mill (LMZ015, Ashizawa Finetech Ltd.) under water cooling, so that a stock solution for producing an ink jet ink as an aqueous ink jet composition was produced.

An average particle diameter of C.I. Disperse Red 60 in the stock solution for producing an ink jet ink was 150 nm.

Examples A3-2 to A3-21

Stock solutions for producing ink jet inks as aqueous ink jet compositions were produced in the same manner as in Example A3-1, except that chemical structures of the styrene maleic acid-based dispersing agents and blending proportions of the respective components were as shown in Tables 3-1 and 3-2.

Comparative Examples A3-1 to A3-9

Stock solutions for producing ink jet inks as aqueous ink jet compositions were produced in the same manner as in Example A3-1, except that types of the disperse dyes, types of the dispersing agents, and blending proportions of the respective components were as shown in Tables 3-1 and 3-2.

Relationship between abbreviations and conditions for dispersing agents used for preparing the aqueous ink jet compositions (stock solutions for producing ink jet inks) of the respective Examples and Comparative Examples is shown in Table 3-1, and compositions of the aqueous ink jet compositions (stock solutions for producing ink jet inks) of the respective Examples and Comparative Examples are shown in Table 3-2. In the tables, C.I. Disperse Red 60 is indicated as "DR60", C.I. Disperse Red 153 is indicated as "DR153", C.I. Disperse Red 167 is indicated as "DR167", J-67 (manufactured by BASF SE) as a dispersing agent other than the styrene maleic acid-based dispersing agent is indicated as "H6", and X310 (manufactured by SEIKO PMC CORPORATION) as a dispersing agent other than the styrene maleic acid-based dispersing agent is indicated as "H7". In addition, each of the stock solutions for producing ink jet inks of Examples A3-1 to A3-21 had a viscosity which is a value within a range of equal to or greater than 2.0 mPa·s and equal to or less than 30 mPa·s, and surface tension which is a value within a range of equal to or greater than 25 mN/m and equal to or less than 50 mN/m. For the viscosity, measurement was performed at 25° C. using a viscoelasticity tester MCR-300 (manufactured by Physica) by raising Shear Rate from 10 $s^{-1}$ to 1,000 $s^{-1}$ and reading a viscosity at the time of Shear Rate 200. In addition, for the surface tension, measurement was performed by the Wilhelmy method at 25° C. using a surface tension meter (CBVP-7, manufactured by Kyowa Interface Science Co., Ltd.).

TABLE 3-1

| Abbreviation for dispersing agent | Combination of $R^1$ and $R^2$ | Value of y when x = 1 | Mw |
|---|---|---|---|
| SM1 | —H, —$CH_2CH(CH_3)_2$ | 1 | 13,000 |
| SM2 | —H, —$(CH_2CH_2O)_3CH_2CH_3$ | 1 | 13,000 |
| SM3 | —H, —$(CH_2CH_2O)H$ | 1 | 13,000 |
| SM4 | —H, —$(CH_2CH_2O)_3H$ | 1 | 13,000 |
| SM5 | —H, —$(CH_2CH_2O)_5H$ | 1 | 13,000 |
| SM6 | —H, —$(CH_2CH_2O)_3CH_3$ | 1 | 13,000 |
| SM7 | —H, —$(CH_2)_3CH_3$ | 1 | 13,000 |
| SM8 | —H, $(CH_2CH_2O)_2CH_2CH_3$ | 1 | 13,000 |
| SM9 | —H, $CH_2CH(CH_3)_2$ | 1 | 6,000 |
| SM10 | —H, $CH_2CH(CH_3)_2$ | 1 | 21,000 |
| SM11 | —H, $CH_2CH(CH_3)_2$ | 0.2 | 13,000 |
| H1 | —H, —H | 1 | 13,000 |
| H2 | —Na, —Na | 1 | 13,000 |
| H3 | —$C_2H_5$, —$C_2H_5$ | 1 | 13,000 |
| H4 | —H, $CH_2CH(CH_3)_2$ | 0.1 | 13,000 |
| H5 | —H, $CH_2CH(CH_3)_2$ | 1.1 | 13,000 |
| H6 | J-67 (BASF SE) | | 12,500 |
| H7 | X310 (SEIKO PMC CORPORATION) | | 14,000 |

TABLE 3-2

| | Blending amount [parts by mass] | | | | | | | | | | | | | | Blending amount [parts by mass] | | | | | | | | | | |
| --- | --- | --- | --- | --- | --- | --- | --- | --- | --- | --- | --- | --- | --- | --- | --- | --- | --- | --- | --- | --- | --- | --- | --- | --- | --- |
| | Disperse dye | | | Dispersing agent | | | | | | | | | | | Dispersing agent | | | | | | | | | Pure | |
| | DR60 | DR153 | DR167 | SM1 | SM2 | SM3 | SM4 | SM5 | SM6 | SM7 | SM8 | SM9 | | | SM10 | SM11 | H1 | H2 | H3 | H4 | H5 | H6 | H7 | water | XM/XD |
| Example A3-1 | 15.0 | 0 | 0 | 15.0 | 0 | 0 | 0 | 0 | 0 | 0 | 0 | 0 | | | 0 | 0 | 0 | 0 | 0 | 0 | 0 | 0 | 0 | 70.0 | 1.00 |
| Example A3-2 | 15.0 | 0 | 0 | 7.5 | 0 | 0 | 0 | 0 | 0 | 0 | 0 | 0 | | | 0 | 0 | 0 | 0 | 0 | 0 | 0 | 0 | 0 | 77.5 | 0.50 |
| Example A3-3 | 15.0 | 0 | 0 | 0 | 7.5 | 0 | 0 | 0 | 0 | 0 | 0 | 0 | | | 0 | 0 | 0 | 0 | 0 | 0 | 0 | 0 | 0 | 77.5 | 0.50 |
| Example A3-4 | 15.0 | 0 | 0 | 0 | 0 | 7.5 | 0 | 0 | 0 | 0 | 0 | 0 | | | 0 | 0 | 0 | 0 | 0 | 0 | 0 | 0 | 0 | 77.5 | 0.50 |
| Example A3-5 | 15.0 | 0 | 0 | 0 | 0 | 0 | 7.5 | 0 | 0 | 0 | 0 | 0 | | | 0 | 0 | 0 | 0 | 0 | 0 | 0 | 0 | 0 | 77.5 | 0.50 |
| Example A3-6 | 15.0 | 0 | 0 | 0 | 0 | 0 | 0 | 7.5 | 0 | 0 | 0 | 0 | | | 0 | 0 | 0 | 0 | 0 | 0 | 0 | 0 | 0 | 77.5 | 0.50 |
| Example A3-7 | 15.0 | 0 | 0 | 0 | 0 | 0 | 0 | 0 | 7.5 | 0 | 0 | 0 | | | 0 | 0 | 0 | 0 | 0 | 0 | 0 | 0 | 0 | 77.5 | 0.50 |
| Example A3-8 | 30.0 | 0 | 0 | 15.0 | 0 | 0 | 0 | 0 | 0 | 0 | 0 | 0 | | | 0 | 0 | 0 | 0 | 0 | 0 | 0 | 0 | 0 | 55.0 | 0.50 |
| Example A3-9 | 35.0 | 0 | 0 | 17.5 | 0 | 0 | 0 | 0 | 0 | 0 | 0 | 0 | | | 0 | 0 | 0 | 0 | 0 | 0 | 0 | 0 | 0 | 47.5 | 0.50 |
| Example A3-10 | 7.5 | 0 | 0 | 15.0 | 0 | 0 | 0 | 0 | 0 | 0 | 0 | 0 | | | 0 | 0 | 0 | 0 | 0 | 0 | 0 | 0 | 0 | 77.5 | 2.00 |
| Example A3-11 | 15.0 | 0 | 0 | 30.0 | 0 | 0 | 0 | 0 | 0 | 0 | 0 | 0 | | | 0 | 0 | 0 | 0 | 0 | 0 | 0 | 0 | 0 | 55.0 | 2.00 |
| Example A3-12 | 17.5 | 0 | 0 | 35.0 | 0 | 0 | 0 | 0 | 0 | 0 | 0 | 0 | | | 0 | 0 | 0 | 0 | 0 | 0 | 0 | 0 | 0 | 47.5 | 2.00 |
| Example A3-13 | 30.0 | 0 | 0 | 30.0 | 0 | 0 | 0 | 0 | 0 | 0 | 0 | 0 | | | 0 | 0 | 0 | 0 | 0 | 0 | 0 | 0 | 0 | 40.0 | 1.00 |
| Example A3-14 | 35.0 | 0 | 0 | 35.0 | 0 | 0 | 0 | 0 | 0 | 0 | 0 | 0 | | | 0 | 0 | 0 | 0 | 0 | 0 | 0 | 0 | 0 | 30.0 | 1.00 |
| Example A3-15 | 15.0 | 0 | 0 | 0 | 0 | 0 | 0 | 0 | 0 | 7.5 | 0 | 0 | | | 0 | 0 | 0 | 0 | 0 | 0 | 0 | 0 | 0 | 77.5 | 0.50 |
| Example A3-16 | 15.0 | 0 | 0 | 0 | 0 | 0 | 0 | 0 | 0 | 0 | 7.5 | 0 | | | 0 | 0 | 0 | 0 | 0 | 0 | 0 | 0 | 0 | 77.5 | 0.50 |
| Example A3-17 | 15.0 | 0 | 0 | 0 | 0 | 0 | 0 | 0 | 0 | 0 | 0 | 7.5 | | | 0 | 0 | 0 | 0 | 0 | 0 | 0 | 0 | 0 | 77.5 | 0.50 |
| Example A3-18 | 15.0 | 0 | 0 | 0 | 0 | 0 | 0 | 0 | 0 | 0 | 0 | 0 | | | 7.5 | 0 | 0 | 0 | 0 | 0 | 0 | 0 | 0 | 77.5 | 0.50 |
| Example A3-19 | 15.0 | 0 | 0 | 0 | 20 | 0 | 0 | 0 | 0 | 0 | 0 | 0 | | | 0 | 0 | 0 | 0 | 0 | 0 | 0 | 0 | 0 | 77.5 | 1.33 |
| Example A3-20 | 15.0 | 0 | 0 | 0 | 5 | 0 | 0 | 0 | 0 | 0 | 0 | 0 | | | 0 | 0 | 0 | 0 | 0 | 0 | 0 | 0 | 0 | 77.5 | 0.33 |
| Example A3-21 | 15.0 | 0 | 0 | 0 | 0 | 0 | 0 | 0 | 0 | 0 | 0 | 0 | | | 0 | 7.5 | 0 | 0 | 0 | 0 | 0 | 0 | 0 | 77.5 | 0.50 |
| Comparative Example A3-1 | 0 | 15.0 | 0 | 7.5 | 0 | 0 | 0 | 0 | 0 | 0 | 0 | 0 | | | 0 | 0 | 0 | 0 | 0 | 0 | 0 | 0 | 0 | 77.5 | — |
| Comparative Example A3-2 | 0 | 0 | 15.0 | 7.5 | 0 | 0 | 0 | 0 | 0 | 0 | 0 | 0 | | | 0 | 0 | 0 | 0 | 0 | 0 | 0 | 0 | 0 | 77.5 | — |
| Comparative Example A3-3 | 15.0 | 0 | 0 | 0 | 0 | 0 | 0 | 0 | 0 | 0 | 0 | 0 | | | 0 | 0 | 7.5 | 0 | 0 | 0 | 0 | 0 | 0 | 77.5 | — |
| Comparative Example A3-4 | 15.0 | 0 | 0 | 0 | 0 | 0 | 0 | 0 | 0 | 0 | 0 | 0 | | | 0 | 0 | 0 | 0 | 0 | 0 | 0 | 0 | 0 | | |
| Comparative Example A3-5 | 15.0 | 0 | 0 | 0 | 0 | 0 | 0 | 0 | 0 | 0 | 0 | 0 | | | 0 | 0 | 0 | 0 | 0 | 0 | 0 | 0 | 0 | | |
| Comparative Example A3-6 | 15.0 | 0 | 0 | 0 | 0 | 0 | 0 | 0 | 0 | 0 | 0 | 0 | | | 0 | 0 | 0 | 0 | 0 | 0 | 0 | 0 | 0 | | |
| Comparative Example A3-7 | 15.0 | 0 | 0 | 0 | 0 | 0 | 0 | 0 | 0 | 0 | 0 | 0 | | | 0 | 0 | 0 | 0 | 0 | 0 | 0 | 0 | 0 | | |
| Comparative Example A3-8 | 15.0 | 0 | 0 | 0 | 0 | 0 | 0 | 0 | 0 | 0 | 0 | 0 | | | 0 | 0 | 0 | 0 | 0 | 0 | 0 | 0 | 0 | | |
| Comparative Example A3-9 | 15.0 | 0 | 0 | 0 | 0 | 0 | 0 | 0 | 0 | 0 | 0 | 0 | | | 0 | 0 | 0 | 0 | 0 | 0 | 0 | 0 | 0 | | |

TABLE 3-2-continued

| | | | | | | | | | | | |
|---|---|---|---|---|---|---|---|---|---|---|---|
| Comparative Example A3-4 | 0 | 0 | 0 | 7.5 | 0 | 0 | 0 | 0 | 0 | 77.5 | — |
| Comparative Example A3-5 | 0 | 0 | 0 | 0 | 7.5 | 0 | 0 | 0 | 0 | 77.5 | — |
| Comparative Example A3-6 | 0 | 0 | 0 | 0 | 0 | 0 | 0 | 7.5 | 0 | 77.5 | — |
| Comparative Example A3-7 | 0 | 0 | 0 | 0 | 0 | 0 | 0 | 0 | 7.5 | 77.5 | — |
| Comparative Example A3-8 | 0 | 0 | 0 | 0 | 0 | 7.5 | 0 | 0 | 0 | 77.5 | — |
| Comparative Example A3-9 | 0 | 0 | 0 | 0 | 0 | 0 | 7.5 | 0 | 0 | 77.5 | — |

[2] Evaluation on Stock Solution for Producing Ink Jet Ink

[2-1] Storage Stability (Change in Particle Diameter)

For each of the aqueous ink jet compositions (stock solutions for producing ink jet inks) of the respective Examples and Comparative Examples, an average particle diameter of the disperse dye immediately after production and an average particle diameter of the disperse dye after being placed in a predetermined container and left to stand for one week in an environment of 60° C. were obtained. From these values, a variation rate of the average particle diameter of the disperse dye after being left to stand for one week in an environment of 60° C. with respect to the average particle diameter of the disperse dye immediately after production was obtained, and evaluation was performed according to the following criteria. For measurement of the average particle diameter, Microtrac UPA (manufactured by Nikkiso CO., LTD.) was used.

A: Variation rate of average particle diameter is less than 3%.

B: Variation rate of average particle diameter is equal to or greater than 3% and less than 5%.

C: Variation rate of average particle diameter is equal to or greater than 5% and less than 7%.

D: Variation rate of average particle diameter is equal to or greater than 7% and less than 10%.

E: Variation rate of average particle diameter is equal to or greater than 10%.

[2-2] Generation Status of Foreign Matters

Each of the aqueous ink jet compositions (stock solutions for producing ink jet inks) of the respective Examples and Comparative Examples was placed in a predetermined glass bottle by 10 mL each, and left to stand for 5 days in an environment of 60° C., in a state where a gas-liquid interface is present. Thereafter, the aqueous ink jet composition (stock solution for producing an ink jet ink) was filtered through a metal mesh filter (aperture of 10 μm), and the number of solids remaining on the metal mesh filter per 1 mm square was counted. Evaluation was performed according to the following criteria.

A: Number of solids per 1 mm square is less than 5.

B: Number of solids per 1 mm square is equal to or greater than 5 and less than 20.

C: Number of solids per 1 mm square is equal to or greater than 20 and less than 30.

D: Number of solids per 1 mm square is equal to or greater than 30 and less than 50.

E: Number of solids per 1 mm square is equal to or greater than 50.

These results are summarized in Table 3-3.

TABLE 3-3

| | Storage stability | Generation status of foreign matters |
|---|---|---|
| Example A3-1 | A | A |
| Example A3-2 | A | A |
| Example A3-3 | B | A |
| Example A3-4 | C | C |
| Example A3-5 | C | C |
| Example A3-6 | B | C |
| Example A3-7 | B | B |
| Example A3-8 | C | C |
| Example A3-9 | D | D |
| Example A3-10 | B | D |
| Example A3-11 | C | C |
| Example A3-12 | D | D |
| Example A3-13 | C | D |
| Example A3-14 | D | D |
| Example A3-15 | B | B |
| Example A3-16 | B | B |
| Example A3-17 | C | C |
| Example A3-18 | C | C |
| Example A3-19 | C | C |
| Example A3-20 | C | C |
| Example A3-21 | D | D |
| Comparative Example A3-1 | E | B |
| Comparative Example A3-2 | E | B |
| Comparative Example A3-3 | E | E |
| Comparative Example A3-4 | E | E |
| Comparative Example A3-5 | E | E |
| Comparative Example A3-6 | E | E |
| Comparative Example A3-7 | E | E |
| Comparative Example A3-8 | E | E |
| Comparative Example A3-9 | E | E |

As is apparent from Table 3-3, excellent results were obtained in the invention. On the contrary, satisfactory results were not obtained in the Comparative Examples.

[3] Preparation of Ink Jet Ink (Aqueous Ink Jet Composition)

Example B3-1

The stock solution for producing an ink jet ink prepared in Example A3-1, glycerin, 2-pyrrolidone, propylene glycol, Olfine EXP4300 (manufactured by Nissin Chemical Industry Co., Ltd.) as an acetylene-based surfactant, and pure water were mixed at a proportion as shown in Table 3-4, and the mixture was stirred with High Shear Mixer (manufactured by Silverson Machines, Inc.) at 3,000 rpm to produce an ink jet ink as an aqueous ink jet composition.

An average particle diameter of C.I. Disperse Red 60 in the ink jet ink was 150 nm.

Examples B3-2 to B3-25

Ink jet inks as aqueous ink jet compositions were produced in the same manner as in Example B3-1, except that types of the stock solutions for producing ink jet inks were as shown in Tables 3-4 and 3-5 and blending proportions of the respective components were as shown in Tables 3-4 and 3-5.

Comparative Examples B3-1 to B3-9

Ink jet inks as aqueous ink jet compositions were produced in the same manner as in Example B3-1, except that types of the stock solutions for producing ink jet inks were as shown in Table 3-5 and blending proportions of the respective components were as shown in Table 3-5.

Conditions for the aqueous ink jet compositions (ink jet inks) of the respective Examples and Comparative Examples are summarized in Tables 3-4 and 3-5. In the tables, glycerin is indicated as "Gly", 2-pyrrolidone is indicated as "2-Py", propylene glycol is indicated as "PG", BYK 348 (manufactured by BYK Chemie Japan) as a silicone-based surfactant is indicated as "BYK 348", and Olfine EXP4300 (manufactured by Nissin Chemical Industry Co., Ltd.) as an acetylene-based surfactant is indicated as "EXP 4300". In addition, each of the ink jet inks of Examples B1 to B25 had a viscosity which is a value within a range of equal to or greater than 2.0 mPa·s and equal to or less than 10.0 mPa·s, and surface tension which is a value within a range of equal to or greater than 20 mN/m and equal to or less than 35 mN/m. For the viscosity, measurement was performed at 25° C. using a viscoelasticity tester MCR-300 (manufactured by Physica) by raising Shear Rate from 10 $s^{-1}$ to 1,000 $s^{-1}$ and reading a viscosity at the time of Shear Rate 200. In addition, for the surface tension, measurement was performed by the Wilhelmy method at 25° C. using a surface tension meter (CBVP-7, manufactured by Kyowa Interface Science Co., Ltd.).

TABLE 3-4

| | Stock solution | | Solvent other than water | | | Surfactant | | Pure water |
|---|---|---|---|---|---|---|---|---|
| | Type | | Gly | 2-Py | PG | BYK 348 | EXP 4300 | |
| Example B3-1 | Example A3-1 | 50 | 10 | 5 | 5 | 0 | 1 | 29 |
| Example B3-2 | Example A3-2 | 50 | 10 | 5 | 5 | 0 | 1 | 29 |
| Example B3-3 | Example A3-3 | 50 | 10 | 5 | 5 | 0 | 1 | 29 |
| Example B3-4 | Example A3-4 | 50 | 10 | 5 | 5 | 0 | 1 | 29 |
| Example B3-5 | Example A3-5 | 50 | 10 | 5 | 5 | 0 | 1 | 29 |
| Example B3-6 | Example A3-6 | 50 | 10 | 5 | 5 | 0 | 1 | 29 |
| Example B3-7 | Example A3-7 | 50 | 10 | 5 | 5 | 0 | 1 | 29 |
| Example B3-8 | Example A3-10 | 0.66 | 15 | 5 | 5 | 0 | 1 | 73.34 |
| Example B3-9 | Example A3-10 | 1.33 | 15 | 5 | 5 | 0 | 1 | 72.67 |
| Example B3-10 | Example A3-15 | 50 | 10 | 5 | 5 | 0 | 1 | 29 |
| Example B3-11 | Example A3-16 | 50 | 10 | 5 | 5 | 0 | 1 | 29 |
| Example B3-12 | Example A3-17 | 50 | 10 | 5 | 5 | 0 | 1 | 29 |
| Example B3-13 | Example A3-18 | 50 | 10 | 5 | 5 | 0 | 1 | 29 |
| Example B3-14 | Example A3-19 | 50 | 10 | 5 | 5 | 0 | 1 | 29 |
| Example B3-15 | Example A3-20 | 50 | 10 | 5 | 5 | 0 | 1 | 29 |
| Example B3-16 | Example A3-1 | 0.33 | 15 | 5 | 5 | 0 | 1 | 73.67 |
| Example B3-17 | Example A3-1 | 0.66 | 15 | 5 | 5 | 0 | 1 | 73.34 |
| Example B3-18 | Example A3-2 | 0.66 | 15 | 5 | 5 | 0 | 1 | 73.34 |

TABLE 3-5

| | Stock solution | | Solvent other than water | | | Surfactant | | Pure water |
|---|---|---|---|---|---|---|---|---|
| | Type | | Gly | 2-Py | PG | BYK 348 | EXP 4300 | |
| Example B3-19 | Example A3-2 | 1.33 | 15 | 5 | 5 | 0 | 1 | 72.67 |
| Example B3-20 | Example A3-2 | 0.66 | 15 | 5 | 5 | 0 | 1 | 73.34 |
| Example B3-21 | Example A3-2 | 66 | 10 | 5 | 5 | 0 | 1 | 13 |
| Example B3-22 | Example A3-2 | 1.23 | 15 | 5 | 5 | 0 | 1 | 72.77 |
| Example B3-23 | Example A3-19 | 50 | 5 | 5 | 5 | 0 | 1 | 34 |
| Example B3-24 | Example A3-2 | 50 | 10 | 5 | 5 | 1 | 0 | 29 |
| Example B3-25 | Example A3-21 | 50 | 10 | 5 | 5 | 0 | 1 | 29 |
| Comparative Example B3-1 | Comparative Example A3-1 | 50 | 10 | 5 | 5 | 0 | 1 | 29 |
| Comparative Example B3-2 | Comparative Example A3-2 | 50 | 10 | 5 | 5 | 0 | 1 | 29 |
| Comparative Example B3-3 | Comparative Example A3-3 | 50 | 10 | 5 | 5 | 0 | 1 | 29 |
| Comparative Example B3-4 | Comparative Example A3-4 | 50 | 10 | 5 | 5 | 0 | 1 | 29 |
| Comparative Example B3-5 | Comparative Example A3-5 | 50 | 10 | 5 | 5 | 0 | 1 | 29 |
| Comparative Example B3-6 | Comparative Example A3-6 | 50 | 10 | 5 | 5 | 0 | 1 | 29 |

TABLE 3-5-continued

| | | Blending amount [parts by mass] | | | | | | |
|---|---|---|---|---|---|---|---|---|
| | Stock solution | | Solvent other than water | | | Surfactant | | Pure |
| | Type | | Gly | 2-Py | PG | BYK 348 | EXP 4300 | water |
| Comparative Example B3-7 | Comparative Example A3-7 | 50 | 10 | 5 | 5 | 0 | 1 | 29 |
| Comparative Example B3-8 | Comparative Example A3-8 | 50 | 10 | 5 | 5 | 0 | 1 | 29 |
| Comparative Example B3-9 | Comparative Example A3-9 | 50 | 10 | 5 | 5 | 0 | 1 | 29 |

[4] Evaluation on Ink Jet Ink

[4-1] Storage Stability (Change in Particle Diameter)

For each of the aqueous ink jet compositions (ink jet inks) of the respective Examples and Comparative Examples, an average particle diameter of the disperse dye immediately after production and an average particle diameter of the disperse dye after being placed in a predetermined ink-holding container and left to stand for one week in an environment of 60° C. were obtained. From these values, a variation rate of the average particle diameter of the disperse dye after being left to stand for one week in an environment of 60° C. with respect to the average particle diameter of the disperse dye immediately after production was obtained, and evaluation was performed according to the following criteria. For measurement of the average particle diameter, Microtrac UPA (manufactured by Nikkiso Co., Ltd.) was used.

A: Variation rate of average particle diameter is less than 3%.

B: Variation rate of average particle diameter is equal to or greater than 3% and less than 5%.

C: Variation rate of average particle diameter is equal to or greater than 5% and less than 7%.

D: Variation rate of average particle diameter is equal to or greater than 7% and less than 10%.

E: Variation rate of average particle diameter is equal to or greater than 10%.

[4-2] Generation Status of Foreign Matters

Each of the aqueous ink jet compositions (stock solutions for producing ink jet inks) of the respective Examples and Comparative Examples was placed in a predetermined glass bottle by 10 mL each, and left to stand for 5 days in an environment of 60° C., in a state where a gas-liquid interface is present. Thereafter, the aqueous ink jet composition (stock solution for producing an ink jet ink) was filtered through a metal mesh filter (aperture of 10 μm), and the number of solids remaining on the metal mesh filter per 1 mm square was counted. Evaluation was performed according to the following criteria.

A: Number of solids per 1 mm square is less than 5.

B: Number of solids per 1 mm square is equal to or greater than 5 and less than 20.

C: Number of solids per 1 mm square is equal to or greater than 20 and less than 30.

D: Number of solids per 1 mm square is equal to or greater than 30 and less than 50.

E: Number of solids per 1 mm square is equal to or greater than 50.

[4-3] Discharge Stability by Ink Jet Method

A predetermined ink-holding container was filled with each of the aqueous ink jet compositions (ink jet inks) of the respective Examples and Comparative Examples and was left to stand for 5 days in an environment of 60° C.

Thereafter, the holding container was mounted on a recording apparatus PX-H 6000 (manufactured by Seiko Epson Corporation), and the ink jet ink was discharged so that a solid pattern was adhered on TRANSJET Classic (manufactured by Cham Paper), which is an intermediate transfer medium, at a recording resolution of 1440×720 dpi. An operating environment of the recording apparatus (printer) was set at 40° C. and 20 RH %.

The number of times of nozzle omission at the time of recording 30 solid patterns on the intermediate transfer medium was examined, and evaluation was performed according to the following criteria.

A: Number of times of nozzle omission is 0.

B: Number of times of nozzle omission is equal to or greater than 1 and equal to or less than 9.

C: Number of times of nozzle omission is equal to or greater than 10 and equal to or less than 19.

D: Number of times of nozzle omission is equal to or greater than 20 and equal to or less than 29.

E: Number of times of nozzle omission is equal to or greater than 30.

An ink-holding container (the above-described ink-holding container) which is PX-H 6000 manufactured by Seiko Epson Corporation is provided with an ink pour that allows refill of an aqueous ink jet composition, and is open to the atmosphere in a case of being mounted on a recording apparatus in a usable state.

[4-4] Color Developing Property (OD Value)

An adhesion side of the aqueous ink jet composition on the thirtieth intermediate transfer medium to which the ink jet ink had been adhered in [4-3] was brought into close contact with cloth (polyester 100%, Amina, manufactured by Toray Industries, Inc.) which is a white recording medium. In this state, sublimation transfer was carried out by performing heating using a heat press machine (TP-608M, manufactured by Taiyo Seiki Co., Ltd.) at a condition of 180° C. and 60 seconds, so that each recorded matter was obtained.

For each recorded matter obtained, evaluation on color developing property was performed. Specifically, for each recorded matter obtained, an OD value was measured using a colorimeter (Gretag Macbeth Spectrolino, manufactured by X-Rite), and evaluation was performed according to the following criteria.

A: OD value is equal to or greater than 1.50.

B: OD value is equal to or greater than 1.45 and less than 1.50.

C: OD value is equal to or greater than 1.40 and less than 1.45.

D: OD value is equal to or greater than 1.35 and less than 1.40.

E: OD value is less than 1.35.

These results are summarized in Tables 3-6 and 3-7.

TABLE 3-6

| | Storage stability | Generation status of foreign matters | Discharge stability | Color developing property |
|---|---|---|---|---|
| Example B3-1 | A | A | A | A |
| Example B3-2 | A | A | A | A |
| Example B3-3 | B | A | A | A |
| Example B3-4 | C | C | A | A |
| Example B3-5 | C | C | A | A |
| Example B3-6 | B | C | A | A |
| Example B3-7 | B | B | A | A |
| Example B3-8 | D | D | C | E |
| Example B3-9 | D | C | C | E |
| Example B3-10 | B | B | A | A |
| Example B3-11 | B | B | A | A |
| Example B3-12 | C | C | B | A |
| Example B3-13 | C | C | D | A |
| Example B3-14 | C | C | A | A |
| Example B3-15 | C | C | A | A |
| Example B3-16 | D | D | C | E |
| Example B3-17 | D | D | C | E |
| Example B3-18 | D | D | C | E |

TABLE 3-7

| | Storage stability | Generation status of foreign matters | Discharge stability | Color developing property |
|---|---|---|---|---|
| Example B3-19 | C | D | C | E |
| Example B3-20 | C | C | C | E |
| Example B3-21 | C | C | D | A |
| Example B3-22 | C | C | C | E |
| Example B3-23 | C | C | A | A |
| Example B3-24 | B | B | A | A |
| Example B3-25 | D | D | A | A |
| Comparative Example B3-1 | E | B | A | E |
| Comparative Example B3-2 | E | B | A | E |
| Comparative Example B3-3 | E | E | A | A |
| Comparative Example B3-4 | E | E | A | A |
| Comparative Example B3-5 | E | E | A | A |
| Comparative Example B3-6 | E | E | E | A |
| Comparative Example B3-7 | E | E | E | A |
| Comparative Example B3-8 | E | E | E | A |
| Comparative Example B3-9 | E | E | E | A |

As is apparent from Tables 3-6 and 3-7, excellent results were obtained in the invention. On the contrary, satisfactory results were not obtained in the Comparative Examples.

Hereinafter, a fourth suitable embodiment of the invention will be described in detail.

Aqueous Ink Jet Composition

Among various disperse dyes, C.I. Disperse Red 60 has features such as an excellent color developing property while having the following problems. That is, in a case where C.I. Disperse Red 60 is used as a constituent component of an aqueous ink jet composition in the related art, the C.I. Disperse Red 60 does not make it possible for the aqueous ink jet composition to have a sufficiently excellent storage stability, which remarkably causes generation of foreign matters and a problem that clogging occurs in a head filter or a nozzle during discharge by an ink jet method after long-term storage.

Therefore, the present inventor has conducted intensive studies aimed at providing an aqueous ink jet composition capable of effectively preventing occurrence of the problems as mentioned above while making full use of the features of C.I. Disperse Red 60.

As a result, the present inventor has reached the invention.

That is, the aqueous ink jet composition of the invention contains C.I. Disperse Red 60, a substance A which is at least one type of compound selected from the group consisting of a compound represented by Formula (2-1), a compound represented by Formula (2-2), an ethylene oxide adduct of tristyrylphenol, and a derivative of the ethylene oxide adduct of tristyrylphenol, and an anionic dispersing agent.

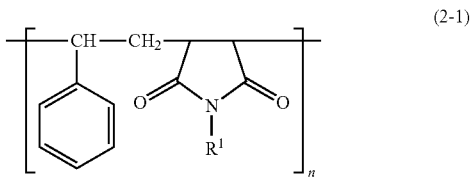

(2-1)

(In Formula (2-1), $R^1$ is a hydrocarbon group having 6 or less carbon atoms, or $-(CH_2)_m-NR^8R^9$ (where m is an integer of equal to or less than 6, and $R^8$ and $R^9$ are each independently a hydrogen atom or a hydrocarbon group having 6 or less carbon atoms), and n is an integer of equal to or greater than 1)

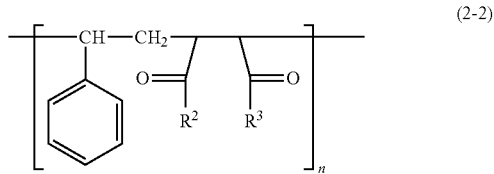

(2-2)

(In Formula (2-2), one of $R^2$ and $R^3$ is —OH and the other is $-NR^4R^5$ (where $R^4$ and $R^5$ are each independently a hydrogen atom or a hydrocarbon group having 6 or less carbon atoms), and n is an integer of equal to or greater than 1.)

With such a constitution, it is possible to provide an aqueous ink jet composition which has effects obtained by containing C.I. Disperse Red 60 that is a disperse dye having features such as an excellent color developing property in a low-temperature process due to a relatively small molecular weight, while hardly causing remarkable generation of foreign matters (in particular, crystalline foreign matters at a gas-liquid interface) and clogging in a head filter or a nozzle during discharge by an ink jet method, which are due to long-term storage.

On the other hand, in a case where the above conditions are not satisfied, satisfactory results cannot be obtained.

For example, in a case where the above-mentioned substance A is not used, dispersion stability of C.I. Disperse Red 60 in the aqueous ink jet composition cannot be ensured, so that foreign matters are easily generated during long-term storage of the aqueous ink jet composition, or the like.

In addition, in a case where the anionic dispersing agent is not used or in a case where another dispersing agent (for example, a nonionic dispersing agent, a cationic dispersing agent, or the like) is used in place of the anionic dispersing agent, dispersion stability of C.I. Disperse Red 60 in the aqueous ink jet composition cannot be ensured, so that foreign matters are easily generated during long-term storage of the aqueous ink jet composition, or the like.

In the present specification, the aqueous ink jet composition is a concept including not only an ink itself to be discharged by an ink jet method but also a stock solution used for preparing the ink. In other words, the aqueous ink jet composition of the invention may be subjected to discharge by an ink jet method as it is, or may be subjected to discharge by an ink jet method after treatments such as dilution.

Substance A

The aqueous ink jet composition of the invention contains a substance A which is at least one type of compound selected from the group consisting of a compound represented by Formula (2-1), a compound represented by Formula (2-2), an ethylene oxide adduct of tristyrylphenol, and the derivative of the ethylene oxide adduct of tristyrylphenol.

By using the substance A in combination with C.I. Disperse Red 60 and the anionic dispersing agent, dispersion stability of C.I. Disperse Red 60 in the aqueous ink jet composition and storage stability of the aqueous ink jet composition can be made excellent, and remarkable generation of foreign matters and occurrence of clogging in a head filter or a nozzle during discharge by an ink jet method, which are due to long-term storage, can be effectively prevented. As a result, it is possible to stably perform discharge of the aqueous ink jet composition for a long period of time, and it is possible to keep quality of a recorded matter obtained by an ink jet method in a stable and excellent manner. In addition, the substance A is a component which hardly causes an adverse effect on quality of a recorded matter and an adverse effect in sublimation printing.

For the substance A, the aqueous ink jet composition of the invention may contain one type of compound or may contain plural types of compounds. More specifically, the substance A may be, for example, a mixture of the compound represented by Formula (2-1) and the compound represented by Formula (2-2).

A content of the substance A in the aqueous ink jet composition is preferably equal to or greater than 0.05% by mass and equal to or less than 8.0% by mass, more preferably equal to or greater than 0.07% by mass and equal to or less than 6.0% by mass, and even more preferably equal to or greater than 0.08% by mass and equal to or less than 5.0% by mass.

Accordingly, storage stability of the aqueous ink jet composition is further improved, and generation of foreign matters during long-term storage or the like is more effectively prevented.

In particular, in a case where the aqueous ink jet composition is an ink itself to be discharged by an ink jet method, a content of the substance A in the ink is preferably equal to or greater than 0.05% by mass and equal to or less than 4.5% by mass, more preferably equal to or greater than 0.07% by mass and equal to or less than 3.0% by mass, and even more preferably equal to or greater than 0.08% by mass and equal to or less than 2.0% by mass.

In addition, in a case where the aqueous ink jet composition is a stock solution used for preparing an ink to be discharged by an ink jet method, a content of the substance A in the stock solution is preferably equal to or greater than 0.5% by mass and equal to or less than 8.0% by mass, more preferably equal to or greater than 0.75% by mass and equal to or less than 6.0% by mass, and even more preferably equal to or greater than 1.0% by mass and equal to or less than 5.0% by mass.

In a case where the substance A constituting the aqueous ink jet composition contains plural types of compounds, for the content, a sum of contents of these plural types of compounds is adopted.

Anionic Dispersing Agent

The aqueous ink jet composition of the invention contains an anionic dispersing agent.

The anionic dispersing agent is not particularly limited as long as the anionic dispersing agent is ionized to form an anion, and is preferably at least one of a compound represented by Formula (2-3), a sodium salt of a naphthalene sulfonic acid formalin condensate, and lignin sulfonic acid.

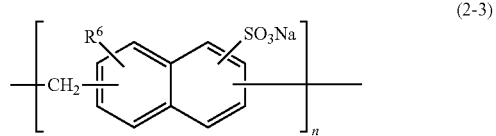

(2-3)

(In Formula (2-3), $R^6$ is a hydrocarbon group having 4 or less carbon atoms, and n is an integer of equal to or greater than 1.)

Accordingly, hydrophobicity of the dispersing agent is improved, and adsorption of the dispersing agent onto C.I. Disperse Red 60 is promoted, so that long-term stability of the aqueous ink jet composition is further improved.

It is sufficient that $R^6$ in Formula (2-3) is a hydrocarbon group having 4 or less carbon atoms. Among these, $R^6$ is preferably a hydrocarbon group (a methyl group or an ethyl group) having 2 or less carbon atoms.

Accordingly, it is possible to make more suitable balance between hydrophobicity and hydrophilicity of the anionic dispersing agent, and it is possible to achieve further excellent dispersion stability of C.I. Disperse Red 60 in the aqueous ink jet composition.

A weight average molecular weight Mw of the anionic dispersing agent is preferably equal to or greater than 1,000 and equal to or less than 20,000, more preferably equal to or greater than 2,000 and equal to or less than 10,000, and even more preferably equal to or greater than 3,000 and equal to or less than 5,000.

Accordingly, storage stability of the aqueous ink jet composition is further improved, and generation of foreign matters during long-term storage or the like is more effectively prevented.

For the anionic dispersing agent, the aqueous ink jet composition may contain two or more types of compounds.

A content of the anionic dispersing agent in the aqueous ink jet composition is preferably equal to or greater than 0.1% by mass and equal to or less than 30% by mass, more preferably equal to or greater than 0.2% by mass and equal to or less than 25% by mass, and even more preferably equal to or greater than 0.3% by mass and equal to or less than 20% by mass.

Accordingly, storage stability of the aqueous ink jet composition is further improved, and generation of foreign matters during long-term storage or the like is more effectively prevented.

In particular, in a case where the aqueous ink jet composition is an ink itself to be discharged by an ink jet method, a content of the anionic dispersing agent in the ink is preferably equal to or greater than 0.1% by mass and equal to or less than 20% by mass, more preferably equal to or greater than 0.2% by mass and equal to or less than 15% by mass, and even more preferably equal to or greater than 0.3% by mass and equal to or less than 10% by mass.

In addition, in a case where the aqueous ink jet composition is a stock solution used for preparing an ink to be discharged by an ink jet method, a content of the anionic dispersing agent in the stock solution is preferably equal to or greater than 5.0% by mass and equal to or less than 30% by mass, more preferably equal to or greater than 8.0% by mass and equal to or less than 25% by mass, and even more preferably equal to or greater than 12% by mass and equal to or less than 20% by mass.

In a case where the anionic dispersing agent constituting the aqueous ink jet composition contains plural types of compounds, for the content, a sum of contents of these plural types of compounds is adopted.

C.I. Disperse Red 60

The aqueous ink jet composition contains C.I. Disperse Red 60 as a disperse dye.

An average particle diameter of C.I. Disperse Red 60 in the aqueous ink jet composition is preferably equal to or greater than 50 nm and equal to or less than 300 nm, more preferably equal to or greater than 75 nm and equal to or less than 250 nm or less, and even more preferably equal to or greater than 100 nm and equal to or less than 200 nm.

Accordingly, storage stability of the aqueous ink jet composition is further improved, and generation of foreign matters during long-term storage or the like is more effectively prevented. In addition, a recorded portion formed by using the aqueous ink jet composition can be more effectively sublimated, and application to sublimation printing can be more suitably achieved.

In the present specification, the average particle diameter refers to an average particle diameter on a volume basis unless otherwise specified. The average particle diameter can be obtained, for example, by measurement using Microtrac UPA (manufactured by Nikkiso CO., LTD.).

As commercially available products of C.I. Disperse Red 60, for example, Plast Red 8375 (manufactured by Arimoto Chemical Co., Ltd.) and the like are mentioned.

A content of C.I. Disperse Red 60 in the aqueous ink jet composition is preferably equal to or greater than 0.1% by mass and equal to or less than 30% by mass, more preferably equal to or greater than 2.0% by mass and equal to or less than 25% by mass, and even more preferably equal to or greater than 5.0% by mass and equal to or less than 20% by mass.

Accordingly, it is possible to obtain a higher color density in a recorded portion formed using the aqueous ink jet composition, while further improving storage stability of the aqueous ink jet composition and more effectively preventing generation of foreign matters during long-term storage or the like.

In the aqueous ink jet composition, in a case where a content of C.I. Disperse Red 60 is set as XD [% by mass] and a content of the substance A is set as XA [% by mass], it is preferable that a relationship of $0.002 \leq XA/XD \leq 1.5$ be satisfied, it is more preferable that a relationship of $0.03 \leq XA/XD \leq 0.8$ be satisfied, and it is even more preferable that a relationship of $0.05 \leq XA/XD \leq 0.5$ be satisfied.

Accordingly, storage stability of the aqueous ink jet composition is further improved, and generation of foreign matters during long-term storage or the like is more effectively prevented.

In the aqueous ink jet composition, in a case where a content of C.I. Disperse Red 60 is set as XD [% by mass] and a content of the anionic dispersing agent is set as XB [% by mass], it is preferable that a relationship of $0.4 \leq XB/XD \leq 2.0$ be satisfied, it is more preferable that a relationship of $0.5 \leq XB/XD \leq 1.5$ be satisfied, and it is even more preferable that a relationship of $0.6 \leq XB/XD \leq 1.2$ be satisfied.

Accordingly, storage stability of the aqueous ink jet composition is further improved, and generation of foreign matters during long-term storage or the like is more effectively prevented.

In the aqueous ink jet composition, in a case where a content of the substance A is set as XA [% by mass] and a content of the anionic dispersing agent is set as XB [% by mass], it is preferable that a relationship of $0.002 \leq XA/XB \leq 1.5$ be satisfied, it is more preferable that a relationship of $0.03 \leq XA/XB \leq 0.8$ be satisfied, and it is more preferable that a relationship of $0.05 \leq XA/XB \leq 0.5$ be satisfied.

Accordingly, storage stability of the aqueous ink jet composition is further improved, and generation of foreign matters during long-term storage or the like is more effectively prevented.

Water

The aqueous ink jet composition contains water.

A content of water in the aqueous ink jet composition is not particularly limited. The content of water is preferably equal to or greater than 30% by mass and equal to or less than 85% by mass, more preferably equal to or greater than 35% by mass and equal to or less than 80% by mass, and even more preferably equal to or greater than 40% by mass and equal to or less than 75% by mass.

Accordingly, a viscosity of the aqueous ink jet composition can be more reliably adjusted to a suitable value, and discharge stability according to an ink jet method can be further improved.

Solvent Other than Water

The aqueous ink jet composition may contain a solvent other than water.

Accordingly, a viscosity of the aqueous ink jet composition can be suitably adjusted, and a moisture retaining property of the aqueous ink jet composition can be increased. As a result, liquid droplet discharge by an ink jet method can be performed in a more stable manner.

As the solvent other than water which is contained in the aqueous ink jet composition, for example, glycerin, propylene glycol, 2-pyrrolidone, and the like are mentioned.

By containing these solvents, a slow evaporation rate is achieved due to an excellent moisture retaining capability, which makes it possible to perform liquid droplet discharge in a more stable manner.

A content of the solvent other than water which is contained in the aqueous ink jet composition is preferably equal to or greater than 0% by mass and equal to or less than 45% by mass, more preferably equal to or greater than 10% by mass and equal to or less than 43% by mass, and even more preferably equal to or greater than 15% by mass and equal to or less than 40% by mass.

Accordingly, effects obtained by containing the solvent other than water as described above are exerted in a more remarkable manner.

Surfactant

The aqueous ink jet composition may contain a surfactant.

Accordingly, it is possible to achieve more suitable wettability of the aqueous ink jet composition with respect to a recording medium (base material), which is advantageous for obtaining better image quality.

As the surfactant contained in the aqueous ink jet composition, for example, various surfactants such as an anionic surfactant, a cationic surfactant, and a nonionic surfactant can be used.

More specifically, as the surfactant contained in the aqueous ink jet composition, for example, an acetylene-based surfactant, a silicone-based surfactant, a fluorine-based surfactant, and the like are mentioned.

In a case where the aqueous ink jet composition contains a silicone-based surfactant, it is possible to achieve more suitable wettability of the aqueous ink jet composition with respect to a recording medium (base material), and it is possible to form an image (recorded portion) with further excellent gradation properties.

In a case where the aqueous ink jet composition contains the silicone-based surfactant, a content of the silicone-based surfactant in the aqueous ink jet composition is preferably equal to or greater than 5.0 parts by mass and equal to or less than 150 parts by mass, more preferably equal to or greater than 7.0 parts by mass and equal to or less than 140 parts by mass, and even more preferably equal to or greater than 10 parts by mass and equal to or less than 70 parts by mass, with respect to 100 parts by mass of C.I. Disperse Red 60.

Accordingly, effects obtained by containing the silicone-based surfactant as described above are exerted in a more remarkable manner.

As commercially available silicone-based surfactants, for example, BYK-306, BYK-307, BYK-333, BYK-337, BYK-341, BYK-345, BYK-346, BYK-347, BYK-348, BYK-349, BYK-378 (all trade names, manufactured by BYK Chemie Japan), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (all trade names, manufactured by Shin-Etsu Chemical Co., Ltd.), and the like are mentioned.

Other Components

The aqueous ink jet composition may contain a component (another component) other than the components as described above.

As the other component, for example, a coloring agent other than C.I. Disperse Red 60, a dispersing agent other than the styrene maleic acid-based dispersing agent as described above, a penetrating agent such as triethylene glycol monomethyl ether, triethylene glycol monobutyl ether, diethylene glycol monomethyl ether, 1,2-hexanediol, 1,2-pentanediol, 1,2-butanediol, and 3-methyl-1,5-pentanediol, a pH adjusting agent, a chelating agent such as ethylenediamine tetraacetate (EDTA), an antiseptic or antifungal agent, an antirust agent, and the like are mentioned. As the antiseptic or antifungal agent, for example, a compound having an isothiazoline ring structure in a molecule can be suitably used.

A content (in a case where plural types of components are contained as the other component, the content is a sum of contents thereof) of the other component is preferably equal to or less than 6% by mass, and more preferably equal to or less than 5% by mass.

In particular, in a case where the aqueous ink jet composition of the invention contains a dispersing agent (another dispersing agent) other than the above-mentioned dispersing agents, a content of the dispersing agent (the other dispersing agent) is preferably equal to or less than 5% by mass, and more preferably equal to or less than 3% by mass.

Surface tension of the aqueous ink jet composition at 25° C. is preferably equal to or greater than 20 mN/m and equal to or less than 50 mN/m, more preferably equal to or greater than 21 mN/m and equal to or less than 40 mN/m, and even more preferably equal to or greater than 23 mN/m and equal to or less than 30 mN/m.

Accordingly, clogging in a nozzle of a discharge apparatus, which is caused by an ink jet method, becomes harder to occur, and discharge stability of the aqueous ink jet composition is further improved. In addition, even in a case where clogging in the nozzle occurs, recoverability achieved by making the nozzle capped (nozzle capping) can be made further excellent.

As the surface tension, a value measured by the Wilhelmy method can be adopted. For measurement of the surface tension, a surface tension meter (for example, CBVP-7, manufactured by Kyowa Interface Science Co., Ltd., and the like) can be used.

A viscosity of the aqueous ink jet composition at 25° C. is preferably equal to or greater than 2 mPa·s and equal to or less than 30 mPa·s, more preferably equal to or greater than 3 mPa·s and equal to or less than 20 mPa·s, and even more preferably equal to or greater than 4 mPa·s and equal to or less than 10 mPa·s.

Accordingly, discharge stability of the aqueous ink jet composition is further improved.

For the viscosity, measurement can be performed at 25° C. using a viscoelasticity tester (for example, MCR-300, manufactured by Physica) by raising Shear Rate from $10 \text{ s}^{-1}$ to $1,000 \text{ s}^{-1}$ and reading a viscosity at the time of Shear Rate 200.

The aqueous ink jet composition of the invention is usually applied to a recording apparatus by an ink jet method in a state of being held in a container such as a cartridge, a bag, and a tank. In other words, the recording apparatus according to the invention includes a container (an ink cartridge or the like) for holding the aqueous ink jet composition of the invention.

It is sufficient that the aqueous ink jet composition of the invention is an ink to be discharged by an ink jet method or a stock solution used for preparing the ink. A specific configuration of an apparatus for carrying out liquid droplet discharge is not limited. It is preferable that the aqueous ink jet composition of the invention be a composition (including a stock solution) which is applied to an open-to-atmosphere type recording apparatus (more specifically, for example, an ink jet recording apparatus which includes an ink-holding container provided with an ink pour that allows refill of an ink and a recording head having a nozzle hole for discharging the ink).

In such a recording apparatus, in a case where an ink containing C.I. Disperse Red 60 is applied thereto, there is a problem that generation of foreign matters (in particular, crystalline foreign matters) at the gas-liquid interface is particularly likely to occur due to contact of the ink with the atmosphere. However, according to the invention, even in a case of being applied to such a recording apparatus, it is possible to effectively prevent occurrence of such a problem. That is, in a case of being applied to an open-to-atmosphere type recording apparatus, effects of the invention are exerted in a more remarkable manner.

Recording Method

The aqueous ink jet composition of the invention can be applied, for example, to a direct printing method, a thermal transfer printing method (for example, sublimation printing), and the like, and can be suitably applied to the thermal transfer printing method from the viewpoint that C.I. Disperse Red 60 has sublimability.

As a recording method using the aqueous ink jet composition of the invention, an example of the thermal transfer printing method (sublimation printing) will be described below.

The recording method according to the present embodiment has an ink adhering step of adhering the aqueous ink jet composition to an intermediate transfer medium by an ink jet method and a transfer step of heating the intermediate transfer medium to which the aqueous ink jet composition has been adhered, to transfer, to a recording medium, C.I. Disperse Red 60 as a sublimable dye which is contained in the aqueous ink jet composition.

Ink Adhering Step

In the ink adhering step, the aqueous ink jet composition is adhered to the intermediate transfer medium by an ink jet method. Discharge of the aqueous ink jet composition by an ink jet method can be carried out using a known ink jet recording apparatus. As a discharge method, a piezo method, a method of discharging an ink by foams (bubbles) generated by heating the ink, or the like can be used. Among these, the piezo method is preferable from the viewpoints of difficulty in deterioration of the aqueous ink jet composition, and the like.

In the ink adhering step, an ink other than the aqueous ink jet composition according to the invention may be used in combination.

Intermediate Transfer Medium

As the intermediate transfer medium, for example, paper such as plain paper, a recording medium (referred to as ink jet special paper, coated paper, or the like) provided with an ink receiving layer, or the like can be used. Among these, paper provided with an ink receiving layer formed of inorganic fine particles such as silica is preferable. Accordingly, it is possible to obtain an intermediate transfer medium, in which bleeding or the like is suppressed, by a process of drying the aqueous ink jet composition which has been adhered to the intermediate transfer medium. In addition, in a subsequent transfer step, sublimation of C.I. Disperse Red 60 tends to progress more smoothly.

Transfer Step

Thereafter, the intermediate transfer medium to which the aqueous ink jet composition has been adhered is heated to transfer, to a recording medium, C.I. Disperse Red 60 as a constituent component of the aqueous ink jet composition. Accordingly, a recorded matter is obtained.

A heating temperature in the present step is preferably equal to or higher than 160° C. and equal to or lower than 220° C., and more preferably equal to or higher than 170° C. and equal to or lower than 200° C.

Accordingly, energy required for transfer can be further decreased, and productivity of the recorded matter can be further improved. In addition, a color developing property of the obtained recorded matter can be further improved.

A heating time in the present step varies depending on a heating temperature. The heating time is preferably equal to or longer than 30 seconds and equal to or shorter than 90 seconds, and more preferably equal to or longer than 45 seconds and equal to or shorter than 80 seconds.

Accordingly, energy required for transfer can be further decreased, and productivity of the recorded matter can be further improved. In addition, a color developing property of the obtained recorded matter can be further improved.

In addition, the present step may be carried out by heating a surface of the intermediate transfer medium, to which the aqueous ink jet composition has been adhered, in a state of being spaced apart at a certain distance from the recording medium and facing the same, or in a state of being in close contact with a surface of the recording medium. Preferably, the present step is carried out by heating the surface of the intermediate transfer medium, to which the aqueous ink jet composition has been adhered, in a state of being in close contact with the surface of the recording medium.

Accordingly, energy required for transfer can be further decreased, and productivity of the recorded matter can be further improved. In addition, a color developing property of the obtained recorded matter can be further improved.

Recording Medium

For the recording medium, there is no particular limitation thereto, and, for example, cloth (hydrophobic fiber cloth or the like), a resin (plastic) film, paper, glass, a metal, ceramics, and the like are mentioned. In addition, as the recording medium, an article having a three-dimensional shape such as a sheet shape, a spherical shape, and a rectangular parallelepiped shape may be used.

In a case where the recording medium is cloth, as fibers constituting the cloth, for example, polyester fibers, nylon fibers, triacetate fibers, diacetate fibers, polyamide fibers, a blended product obtained by using two or more types of these fibers, and the like are mentioned. In addition, blended products of these with recycled fibers such as rayon or natural fibers such as cotton, silk, and wool may be used.

In addition, in a case where the recording medium is a resin (plastic) film, as the resin (plastic) film, for example, a polyester film, a polyurethane film, a polycarbonate film, a polyphenylene sulfide film, a polyimide film, a polyamideimide film, and the like are mentioned.

The resin (plastic) film may be a stacked body in which a plurality of layers are stacked, or may be composed of a gradient material in which a material composition changes in a gradient manner.

Suitable embodiments of the invention have been described as above. However, the invention is not limited thereto.

For example, it is sufficient that the aqueous ink jet composition of the invention is used for discharge by an ink jet method. The aqueous ink jet composition of the invention may not be applied to the recording method as described above.

For example, the aqueous ink jet composition of the invention may be applied to a method having other further steps (pre-treatment step, intermediate treatment step, and post-treatment step) in addition to the above-described steps.

In this case, as the pre-treatment step, for example, a step of applying a coat layer to the recording medium, and the like are mentioned.

In addition, as the intermediate treatment step, for example, a step of preliminarily heating the recording medium, and the like are mentioned.

In addition, as the post-treatment step, for example, a step of washing the recording medium, and the like are mentioned.

In addition, the aqueous ink jet composition of the invention can also be suitably applied to sublimation transfer that does not use an intermediate transfer medium. As the sublimation transfer that does not use an intermediate transfer medium, for example, a method having a step of adhering the aqueous ink jet composition to an ink receiving layer of a recording medium (a film product or the like) by an ink jet method, in which the ink receiving layer is peelable and provided on the recording medium, a step of directly heating the recording medium provided with the ink receiving layer, to which the aqueous ink jet composition has been adhered, to perform sublimation and diffusion dyeing from the ink receiving layer to the recording medium at a lower layer side of the ink receiving layer, and a step of peeling the ink receiving layer from the recording medium, to obtain a recorded matter, and the like are mentioned.

Examples

Next, specific examples of the invention will be described.

[1] Preparation of Stock Solution (Aqueous Ink Jet Composition) for Producing Ink Jet Ink Example A4-1

First, C.I. Disperse Red 60 as a disperse dye, an ethylene oxide adduct of tristyrylphenol (a substance of Formula (2-4) in which $R^7$ is H) as a substance A, a methylnaphthalene sulfonic acid formalin condensate Na (a substance of Formula (2-3) in which $R^6$ is —$CH_3$) as an anionic dispersing agent, and pure water were mixed in a proportion shown in Table 4-3, and the mixture was stirred with High Shear Mixer (manufactured by Silverson Machines, Inc.) at 3,000 rpm to produce a slurry. Thereafter, the produced slurry and glass beads having a diameter of 0.5 mm were stirred and dispersed in a bead mill (LMZ015, Ashizawa Finetech Ltd.) under water cooling, so that a stock solution for producing an ink jet ink as an aqueous ink jet composition was produced.

An average particle diameter of C.I. Disperse Red 60 in the stock solution for producing an ink jet ink was 150 nm.

positions (stock solutions for producing ink jet inks) of the respective Examples and Comparative Examples is shown in Table 4-1, relationship between abbreviations and conditions for the dispersing agents is shown in Table 4-2, and compositions of the aqueous ink jet compositions (stock solutions for producing ink jet inks) of the respective Examples and Comparative Examples are shown in Tables 4-3 and 4-4. In the tables, C.I. Disperse Red 60 is indicated as "DR60", C.I. Disperse Red 153 is indicated as "DR153", C.I. Disperse Red 167 is indicated as "DR167", a polycarboxylic acid-based activator (CARRYBON L-400, manufactured by Sanyo Chemical Industries, Ltd.) is indicated as "A1'", and polyoxyethylene sorbitan fatty acid ester (Sorbon T-40, manufactured by Toho Chemical Industry Co., Ltd.) as a dispersing agent (a nonionic dispersing agent) other than the anionic dispersing agent is indicated as "B1'". A3 as the substance A used in Example A4-3 and the like is represented by Formula (2-5). In addition, each of the stock solutions for producing ink jet inks of Examples A1 to A21 had a viscosity which is a value within a range of equal to or greater than 2.0 mPa·s and equal to or less than 30 mPa·s, and surface tension which is a value within a range of equal to or greater than 25 mN/m and equal to or less than 60 mN/m. For the viscosity, measurement was performed at 25° C. using a viscoelasticity tester MCR-300 (manufactured by Physica) by raising Shear Rate from 10 $s^{-1}$ to 1,000 $s^{-1}$ and reading a viscosity at the time of Shear Rate 200. In addition, for the surface tension, measurement was performed by the Wilhelmy method at 25° C. using a surface tension meter (CBVP-7, manufactured by Kyowa Interface Science Co., Ltd.).

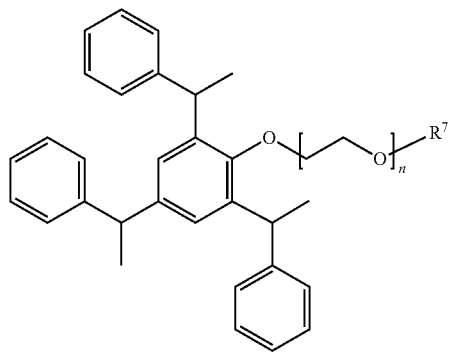

(2-4)

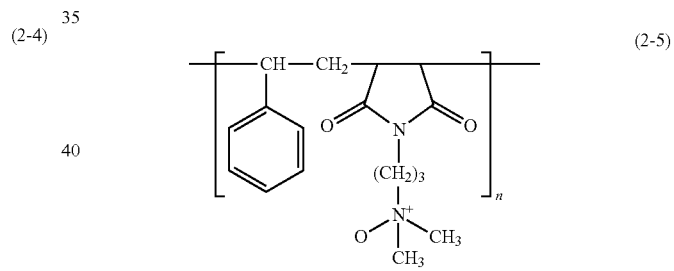

(2-5)

Examples A4-2 to A4-21

Stock solutions for producing ink jet inks as aqueous ink jet compositions were produced in the same manner as in Example A4-1, except that types of the substance A's and the anionic dispersing agents, and blending proportions of the respective components were as shown in Tables 4-1, 4-2, 4-3, and 4-4. Comparative Examples A4-1 to A4-6

Stock solutions for producing ink jet inks as aqueous ink jet compositions were produced in the same manner as in Example A4-1, except that types of the disperse dyes, the substance A's, and the anionic dispersing agents, and blending proportions of the respective components were as shown in Tables 4-1, 4-2, and 4-4.

Relationship between abbreviations and conditions for the substance A's used for preparing the aqueous ink jet com-

TABLE 4-1

| Abbreviation for substance A | Chemical formula | Condition in formula |
|---|---|---|
| A1 | Formula (4) | $R^7$ = H |
| A2 | Formula (4) | $R^7$ = $SO_3H$ |
| A3 | Formula (1) (Formula (5)) | $R^1$ = $(CH_2)_3N^+(CH_3)_2O^-$ |
| A4 | Formula (2) | One of $R^2$ and $R^3$ is —OH, and the other is —$N(CH_2)_3N(CH_3)_2O$— |

TABLE 4-2

| Abbreviation for anionic dispersing agent | Chemical formula or substance name | Condition in formula | Mw |
|---|---|---|---|
| B1 | Formula (3) | $R^6$ = $CH_3$ | 5,000 |
| B2 | Formula (3) | $R^6$ = $CH_2CH_3$ | 5,000 |
| B3 | Formula (3) | $R^6$ = $CH_2CH_2CH_3$ | 5,000 |

TABLE 4-2-continued

| Abbreviation for anionic dispersing agent | Chemical formula or substance name | Condition in formula | Mw |
|---|---|---|---|
| B4 | Formula (3) | $R^6 = CH_2CH_2CH_2CH_3$ | 5,000 |
| B5 | Sodium salt of naphthalene sulfonic acid formalin condensate | — | 5,000 |
| B6 | Lignin sulfonic acid | — | 5,000 | particle diameter of the disperse dye immediately after production was obtained, and evaluation was performed according to the following criteria. For measurement of the average particle diameter, Microtrac UPA (manufactured by Nikkiso CO., LTD.) was used.

A: Variation rate of average particle diameter is less than 3%.

B: Variation rate of average particle diameter is equal to or greater than 3% and less than 5%.

C: Variation rate of average particle diameter is equal to or greater than 5% and less than 7%.

TABLE 4-3

| | Blending amount [parts by mass] | | | | | | | | | | | | | | | | | | |
|---|---|---|---|---|---|---|---|---|---|---|---|---|---|---|---|---|---|---|---|
| | Disperse dye | | | Substance A | | | | Anionic dispersing agent | | | | | | Another component | | Pure water | XA/XD | XB/XD | XA/XB |
| | DR60 | DR153 | DR167 | A1 | A2 | A3 | A4 | B1 | B2 | B3 | B4 | B5 | B6 | A1' | B1' | | | | |
| Example A4-1 | 15 | 0 | 0 | 1.5 | 0 | 0 | 0 | 15 | 0 | 0 | 0 | 0 | 0 | 0 | 0 | 68.5 | 0.10 | 1.00 | 0.10 |
| Example A4-2 | 15 | 0 | 0 | 0 | 3 | 0 | 0 | 15 | 0 | 0 | 0 | 0 | 0 | 0 | 0 | 67 | 0.20 | 1.00 | 0.20 |
| Example A4-3 | 15 | 0 | 0 | 0 | 0 | 2 | 0 | 15 | 0 | 0 | 0 | 0 | 0 | 0 | 0 | 68 | 0.13 | 1.00 | 0.13 |
| Example A4-4 | 15 | 0 | 0 | 0 | 0 | 0 | 3 | 0 | 15 | 0 | 0 | 0 | 0 | 0 | 0 | 67 | 0.20 | 1.00 | 0.20 |
| Example A4-5 | 15 | 0 | 0 | 0 | 5 | 0 | 0 | 0 | 15 | 0 | 0 | 0 | 0 | 0 | 0 | 65 | 0.33 | 1.00 | 0.33 |
| Example A4-6 | 35 | 0 | 0 | 0 | 4.5 | 0 | 0 | 0 | 35 | 0 | 0 | 0 | 0 | 0 | 0 | 25.5 | 0.13 | 1.00 | 0.13 |
| Example A4-7 | 30 | 0 | 0 | 0 | 4 | 0 | 0 | 0 | 30 | 0 | 0 | 0 | 0 | 0 | 0 | 36 | 0.13 | 1.00 | 0.13 |
| Example A4-8 | 15 | 0 | 0 | 5 | 0 | 0 | 0 | 0 | 15 | 0 | 0 | 0 | 0 | 0 | 0 | 65 | 0.33 | 1.00 | 0.33 |
| Example A4-9 | 3.8 | 0 | 0 | 5 | 0 | 0 | 0 | 0 | 3.8 | 0 | 0 | 0 | 0 | 0 | 0 | 87.4 | 1.32 | 1.00 | 1.32 |
| Example A4-10 | 1.9 | 0 | 0 | 5 | 0 | 0 | 0 | 0 | 1.9 | 0 | 0 | 0 | 0 | 0 | 0 | 91.2 | 2.63 | 1.00 | 2.63 |
| Example A4-11 | 15 | 0 | 0 | 0 | 0.05 | 0 | 0 | 0 | 15 | 0 | 0 | 0 | 0 | 0 | 0 | 69.95 | 0 | 1.00 | 0 |
| Example A4-12 | 15 | 0 | 0 | 0 | 0 | 1.75 | 0 | 15 | 0 | 0 | 0 | 0 | 0 | 0 | 0 | 68.25 | 0.12 | 1.00 | 0.12 |
| Example A4-13 | 15 | 0 | 0 | 0 | 0 | 0 | 2 | 15 | 0 | 0 | 0 | 0 | 0 | 0 | 0 | 68 | 0.13 | 1.00 | 0.13 |
| Example A4-14 | 15 | 0 | 0 | 0 | 0 | 0 | 4 | 0 | 0 | 8 | 0 | 0 | 0 | 0 | 0 | 73 | 0.27 | 0.53 | 0.50 |
| Example A4-15 | 20 | 0 | 0 | 1.5 | 0 | 0 | 0 | 0 | 0 | 12 | 0 | 0 | 0 | 0 | 0 | 66.5 | 0.08 | 0.60 | 0.13 |
| Example A4-16 | 15 | 0 | 0 | 0 | 5 | 0 | 0 | 0 | 0 | 0 | 8 | 0 | 0 | 0 | 0 | 72 | 0.33 | 0.53 | 0.63 |
| Example A4-17 | 15 | 0 | 0 | 4 | 0 | 0 | 0 | 0 | 0 | 0 | 0 | 10 | 0 | 0 | 0 | 71 | 0.27 | 0.67 | 0.40 |

TABLE 4-4

| | Blending amount [parts by mass] | | | | | | | | | | | | | | | | | | |
|---|---|---|---|---|---|---|---|---|---|---|---|---|---|---|---|---|---|---|---|
| | Disperse dye | | | Substance A | | | | Anionic dispersing agent | | | | | | Another component | | Pure water | XA/XD | XB/XD | XA/XB |
| | DR60 | DR153 | DR167 | A1 | A2 | A3 | A4 | B1 | B2 | B3 | B4 | B5 | B6 | A1' | B1' | | | | |
| Example A4-18 | 15 | 0 | 0 | 0 | 0 | 0.8 | 0 | 10 | 0 | 0 | 0 | 0 | 0 | 0 | 0 | 74.2 | 0.05 | 0.67 | 0.08 |
| Example A4-19 | 15 | 0 | 0 | 8 | 0 | 0 | 0 | 0 | 10 | 0 | 0 | 0 | 0 | 0 | 0 | 67 | 0.53 | 0.67 | 0.80 |
| Example A4-20 | 15 | 0 | 0 | 4 | 0 | 0 | 0 | 0 | 0 | 0 | 10 | 0 | 0 | 0 | 0 | 71 | 0.27 | 0.67 | 0.40 |
| Example A4-21 | 15 | 0 | 0 | 0 | 2 | 0 | 0 | 0 | 0 | 0 | 0 | 10 | 0 | 0 | 0 | 73 | 0.13 | 0.67 | 0.20 |
| Comparative Example A4-1 | 0 | 15 | 0 | 1.5 | 0 | 0 | 0 | 15 | 0 | 0 | 0 | 0 | 0 | 0 | 0 | 68.5 | 0.10 | 1.00 | 0.10 |
| Comparative Example A4-2 | 0 | 0 | 15 | 1.5 | 0 | 0 | 0 | 15 | 0 | 0 | 0 | 0 | 0 | 0 | 0 | 68.5 | 0.10 | 1.00 | 0.10 |
| Comparative Example A4-3 | 15 | 0 | 0 | 0 | 0 | 0 | 0 | 15 | 0 | 0 | 0 | 0 | 0 | 0 | 0 | 70 | 0 | 1.00 | 0.00 |
| Comparative Example A4-4 | 15 | 0 | 0 | 0 | 0 | 0 | 0 | 15 | 0 | 0 | 0 | 0 | 0 | 1.5 | 0 | 68.5 | 0 | 1.00 | 0.00 |
| Comparative Example A4-5 | 15 | 0 | 0 | 1.5 | 0 | 0 | 0 | 0 | 0 | 0 | 0 | 0 | 0 | 0 | 15 | 68.5 | 0.10 | 0 | — |
| Comparative Example A4-6 | 15 | 0 | 0 | 1.5 | 0 | 0 | 0 | 0 | 0 | 0 | 0 | 0 | 0 | 0 | 0 | 83.5 | 0.10 | 0 | — |

[2] Evaluation on Stock Solution for Producing Ink Jet Ink

[2-1] Storage Stability (Change in Particle Diameter)

For each of the aqueous ink jet compositions (stock solutions for producing ink jet inks) of the respective Examples and Comparative Examples, an average particle diameter of the disperse dye immediately after production and an average particle diameter of the disperse dye after being placed in a predetermined container and left to stand for one week in an environment of 60° C. were obtained. From these values, a variation rate of the average particle diameter of the disperse dye after being left to stand for one week in an environment of 60° C. with respect to the average D: Variation rate of average particle diameter is equal to or greater than 7% and less than 10%.

E: Variation rate of average particle diameter is equal to or greater than 10%.

[2-2] Generation Status of Foreign Matters

Each of the aqueous ink jet compositions (stock solutions for producing ink jet inks) of the respective Examples and Comparative Examples was placed in a predetermined glass bottle by 10 mL each, and left to stand for 5 days in an environment of 60° C., in a state where a gas-liquid interface is present. Thereafter, the aqueous ink jet composition (stock solution for producing an ink jet ink) was filtered through a metal mesh filter (aperture of 10 μm), and the number of solids remaining on the metal mesh filter per 1 mm square was counted. Evaluation was performed according to the following criteria.

A: Number of solids per 1 mm square is less than 5.

B: Number of solids per 1 mm square is equal to or greater than 5 and less than 20.

C: Number of solids per 1 mm square is equal to or greater than 20 and less than 30.

D: Number of solids per 1 mm square is equal to or greater than 30 and less than 50.

E: Number of solids per 1 mm square is equal to or greater than 50.

These results are summarized in Table 4-5.

TABLE 4-5

|  | Storage stability | Generation status of foreign matters |
|---|---|---|
| Example A4-1 | A | A |
| Example A4-2 | A | A |
| Example A4-3 | A | A |
| Example A4-4 | B | B |
| Example A4-5 | B | D |
| Example A4-6 | B | D |
| Example A4-7 | B | B |
| Example A4-8 | A | A |
| Example A4-9 | C | B |
| Example A4-10 | D | B |
| Example A4-11 | B | B |
| Example A4-12 | A | A |
| Example A4-13 | A | A |
| Example A4-14 | B | B |
| Example A4-15 | B | B |
| Example A4-16 | B | B |
| Example A4-17 | B | B |
| Example A4-18 | B | B |
| Example A4-19 | C | C |
| Example A4-20 | C | C |
| Example A4-21 | B | C |
| Comparative Example A4-1 | E | D |
| Comparative Example A4-2 | E | E |
| Comparative Example A4-3 | E | E |
| Comparative Example A4-4 | E | E |
| Comparative Example A4-5 | E | E |
| Comparative Example A4-6 | E | E |

As is apparent from Table 4-5, excellent results were obtained in the invention. On the contrary, satisfactory results were not obtained in the Comparative Examples.

[3] Preparation of Ink Jet Ink (Aqueous Ink Jet Composition)

Example B4-1

The stock solution for producing an ink jet ink prepared in Example A4-1, glycerin, 2-pyrrolidone, propylene glycol, BYK 348 (manufactured by BYK Chemie Japan) as a silicone-based surfactant, and pure water were mixed at a proportion as shown in Table 6, and the mixture was stirred with High Shear Mixer (manufactured by Silverson Machines, Inc.) at 3,000 rpm to produce an ink jet ink as an aqueous ink jet composition.

An average particle diameter of C.I. Disperse Red 60 in the ink jet ink was 150 nm.

Examples B4-2 to B4-19

Ink jet inks as aqueous ink jet compositions were produced in the same manner as in Example B1, except that types of the stock solutions for producing ink jet inks were as shown in Tables 4-6 and 4-7, and blending proportions of the respective components were as shown in Tables 4-6 and 4-7.

Comparative Examples B4-1 to B4-6

Ink jet inks as aqueous ink jet compositions were produced in the same manner as in Example B4-1, except that types of the stock solutions for producing ink jet inks were as shown in Table 7 and blending proportions of the respective components were as shown in Table 4-7.

Conditions for the aqueous ink jet compositions (ink jet inks) of the respective Examples and Comparative Examples are summarized in Tables 4-6 and 4-7. In the tables, glycerin is indicated as "Gly", 2-pyrrolidone is indicated as "2-Py", propylene glycol is indicated as "PG", BYK 348 (manufactured by BYK Chemie Japan) as a silicone-based surfactant is indicated as "BYK 348", and Olfine EXP4300 (manufactured by Nissin Chemical Industry Co., Ltd.) as an acetylene-based surfactant is indicated as "EXP 4300". In addition, each of the ink jet inks of Examples B1 to B19 had a viscosity which is a value within a range of equal to or greater than 2.0 mPa·s and equal to or less than 10 mPa·s, and surface tension which is a value within a range of equal to or greater than 25 mN/m and equal to or less than 35 mN/m. For the viscosity, measurement was performed at 25° C. using a viscoelasticity tester MCR-300 (manufactured by Physica) by raising Shear Rate from $10 \text{ s}^{-1}$ to $1,000 \text{ s}^{-1}$ and reading a viscosity at the time of Shear Rate 200. In addition, for the surface tension, measurement was performed by the Wilhelmy method at 25° C. using a surface tension meter (CBVP-7, manufactured by Kyowa Interface Science Co., Ltd.).

TABLE 4-6

| | | Blending amount [parts by mass] | | | | | |
|---|---|---|---|---|---|---|---|
| | Stock solution | | Solvent other than water | | | Surfactant | Pure |
| | Type | | Gly | 2-Py | PG | BYK 348 | EXP 4300 | water |
| Example B4-1 | Example A4-1 | 50.0 | 10.0 | 5.0 | 5.0 | 1.0 | 0 | 29 |
| Example B4-2 | Example A4-1 | 5.0 | 20.0 | 5.0 | 5.0 | 1.0 | 0 | 64 |
| Example B4-3 | Example A4-2 | 50.0 | 10.0 | 5.0 | 5.0 | 1.0 | 0 | 29 |
| Example B4-4 | Example A4-3 | 50.0 | 10.0 | 5.0 | 5.0 | 1.0 | 0 | 29 |
| Example B4-5 | Example A4-4 | 50.0 | 10.0 | 5.0 | 5.0 | 0 | 1.0 | 29 |
| Example B4-6 | Example A4-7 | 50.0 | 10.0 | 5.0 | 5.0 | 1.0 | 0 | 29 |
| Example B4-7 | Example A4-8 | 2.5 | 20.0 | 5.0 | 5.0 | 0 | 1.0 | 66.5 |
| Example B4-8 | Example A4-9 | 2.5 | 20.0 | 5.0 | 5.0 | 0 | 1.0 | 66.5 |
| Example B4-9 | Example A4-10 | 2.5 | 20.0 | 5.0 | 5.0 | 0 | 1.0 | 66.5 |
| Example B4-10 | Example A4-12 | 50.0 | 10.0 | 5.0 | 5.0 | 1.0 | 0 | 29 |

TABLE 4-6-continued

| | | Blending amount [parts by mass] | | | | | |
|---|---|---|---|---|---|---|---|
| | Stock solution | Solvent other than water | | | Surfactant | | Pure |
| | Type | Gly | 2-Py | PG | BYK 348 | EXP 4300 | water |
| Example B4-11 | Example A4-13 | 50.0 | 10.0 | 5.0 | 5.0 | 1.0 | 0 | 29 |
| Example B4-12 | Example A4-14 | 50.0 | 10.0 | 5.0 | 5.0 | 0 | 1.0 | 29 |
| Example B4-13 | Example A4-15 | 2.5 | 20.0 | 5.0 | 5.0 | 1.0 | 0 | 66.5 |
| Example B4-14 | Example A4-16 | 50.0 | 10.0 | 5.0 | 5.0 | 1.0 | 0 | 29 |
| Example B4-15 | Example A4-17 | 50.0 | 10.0 | 5.0 | 5.0 | 1.0 | 0 | 29 |

TABLE 4-7

| | | Blending amount [parts by mass] | | | | | |
|---|---|---|---|---|---|---|---|
| | Stock solution | Solvent other than water | | | Surfactant | | Pure |
| | Type | Gly | 2-Py | PG | BYK 348 | EXP 4300 | water |
| Example B4-16 | Example A4-18 | 50.0 | 10.0 | 5.0 | 5.0 | 1.0 | 0 | 29 |
| Example B4-17 | Example A4-19 | 50.0 | 10.0 | 5.0 | 5.0 | 0 | 1.0 | 29 |
| Example B4-18 | Example A4-20 | 50.0 | 10.0 | 5.0 | 5.0 | 1.0 | 0 | 29 |
| Example B4-19 | Example A4-21 | 50.0 | 10.0 | 5.0 | 5.0 | 0 | 1.0 | 29 |
| Comparative Example B4-1 | Comparative Example A4-1 | 50.0 | 10.0 | 5.0 | 5.0 | 1.0 | 0 | 29 |
| Comparative Example B4-2 | Comparative Example A4-2 | 50.0 | 10.0 | 5.0 | 5.0 | 1.0 | 0 | 29 |
| Comparative Example B4-3 | Comparative Example A4-3 | 50.0 | 10.0 | 5.0 | 5.0 | 1.0 | 0 | 29 |
| Comparative Example B4-4 | Comparative Example A4-4 | 5.0 | 10.0 | 5.0 | 5.0 | 1.0 | 0 | 74 |
| Comparative Example B4-5 | Comparative Example A4-5 | 50.0 | 10.0 | 5.0 | 5.0 | 1.0 | 0 | 29 |
| Comparative Example B4-6 | Comparative Example A4-6 | 50.0 | 10.0 | 5.0 | 5.0 | 1.0 | 0 | 29 |

[4] Evaluation on Ink Jet Ink

[4-1] Storage Stability (Change in Particle Diameter)

For each of the aqueous ink jet compositions (ink jet inks) of the respective Examples and Comparative Examples, an average particle diameter of the disperse dye immediately after production and an average particle diameter of the disperse dye after being placed in a predetermined ink-holding container and left to stand for one week in an environment of 60° C. were obtained. From these values, a variation rate of the average particle diameter of the disperse dye after being left to stand for one week in an environment of 60° C. with respect to the average particle diameter of the disperse dye immediately after production was obtained, and evaluation was performed according to the following criteria. For measurement of the average particle diameter, Microtrac UPA (manufactured by Nikkiso Co., Ltd.) was used.

A: Variation rate of average particle diameter is less than 3%.

B: Variation rate of average particle diameter is equal to or greater than 3% and less than 5%.

C: Variation rate of average particle diameter is equal to or greater than 5% and less than 7%.

D: Variation rate of average particle diameter is equal to or greater than 7% and less than 10%.

E: Variation rate of average particle diameter is equal to or greater than 10%.

[4-2] Generation Status of Foreign Matters

Each of the aqueous ink jet compositions (stock solutions for producing ink jet inks) of the respective Examples and Comparative Examples was placed in a predetermined glass bottle by 10 mL each, and left to stand for 5 days in an environment of 60° C., in a state where a gas-liquid interface is present. Thereafter, the aqueous ink jet composition (stock solution for producing an ink jet ink) was filtered through a metal mesh filter (aperture of 10 μm), and the number of solids remaining on the metal mesh filter per 1 mm square was counted. Evaluation was performed according to the following criteria.

A: Number of solids per 1 mm square is less than 5.

B: Number of solids per 1 mm square is equal to or greater than 5 and less than 20.

C: Number of solids per 1 mm square is equal to or greater than 20 and less than 30.

D: Number of solids per 1 mm square is equal to or greater than 30 and less than 50.

E: Number of solids per 1 mm square is equal to or greater than 50.

[4-3] Discharge Stability by Ink Jet Method

A predetermined ink-holding container was filled with each of the aqueous ink jet compositions (ink jet inks) of the respective Examples and Comparative Examples and was left to stand for 5 days in an environment of 60° C.

Thereafter, the holding container was mounted on a recording apparatus PX-H 6000 (manufactured by Seiko Epson Corporation), and the ink jet ink was discharged so that a solid pattern was adhered on TRANSJET Classic (manufactured by Cham Paper), which is an intermediate transfer medium, at a recording resolution of 1440×720 dpi. An operating environment of the recording apparatus (printer) was set at 40° C. and 20 RH %.

The number of times of nozzle omission at the time of recording 30 solid patterns on the intermediate transfer medium was examined, and evaluation was performed according to the following criteria.

A: Number of times of nozzle omission is 0.
B: Number of times of nozzle omission is equal to or greater than 1 and equal to or less than 9.
C: Number of times of nozzle omission is equal to or greater than 10 and equal to or less than 19.
D: Number of times of nozzle omission is equal to or greater than 20 and equal to or less than 29.
E: Number of times of nozzle omission is equal to or greater than 30.

An ink-holding container (the above-described ink-holding container) which is PX-H 6000 manufactured by Seiko Epson Corporation is provided with an ink pour that allows refill of an aqueous ink jet composition, and is open to the atmosphere in a case of being mounted on a recording apparatus in a usable state.

[4-4] Clogging Recoverability

A predetermined ink-holding container was filled with each of the aqueous ink jet compositions (ink jet inks) of the respective Examples and Comparative Examples, and the holding container was mounted on a recording apparatus PX-H 6000 (manufactured by Seiko Epson Corporation).

After confirming that discharge normally occurs in all nozzles, the power of the recording apparatus was turned off in a normal state, and was left to stand for 2 months under an environment of 40° C.

Thereafter, the number of times taken to reach normal discharge by a suction-induced recovery operation was obtained, and evaluation was performed according to the following criteria.

A: Clean discharge occurs immediately after the power is turned on.
B: Normalization is achieved with 1 to 2 recovery operations.
C: Normalization is achieved with 3 to 4 recovery operations.
D: Normalization is achieved with 5 to 6 recovery operations.
E: Recovery is not made with 6 recovery operations.

[4-5] Color Developing Property (OD Value)

An adhesion side of the aqueous ink jet composition on the thirtieth intermediate transfer medium to which the ink jet ink had been adhered in [4-3] was brought into close contact with cloth (polyester 100%, Amina, manufactured by Toray Industries, Inc.) which is a white recording medium. In this state, sublimation transfer was carried out by performing heating using a heat press machine (TP-608M, manufactured by Taiyo Seiki Co., Ltd.) at a condition of 180° C. and 60 seconds, so that each recorded matter was obtained.

For each recorded matter obtained, evaluation on color developing property was performed. Specifically, for each recorded matter obtained, an OD value was measured using a colorimeter (Gretag Macbeth Spectrolino, manufactured by X-Rite), and evaluation was performed according to the following criteria.

A: OD value is equal to or greater than 1.50.
B: OD value is equal to or greater than 1.45 and less than 1.50.
C: OD value is equal to or greater than 1.40 and less than 1.45.
D: OD value is equal to or greater than 1.35 and less than 1.40.
E: OD value is less than 1.35.

These results are summarized in Table 8.

TABLE 4-8

| | Storage stability | Generation status of foreign matters | Discharge stability | Clogging recoverability | Color developing property |
|---|---|---|---|---|---|
| Example B4-1 | A | A | A | A | A |
| Example B4-2 | A | A | B | A | E |
| Example B4-3 | A | A | A | A | A |
| Example B4-4 | A | A | A | A | A |
| Example B4-5 | B | B | A | A | A |
| Example B4-6 | B | B | A | C | A |
| Example B4-7 | A | A | A | A | E |
| Example B4-8 | C | B | C | A | E |
| Example B4-9 | D | B | C | A | E |
| Example B4-10 | A | A | A | A | A |
| Example B4-11 | A | A | A | A | A |
| Example B4-12 | B | B | A | A | A |
| Example B4-13 | B | A | C | B | E |
| Example B4-14 | B | B | B | A | A |
| Example B4-15 | B | B | B | A | A |
| Example B4-16 | B | B | A | A | A |
| Example B4-17 | C | C | A | A | A |
| Example B4-18 | C | C | D | D | A |
| Example B4-19 | B | C | D | D | A |
| Comparative Example B4-1 | E | D | A | B | E |
| Comparative Example B4-2 | E | E | A | B | E |
| Comparative Example B4-3 | E | E | A | B | A |
| Comparative Example B4-4 | E | E | C | E | A |
| Comparative Example B4-5 | E | E | A | E | A |

TABLE 4-8-continued

|  | Storage stability | Generation status of foreign matters | Discharge stability | Clogging recoverability | Color developing property |
|---|---|---|---|---|---|
| Comparative Example B4-6 | E | E | E | E | A |

As is apparent from Table 4-8, excellent results were obtained in the invention. On the contrary, satisfactory results were not obtained in the Comparative Examples.

Hereinafter, a fifth suitable embodiment of the invention will be described in detail.

Aqueous Ink Jet Composition

Among various disperse dyes, C.I. Disperse Blue 359 has features such as an excellent color developing property while having the following problems. That is, in a case where C.I. Disperse Blue 359 is used as a constituent component of an aqueous ink jet composition in the related art, the C.I. Disperse Blue 359 does not make it possible for the aqueous ink jet composition to have a sufficiently excellent storage stability, which remarkably causes a problem that clogging occurs in a nozzle of a liquid droplet discharge head during discharge by an ink jet method after long-term storage.

Therefore, the present inventor has conducted intensive studies aimed at providing an aqueous ink jet composition capable of effectively preventing occurrence of the problems as mentioned above while making full use of the excellent features of C.I. Disperse Blue 359.

As a result, the present inventor has reached the invention.

That is, the aqueous ink jet composition of the invention contains C.I. Disperse Blue 359 and a styrene maleic acid-based dispersing agent represented by Formula (1).

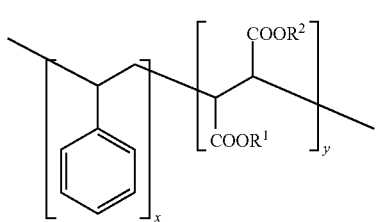

(1)

(In Formula (1), one of $R^1$ and $R^2$ is —$(CH_2CH_2O)_nR^3$ (where $R^3$ is H, $CH_3$, or $C_2H_5$, and n is an integer of equal to or greater than 1), —$CH_2CH(CH_3)_2$, or —$(CH_2)_3CH_3$, and the other is —H, —$(CH_2CH_2O)_nR^3$ (where $R^3$ is H, $CH_3$, or $C_2H_5$, and n is an integer of equal to or greater than 1), —$CH_2CH(CH_3)_2$, —$(CH_2)_3CH_3$, or a counterion constituting a salt, and x and y have a relationship such that when x is 1, y is equal to or greater than 0.2 and equal to or less than 1.0.)

With such a constitution, it is possible to provide an aqueous ink jet composition which has effects obtained by containing C.I. Disperse Blue 359 that is a disperse dye having features such as an excellent color developing property in a low-temperature process due to a relatively small molecular weight, while hardly causing clogging in a nozzle of a liquid droplet discharge head during discharge by an ink jet method. In particular, even in a case where the aqueous ink jet composition is stored under harsh environments (for example, under a high-temperature environment, under a low-temperature environment, under an environment with a large temperature change, and the like), a case of being stored for a long time, a case where mass printing is carried out, or the like (hereinafter these storage conditions and use conditions may be collectively simply referred to as "during long-term storage or the like", excellent discharge stability can be maintained. In addition, once even clogging occurs in a nozzle, the clogging can be suitably eliminated by making the nozzle capped (nozzle capping) or by a suction-induced recovery operation, and excellent discharge stability can be easily recovered.

On the contrary, in a case where the styrene maleic acid-based dispersing agent is not used, or in a case where another dispersing agent (for example, a dispersing agent other than a styrene maleic acid-based dispersing agent, a dispersing agent which is a styrene maleic acid-based dispersing agent but is other than the styrene maleic acid-based dispersing agent represented by the above formula, or the like) is used in place of the styrene maleic acid-based dispersing agent, the above-mentioned excellent effects cannot be obtained.

For example, in a case of Formula (1) in which there is a relationship such that when x is 1, y is less than 0.2, a maleic acid skeleton is small relative to a styrene skeleton, so that dispersion stability of C.I. Disperse Blue 359 in the aqueous ink jet composition cannot be ensured, so that discharge stability according to an ink jet method is decreased during long-term storage of the aqueous ink jet composition, or the like. In addition, once clogging occurs in a nozzle, it becomes difficult to achieve recovery.

In addition, in a case of Formula (1) in which there is a relationship such that when x is 1, y is greater than 1.0, the styrene skeleton is small relative to the maleic acid skeleton, so that adsorptivity of the dispersing agent onto C.I. Disperse Blue 359 is poor, and desorption of the dispersing agent easily occurs. Thus, discharge stability according to an ink jet method is decreased during long-term storage of the aqueous ink jet composition, or the like. In addition, once clogging occurs in a nozzle, it becomes difficult to achieve recovery.

In addition, in the present specification, the aqueous ink jet composition is a concept including not only an ink itself to be discharged by an ink jet method but also a stock solution used for preparing the ink. In other words, the aqueous ink jet composition of the invention may be subjected to discharge by an ink jet method as it is, or may be subjected to discharge by an ink jet method after treatments such as dilution.

Styrene Maleic Acid-Based Dispersing Agent

The aqueous ink jet composition of the invention contains a styrene maleic acid-based dispersing agent represented by Formula (1).

By using the styrene maleic acid-based dispersing agent in combination with C.I. Disperse Blue 359, dispersion stability of C.I. Disperse Blue 359 in the aqueous ink jet composition and storage stability of the aqueous ink jet composition can be made excellent, and occurrence of clogging in a nozzle of a liquid droplet discharge head during discharge by an ink jet method can be effectively prevented even in a case of being stored for a long time, or the like. As a result, it is possible to stably perform discharge of the aqueous ink jet composition for a long period of time, and it is possible to keep quality of a recorded matter obtained by an ink jet method in a stable and excellent manner. In addition, the styrene maleic acid-based dispersing agent is a component which hardly causes an adverse effect on quality of a recorded matter and an adverse effect in sublimation printing.

As described above, the styrene maleic acid-based dispersing agent may have a counterion constituting a salt. As the counterion, for example, a divalent or higher ion such as an alkaline earth metal ion may be used. The counterion is preferably a monovalent ion.

As the monovalent ion, for example, ammonium, amines, an alkali metal, and the like are mentioned.

It is sufficient that n is an integer of equal to or greater than 1. n is preferably an integer of equal to or greater than 1 and equal to or less than 10, and more preferably an integer of equal to or greater than 1 and equal to or less than 5.

Accordingly, storage stability of the aqueous ink jet composition is further improved, and occurrence of clogging in a nozzle of a liquid droplet discharge head during discharge by an ink jet method is effectively prevented even in a case of being stored for a long time, or the like.

As described above, it is sufficient that one of $R^1$ and $R^2$ is $-(CH_2CH_2O)_nR^3$ (where $R^3$ is H, $CH_3$, or $C_2H_5$, and n is an integer of equal to or greater than 1), $-CH_2CH(CH_3)_2$, or $-(CH_2)_3CH_3$, and the other is $-H$, $-(CH_2CH_2O)_nR^3$ (where $R^3$ is H, $CH_3$, or $C_2H_5$, and n is an integer of equal to or greater than 1), $-CH_2CH(CH_3)_2$, $-(CH_2)_3CH_3$, or a counterion constituting a salt. It is preferable that one be $-CH_2CH(CH_3)_2$ and the other be $-H$.

Accordingly, dispersion stability of C.I. Disperse Blue 359 in the aqueous ink jet composition and storage stability of the aqueous ink jet composition can be made further excellent, and occurrence of clogging in a nozzle of a liquid droplet discharge head during discharge by an ink jet method can be more effectively prevented even in a case of being stored for a long time or the like. As a result, it is possible to more stably perform discharge of the aqueous ink jet composition for a long period of time, and it is possible to keep quality of a recorded matter obtained by an ink jet method in a more stable and excellent manner.

In addition, as described above, it is sufficient that a proportion between x and y satisfies a relationship such that when x is 1, y is equal to or greater than 0.2 and equal to or less than 1.0. It is preferable that when x is 1, a value of y be equal to or greater than 0.3 and equal to or less than 1.0, and it is more preferable that when x is 1, a value of y be equal to or greater than 0.4 and equal to or less than 1.0.

Accordingly, as for dispersion stability of C.I. Disperse Blue 359, a ratio of hydrophilic groups to hydrophobic groups is made more suitable, and long-term stability of the aqueous ink jet composition is made further excellent.

A weight average molecular weight Mw of the styrene maleic acid-based dispersing agent is not particularly limited. The weight average molecular weight Mw is preferably equal to or greater than 7,000 and equal to or less than 20,000, more preferably equal to or greater than 8,000 and equal to or less than 18,000, and even more preferably equal to or greater than 10,000 and equal to or less than 15,000.

Accordingly, storage stability of the aqueous ink jet composition is further improved, and occurrence of clogging in a nozzle of a liquid droplet discharge head during discharge by an ink jet method is effectively prevented even in a case of being stored for a long time, or the like.

The aqueous ink jet composition may contain two or more types of compounds represented by General Formula (1).

A content of the styrene maleic acid-based dispersing agent represented by Formula (1) in the aqueous ink jet composition is preferably equal to or greater than 0.1% by mass and equal to or less than 25% by mass, more preferably equal to or greater than 0.5% by mass and equal to or less than 20% by mass, and even more preferably equal to or greater than 1.0% by mass and equal to or less than 15% by mass.

Accordingly, storage stability of the aqueous ink jet composition is further improved, and occurrence of clogging in a nozzle of a liquid droplet discharge head during discharge by an ink jet method is effectively prevented even in a case of being stored for a long time, or the like.

In particular, in a case where the aqueous ink jet composition is an ink itself to be discharged by an ink jet method, a content of the styrene maleic acid-based dispersing agent represented by Formula (1) in the ink is preferably equal to or greater than 0.1% by mass and equal to or less than 10% by mass, more preferably equal to or greater than 1.0% by mass and equal to or less than 9.0% by mass, and even more preferably equal to or greater than 2.0% by mass and equal to or less than 8.0% by mass.

In addition, in a case where the aqueous ink jet composition is a stock solution used for preparing an ink to be discharged by an ink jet method, a content of the styrene maleic acid-based dispersing agent represented by Formula (1) in the stock solution is preferably equal to or greater than 1.0% by mass and equal to or less than 30% by mass, more preferably equal to or greater than 2.0% by mass and equal to or less than 25% by mass, and even more preferably equal to or greater than 5.0% by mass and equal to or less than 20% by mass.

In a case where the aqueous ink jet composition contains two or more types of compounds represented by General Formula (1), for the content, a sum of contents of these plural types of compounds is adopted.

C.I. Disperse Blue 359

The aqueous ink jet composition contains C.I. Disperse Blue 359 as a disperse dye.

A content of C.I. Disperse Blue 359 in the aqueous ink jet composition is preferably equal to or greater than 0.1% by mass and equal to or less than 25% by mass, more preferably equal to or greater than 1.0% by mass and equal to or less than 20% by mass, and even more preferably equal to or greater than 2.0% by mass and equal to or less than 15% by mass.

Accordingly, it is possible to obtain a higher color density in a recorded portion formed by using the aqueous ink jet composition, while further improving storage stability of the aqueous ink jet composition and more effectively preventing occurrence of clogging in a nozzle of a liquid droplet discharge head during discharge by an ink jet method even in a case of being stored for a long time, or the like.

In addition, in the aqueous ink jet composition, in a case where a content of C.I. Disperse Blue 359 is set as XD [% by mass] and a content of the styrene maleic acid-based dispersing agent is set as XM [% by mass], it is preferable that a relationship of $0.04 \leq XM/XD \leq 25$ be satisfied, it is more preferable that a relationship of $0.1 \leq XM/XD \leq 5.0$ be satisfied, and it is even more preferable that a relationship of $0.35 \leq XM/XD \leq 1.3$ be satisfied.

Accordingly, storage stability of the aqueous ink jet composition is further improved, and occurrence of clogging in a nozzle of a liquid droplet discharge head during discharge by an ink jet method is effectively prevented even in a case of being stored for a long time, or the like.

An average particle diameter of C.I. Disperse Blue 359 in the aqueous ink jet composition is preferably equal to or greater than 50 nm and equal to or less than 300 nm, more preferably equal to or greater than 75 nm and equal to or less than 250 nm or less, and even more preferably equal to or greater than 100 nm and equal to or less than 200 nm.

Accordingly, storage stability of the aqueous ink jet composition is further improved. In addition, a recorded portion formed by using the aqueous ink jet composition can be more effectively sublimated, and application to sublimation printing can be more suitably achieved.

In the present specification, the average particle diameter refers to an average particle diameter on a volume basis unless otherwise specified. The average particle diameter can be obtained, for example, by measurement using Microtrac UPA (manufactured by Nikkiso CO., LTD.).

Water

The aqueous ink jet composition contains water.

A content of water in the aqueous ink jet composition is not particularly limited. The content of water is preferably equal to or greater than 30% by mass and equal to or less than 85% by mass, more preferably equal to or greater than 35% by mass and equal to or less than 80% by mass, and even more preferably equal to or greater than 40% by mass and equal to or less than 75% by mass.

Accordingly, a viscosity of the aqueous ink jet composition can be more reliably adjusted to a suitable value, and discharge stability according to an ink jet method can be further improved.

Solvent Other than Water

The aqueous ink jet composition may contain a solvent other than water.

Accordingly, a viscosity of the aqueous ink jet composition can be suitably adjusted, and a moisture retaining property of the aqueous ink jet composition can be increased. As a result, liquid droplet discharge by an ink jet method can be performed in a more stable manner.

As the solvent other than water which is contained in the aqueous ink jet composition, for example, glycerin, propylene glycol, 2-pyrrolidone, and the like are mentioned.

By containing these solvents, a slow evaporation rate is achieved due to an excellent moisture retaining capability, which makes it possible to perform liquid droplet discharge in a more stable manner.

A content of the solvent other than water which is contained in the aqueous ink jet composition is preferably equal to or greater than 0% by mass and equal to or less than 45% by mass, more preferably equal to or greater than 10% by mass and equal to or less than 43% by mass, and even more preferably equal to or greater than 15% by mass and equal to or less than 40% by mass.

Accordingly, effects obtained by containing the solvent other than water as described above are exerted in a more remarkable manner.

Surfactant

The aqueous ink jet composition may contain a surfactant.

Accordingly, it is possible to achieve more suitable wettability of the aqueous ink jet composition with respect to a recording medium (base material), which is advantageous for obtaining better image quality.

As the surfactant contained in the aqueous ink jet composition, for example, various surfactants such as an anionic surfactant, a cationic surfactant, and a nonionic surfactant can be used.

More specifically, as the surfactant contained in the aqueous ink jet composition, for example, an acetylene-based surfactant, a silicone-based surfactant, a fluorine-based surfactant, and the like are mentioned.

In a case where the aqueous ink jet composition contains the acetylene-based surfactant, dynamic surface tension of the aqueous ink jet composition can be suitably decreased, and quick orientation can be made with respect to meniscus. As a result, discharge stability according to an ink jet method can be made further excellent.

In a case where the aqueous ink jet composition contains the acetylene-based surfactant, a content of the acetylene-based surfactant in the aqueous ink jet composition is preferably equal to or greater than 5.0 parts by mass and equal to or less than 75 parts by mass, more preferably equal to or greater than 6.0 parts by mass and equal to or less than 60 parts by mass, and even more preferably equal to or greater than 7.0 parts by mass and equal to or less than 40 parts by mass, with respect to 100 parts by mass of C.I. Disperse Blue 359.

Accordingly, effects obtained by containing the acetylene-based surfactant as described above are exerted in a more remarkable manner.

As commercially available acetylene-based surfactants, for example, Olfine E1004, Olfine E1010, Olfine E1020, Olfine PD-001, Olfine PD-002W, Olfine PD-004, Olfine PD-005, Olfine EXP4001, Olfine EXP4200, Olfine EXP4123, Olfine EXP4300, Olfine WE-001, Olfine WE-003 (all of which are manufactured by Nissin Chemical Industry Co., Ltd.), and the like are mentioned.

Other Components

The aqueous ink jet composition may contain a component (another component) other than the components as described above.

As the other component, for example, a coloring agent other than C.I. Disperse Blue 359, a dispersing agent other than the styrene maleic acid-based dispersing agent as described above, a penetrating agent such as triethylene glycol monomethyl ether, triethylene glycol monobutyl ether, diethylene glycol monomethyl ether, 1,2-hexanediol, 1,2-pentanediol, 1,2-butanediol, and 3-methyl-1,5-pentanediol, a pH adjusting agent, a chelating agent such as ethylenediamine tetraacetate (EDTA), an antiseptic or antifungal agent, an antirust agent, and the like are mentioned. As the antiseptic or antifungal agent, for example, a compound having an isothiazoline ring structure in a molecule can be suitably used.

A content (in a case where plural types of components are contained as the other component, the content is a sum of contents thereof) of the other component is preferably equal to or less than 6% by mass, and more preferably equal to or less than 5% by mass.

In particular, in a case where the aqueous ink jet composition of the invention contains a dispersing agent (another dispersing agent) other than the styrene maleic acid-based dispersing agent as described above, a content of the dispersing agent (the other dispersing agent) is preferably equal to or less than 5% by mass, and more preferably equal to or less than 3% by mass.

Surface tension of the aqueous ink jet composition at 20° C. is preferably equal to or greater than 20 mN/m and equal to or less than 50 mN/m, more preferably equal to or greater than 21 mN/m and equal to or less than 40 mN/m, and even more preferably equal to or greater than 23 mN/m and equal to or less than 30 mN/m.

Accordingly, clogging in a nozzle of a liquid droplet discharge head or the like becomes harder to occur, and discharge stability of the aqueous ink jet composition is further improved. In addition, even in a case where clogging in the nozzle occurs, recoverability achieved by making the nozzle capped (nozzle capping) can be made further excellent.

As the surface tension, a value measured by the Wilhelmy method can be adopted. For measurement of the surface tension, a surface tension meter (for example, CBVP-7, manufactured by Kyowa Interface Science Co., Ltd., and the like) can be used.

A viscosity of the aqueous ink jet composition at 20° C. is preferably equal to or greater than 2.0 mPa·s and equal to or less than 30 mPa·s, more preferably equal to or greater than 3.0 mPa·s and equal to or less than 20 mPa·s, and even more preferably equal to or greater than 4.0 mPa·s and equal to or less than 10 mPa·s.

Accordingly, discharge stability of the aqueous ink jet composition is further improved.

For the viscosity, measurement can be performed at 20° C. using a viscoelasticity tester (for example, MCR-300, manufactured by Physica) by raising Shear Rate from 10 s$^{-1}$ to 1,000 s$^{-1}$ and reading a viscosity at the time of Shear Rate 200.

The aqueous ink jet composition of the invention is usually applied to a recording apparatus by an ink jet method in a state of being held in a container such as a cartridge, a bag, and a tank. In other words, the recording apparatus according to the invention includes a container (an ink cartridge or the like) for holding the aqueous ink jet composition of the invention.

Recording Method

The aqueous ink jet composition of the invention can be applied, for example, to a direct printing method, a thermal transfer printing method (for example, sublimation printing), and the like, and can be suitably applied to the thermal transfer printing method from the viewpoint that C.I. Disperse Blue 359 has sublimability.

An example of the thermal transfer printing method (sublimation printing) will be described below as a recording method using the aqueous ink jet composition of the invention.

The recording method according to the present embodiment has an ink adhering step of adhering the aqueous ink jet composition to an intermediate transfer medium by an ink jet method and a transfer step of heating the intermediate transfer medium to which the aqueous ink jet composition has been adhered, to transfer, to a recording medium, C.I. Disperse Blue 359 as a sublimable dye which is contained in the aqueous ink jet composition.

Ink Adhering Step

In the ink adhering step, the aqueous ink jet composition is adhered to the intermediate transfer medium by an ink jet method. Discharge of the aqueous ink jet composition by an ink jet method can be carried out using a known ink jet recording apparatus. As a discharge method, a piezo method, a method of discharging an ink by foams (bubbles) generated by heating the ink, or the like can be used. Among these, the piezo method is preferable from the viewpoints of difficulty in deterioration of the aqueous ink jet composition, and the like.

In the ink adhering step, an ink other than the aqueous ink jet composition according to the invention may be used in combination.

Intermediate Transfer Medium

As the intermediate transfer medium, for example, paper such as plain paper, a recording medium (referred to as ink jet special paper, coated paper, or the like) provided with an ink receiving layer, or the like can be used. Among these, paper provided with an ink receiving layer formed of inorganic fine particles such as silica is preferable. Accordingly, it is possible to obtain an intermediate transfer medium, in which bleeding or the like is suppressed, by a process of drying the aqueous ink jet composition which has been adhered to the intermediate transfer medium. In addition, in a subsequent transfer step, sublimation of C.I. Disperse Blue 359 tends to progress more smoothly.

Transfer Step

Thereafter, the intermediate transfer medium to which the aqueous ink jet composition has been adhered is heated to transfer, to a recording medium, C.I. Disperse Blue 359 as a constituent component of the aqueous ink jet composition. Accordingly, a recorded matter is obtained.

A heating temperature in the present step is preferably equal to or higher than 160° C. and equal to or lower than 220° C., and more preferably equal to or higher than 170° C. and equal to or lower than 200° C.

Accordingly, energy required for transfer can be further decreased, and productivity of the recorded matter can be further improved. In addition, a color developing property of the obtained recorded matter can be further improved.

A heating time in the present step varies depending on a heating temperature. The heating time is preferably equal to or longer than 30 seconds and equal to or shorter than 90 seconds, and more preferably equal to or longer than 45 seconds and equal to or shorter than 80 seconds.

Accordingly, energy required for transfer can be further decreased, and productivity of the recorded matter can be further improved. In addition, a color developing property of the obtained recorded matter can be further improved.

In addition, the present step may be carried out by heating a surface of the intermediate transfer medium, to which the aqueous ink jet composition has been adhered, in a state of being spaced apart at a certain distance from the recording medium and facing the same, or in a state of being in close contact with a surface of the recording medium. Preferably, the present step is carried out by heating the surface of the intermediate transfer medium, to which the aqueous ink jet composition has been adhered, in a state of being in close contact with the surface of the recording medium.

Accordingly, energy required for transfer can be further decreased, and productivity of the recorded matter can be further improved. In addition, a color developing property of the obtained recorded matter can be further improved.

Recording Medium

For the recording medium, there is no particular limitation thereto, and, for example, cloth (hydrophobic fiber cloth or the like), a resin (plastic) film, paper, glass, a metal, ceramics, and the like are mentioned. In addition, as the recording medium, an article having a three-dimensional shape such as a sheet shape, a spherical shape, and a rectangular parallelepiped shape may be used.

In a case where the recording medium is cloth, as fibers constituting the cloth, for example, polyester fibers, nylon fibers, triacetate fibers, diacetate fibers, polyamide fibers, a blended product obtained by using two or more types of these fibers, and the like are mentioned. In addition, blended products of these with recycled fibers such as rayon or natural fibers such as cotton, silk, and wool may be used.

In addition, in a case where the recording medium is a resin (plastic) film, as the resin (plastic) film, for example, a polyester film, a polyurethane film, a polycarbonate film, a polyphenylene sulfide film, a polyimide film, a polyamideimide film, and the like are mentioned.

The resin (plastic) film may be a stacked body in which a plurality of layers are stacked, or may be composed of a gradient material in which a material composition changes in a gradient manner.

Suitable embodiments of the invention have been described as above. However, the invention is not limited thereto.

For example, it is sufficient that the aqueous ink jet composition of the invention is used for discharge by an ink jet method. The aqueous ink jet composition of the invention may not be applied to the recording method as described above.

For example, the aqueous ink jet composition of the invention may be applied to a method having other further steps (pre-treatment step, intermediate treatment step, and post-treatment step) in addition to the above-described steps.

In this case, as the pre-treatment step, for example, a step of applying a coat layer to the recording medium, and the like are mentioned.

In addition, as the intermediate treatment step, for example, a step of preliminarily heating the recording medium, and the like are mentioned.

In addition, as the post-treatment step, for example, a step of washing the recording medium, and the like are mentioned.

In addition, the aqueous ink jet composition of the invention can also be suitably applied to sublimation transfer that does not use an intermediate transfer medium. As the sublimation transfer that does not use an intermediate transfer medium, for example, a method having a step of adhering the aqueous ink jet composition to an ink receiving layer of a recording medium (a film product or the like) by an ink jet method, in which the ink receiving layer is peelable and provided on the recording medium, a step of directly heating the recording medium provided with the ink receiving layer, to which the aqueous ink jet composition has been adhered, to perform sublimation and diffusion dyeing from the ink receiving layer to the recording medium at a lower layer side of the ink receiving layer, and a step of peeling the ink receiving layer from the recording medium, to obtain a recorded matter, and the like are mentioned.

Examples

Next, specific examples of the invention will be described.

[1] Preparation of Stock Solution (Aqueous Ink Jet Composition) for Producing Ink Jet Ink

Example A5-1

First, C.I. Disperse Blue 359 as a disperse dye, a styrene maleic acid-based dispersing agent represented by Formula (1) (which is a compound of Formula (1) having a relationship such that one of $R^1$ and $R^2$ in Formula (1) is —H, and the other is —$CH_2CH(CH_3)_2$, and when X is 1, Y is 1, and having a weight average molecular weight Mw of 13,000), and pure water were mixed in a proportion shown in Table 5-2, and the mixture was stirred with High Shear Mixer (manufactured by Silverson Machines, Inc.) at 3,000 rpm to produce a slurry. Thereafter, the produced slurry and glass beads having a diameter of 0.5 mm were stirred and dispersed in a bead mill (LMZ015, Ashizawa Finetech Ltd.) under water cooling, so that a stock solution for producing an ink jet ink as an aqueous ink jet composition was produced.

An average particle diameter of C.I. Disperse Blue 359 in the stock solution for producing an ink jet ink was 150 nm.

Examples A5-2 to A5-21

Stock solutions for producing ink jet inks as aqueous ink jet compositions were produced in the same manner as in Example A1, except that chemical structures of the styrene maleic acid-based dispersing agents and blending proportions of the respective components were as shown in Tables 5-1 and 5-2.

Comparative Examples A5-1 to A5-9

Stock solutions for producing ink jet inks as aqueous ink jet compositions were produced in the same manner as in Example A5-1, except that types of the disperse dyes, types of the dispersing agents, and blending proportions of the respective components were as shown in Tables 5-1 and 5-2.

Relationship between abbreviations and conditions for dispersing agents used for preparing the aqueous ink jet compositions (stock solutions for producing ink jet inks) of the respective Examples and Comparative Examples is shown in Table 5-1, and compositions of the aqueous ink jet compositions (stock solutions for producing ink jet inks) of the respective Examples and Comparative Examples are shown in Table 5-2. In the tables, C.I. Disperse Blue 359 is indicated as "DB359", C.I. Disperse Blue 148 is indicated as "DB148", C.I. Disperse Blue 270 is indicated as "DB270", J-67 (manufactured by BASF SE) as a dispersing agent other than the styrene maleic acid-based dispersing agent is indicated as "H6", and X310 (manufactured by SEIKO PMC CORPORATION) as a dispersing agent other than the styrene maleic acid-based dispersing agent is indicated as "H7". In addition, each of the ink jet inks of Examples A5-1 to A5-21 had a viscosity which is a value within a range of equal to or greater than 2.0 mPa·s and equal to or less than 30 mPa·s, and surface tension which is a value within a range of equal to or greater than 25 mN/m and equal to or less than 50 mN/m. For the viscosity, measurement was performed at 20° C. using a viscoelasticity tester MCR-300 (manufactured by Physica) by raising Shear Rate from 10 $s^{-1}$ to 1,000 $s^{-1}$ and reading a viscosity at the time of Shear Rate 200. In addition, for the surface tension, measurement was performed by the Wilhelmy method at 20° C. using a surface tension meter (CBVP-7, manufactured by Kyowa Interface Science Co., Ltd.).

TABLE 5-1

| Abbreviation for dispersing agent | Combination of $R^1$ and $R^2$ | Value of Y when X = 1 | Mw |
|---|---|---|---|
| SM1 | —H, —$CH_2CH(CH_3)_2$ | 1 | 13,000 |
| SM2 | —H, —$(CH_2CH_2O)_3CH_2CH_3$ | 1 | 13,000 |
| SM3 | —H, —$(CH_2CH_2O)H$ | 1 | 13,000 |
| SM4 | —H, —$(CH_2CH_2O)_3H$ | 1 | 13,000 |
| SM5 | —H, —$(CH_2CH_2O)_5H$ | 1 | 13,000 |
| SM6 | —H, —$(CH_2CH_2O)_3CH_3$ | 1 | 13,000 |
| SM7 | —H, —$(CH_2)_3CH_3$ | 1 | 13,000 |
| SM8 | —H, $(CH_2CH_2O)_2CH_2CH_3$ | 1 | 13,000 |
| SM9 | —H, $CH_2CH(CH_3)_2$ | 1 | 6,000 |
| SM10 | —H, $CH_2CH(CH_3)_2$ | 1 | 21,000 |
| SM11 | —H, $CH_2CH(CH_3)_2$ | 0.2 | 13,000 |
| H1 | —H, —H | 1 | 13,000 |
| H2 | —Na, —Na | 1 | 13,000 |
| H3 | —$C_2H_5$, —$C_2H_5$ | 1 | 13,000 |
| H4 | —H, $CH_2CH(CH_3)_2$ | 0.1 | 13,000 |
| H5 | —H, $CH_2CH(CH_3)_2$ | 1.1 | 13,000 |
| H6 | J-67 (BASF SE) | | 12,500 |
| H7 | X310 (SEIKO PMC CORPORATION) | | 14,000 |

TABLE 5-2

| | Blending amount [parts by mass] | | | | | | | | | | | | | | | | | | | | | |
|---|---|---|---|---|---|---|---|---|---|---|---|---|---|---|---|---|---|---|---|---|---|---|
| | Disperse dye | | | Dispersing agent | | | | | | | | | | | | | | | | | Pure | |
| | DB359 | DB148 | DB270 | SM1 | SM2 | SM3 | SM4 | SM5 | SM6 | SM7 | SM8 | SM9 | SM10 | SM11 | H1 | H2 | H3 | H4 | H5 | H6 | H7 | water | XM/XD |
| Example A5-1 | 15.0 | 0 | 0 | 7.5 | 0 | 0 | 0 | 0 | 0 | 0 | 0 | 0 | 0 | 0 | 0 | 0 | 0 | 0 | 0 | 0 | 0 | 77.5 | 0.50 |
| Example A5-2 | 15.0 | 0 | 0 | 0 | 7.5 | 0 | 0 | 0 | 0 | 0 | 0 | 0 | 0 | 0 | 0 | 0 | 0 | 0 | 0 | 0 | 0 | 77.5 | 0.50 |
| Example A5-3 | 15.0 | 0 | 0 | 0 | 0 | 7.5 | 0 | 0 | 0 | 0 | 0 | 0 | 0 | 0 | 0 | 0 | 0 | 0 | 0 | 0 | 0 | 77.5 | 0.50 |
| Example A5-4 | 15.0 | 0 | 0 | 0 | 0 | 0 | 7.5 | 0 | 0 | 0 | 0 | 0 | 0 | 0 | 0 | 0 | 0 | 0 | 0 | 0 | 0 | 77.5 | 0.50 |
| Example A5-5 | 15.0 | 0 | 0 | 0 | 0 | 0 | 0 | 7.5 | 0 | 0 | 0 | 0 | 0 | 0 | 0 | 0 | 0 | 0 | 0 | 0 | 0 | 77.5 | 0.50 |
| Example A5-6 | 15.0 | 0 | 0 | 0 | 0 | 0 | 0 | 0 | 7.5 | 0 | 0 | 0 | 0 | 0 | 0 | 0 | 0 | 0 | 0 | 0 | 0 | 77.5 | 0.50 |
| Example A5-7 | 30.0 | 0 | 0 | 15.0 | 0 | 0 | 0 | 0 | 0 | 0 | 0 | 0 | 0 | 0 | 0 | 0 | 0 | 0 | 0 | 0 | 0 | 55.0 | 0.50 |
| Example A5-8 | 35.0 | 0 | 0 | 17.5 | 0 | 0 | 0 | 0 | 0 | 0 | 0 | 0 | 0 | 0 | 0 | 0 | 0 | 0 | 0 | 0 | 0 | 47.5 | 0.50 |
| Example A5-9 | 7.5 | 0 | 0 | 15.0 | 0 | 0 | 0 | 0 | 0 | 0 | 0 | 0 | 0 | 0 | 0 | 0 | 0 | 0 | 0 | 0 | 0 | 77.5 | 2.00 |
| Example A5-10 | 15.0 | 0 | 0 | 30.0 | 0 | 0 | 0 | 0 | 0 | 0 | 0 | 0 | 0 | 0 | 0 | 0 | 0 | 0 | 0 | 0 | 0 | 55.0 | 2.00 |
| Example A5-11 | 17.5 | 0 | 0 | 35.0 | 0 | 0 | 0 | 0 | 0 | 0 | 0 | 0 | 0 | 0 | 0 | 0 | 0 | 0 | 0 | 0 | 0 | 47.5 | 2.00 |
| Example A5-12 | 15.0 | 0 | 0 | 15.0 | 0 | 0 | 0 | 0 | 0 | 0 | 0 | 0 | 0 | 0 | 0 | 0 | 0 | 0 | 0 | 0 | 0 | 70.0 | 1.00 |
| Example A5-13 | 30.0 | 0 | 0 | 30.0 | 0 | 0 | 0 | 0 | 0 | 0 | 0 | 0 | 0 | 0 | 0 | 0 | 0 | 0 | 0 | 0 | 0 | 40.0 | 1.00 |
| Example A5-14 | 35.0 | 0 | 0 | 35.0 | 0 | 0 | 0 | 0 | 0 | 0 | 0 | 0 | 0 | 0 | 0 | 0 | 0 | 0 | 0 | 0 | 0 | 30.0 | 1.00 |
| Example A5-15 | 15.0 | 0 | 0 | 0 | 0 | 0 | 0 | 0 | 0 | 7.5 | 0 | 0 | 0 | 0 | 0 | 0 | 0 | 0 | 0 | 0 | 0 | 77.5 | 0.50 |
| Example A5-16 | 15.0 | 0 | 0 | 0 | 0 | 0 | 0 | 0 | 0 | 0 | 7.5 | 0 | 0 | 0 | 0 | 0 | 0 | 0 | 0 | 0 | 0 | 77.5 | 0.50 |
| Example A5-17 | 15.0 | 0 | 0 | 0 | 0 | 0 | 0 | 0 | 0 | 0 | 0 | 7.5 | 0 | 0 | 0 | 0 | 0 | 0 | 0 | 0 | 0 | 77.5 | 0.50 |
| Example A5-18 | 15.0 | 0 | 0 | 0 | 0 | 0 | 0 | 0 | 0 | 0 | 0 | 0 | 7.5 | 0 | 0 | 0 | 0 | 0 | 0 | 0 | 0 | 77.5 | 0.50 |
| Example A5-19 | 15.0 | 0 | 0 | 0 | 0 | 20 | 0 | 0 | 0 | 0 | 0 | 0 | 0 | 0 | 0 | 0 | 0 | 0 | 0 | 0 | 0 | 65.0 | 1.33 |
| Example A5-20 | 15.0 | 0 | 0 | 0 | 0 | 5 | 0 | 0 | 0 | 0 | 0 | 0 | 0 | 0 | 0 | 0 | 0 | 0 | 0 | 0 | 0 | 80.0 | 0.33 |
| Example A5-21 | 15.0 | 0 | 0 | 0 | 0 | 0 | 0 | 0 | 0 | 0 | 0 | 0 | 0 | 7.5 | 0 | 0 | 0 | 0 | 0 | 0 | 0 | 77.5 | 0.50 |
| Comparative Example A5-1 | 0 | 15.0 | 0 | 7.5 | 0 | 0 | 0 | 0 | 0 | 0 | 0 | 0 | 0 | 0 | 0 | 0 | 0 | 0 | 0 | 0 | 0 | 77.5 | — |
| Comparative Example A5-2 | 0 | 0 | 15.0 | 7.5 | 0 | 0 | 0 | 0 | 0 | 0 | 0 | 0 | 0 | 0 | 0 | 0 | 0 | 0 | 0 | 0 | 0 | 77.5 | — |
| Comparative Example A5-3 | 15.0 | 0 | 0 | 0 | 0 | 0 | 0 | 0 | 0 | 0 | 0 | 0 | 0 | 0 | 7.5 | 0 | 0 | 0 | 0 | 0 | 0 | 77.5 | — |
| Comparative Example A5-4 | 15.0 | 0 | 0 | 0 | 0 | 0 | 0 | 0 | 0 | 0 | 0 | 0 | 0 | 0 | | | | | | | | | |
| Comparative Example A5-5 | 15.0 | 0 | 0 | 0 | 0 | 0 | 0 | 0 | 0 | 0 | 0 | 0 | 0 | 0 | | | | | | | | | |
| Comparative Example A5-6 | 15.0 | 0 | 0 | 0 | 0 | 0 | 0 | 0 | 0 | 0 | 0 | 0 | 0 | 0 | | | | | | | | | |
| Comparative Example A5-7 | 15.0 | 0 | 0 | 0 | 0 | 0 | 0 | 0 | 0 | 0 | 0 | 0 | 0 | 0 | | | | | | | | | |
| Comparative Example A5-8 | 15.0 | 0 | 0 | 0 | 0 | 0 | 0 | 0 | 0 | 0 | 0 | 0 | 0 | 0 | | | | | | | | | |
| Comparative Example A5-9 | 15.0 | 0 | 0 | 0 | 0 | 0 | 0 | 0 | 0 | 0 | 0 | 0 | 0 | 0 | | | | | | | | | |

TABLE 5-2-continued

| | | | | | | | | | | | |
|---|---|---|---|---|---|---|---|---|---|---|---|
| Comparative Example A5-4 | 0 | 0 | 0 | 7.5 | 0 | 0 | 0 | 0 | 0 | 77.5 | — |
| Comparative Example A5-5 | 0 | 0 | 0 | 0 | 7.5 | 0 | 0 | 0 | 0 | 77.5 | — |
| Comparative Example A5-6 | 0 | 0 | 0 | 0 | 0 | 0 | 0 | 7.5 | 0 | 77.5 | — |
| Comparative Example A5-7 | 0 | 0 | 0 | 0 | 0 | 0 | 0 | 0 | 7.5 | 77.5 | — |
| Comparative Example A5-8 | 0 | 0 | 0 | 0 | 0 | 7.5 | 0 | 0 | 0 | 77.5 | — |
| Comparative Example A5-9 | 0 | 0 | 0 | 0 | 0 | 0 | 7.5 | 0 | 0 | 77.5 | — |

[2] Evaluation on Stock Solution for Producing Ink Jet Ink
[2-1] Storage Stability (Change in Particle Diameter)

For each of the aqueous ink jet compositions (stock solutions for producing ink jet inks) of the respective Examples and Comparative Examples, an average particle diameter of the disperse dye immediately after production and an average particle diameter of the disperse dye after being placed in a predetermined container and left to stand for one week in an environment of 60° C. were obtained. From these values, a variation rate of the average particle diameter of the disperse dye after being left to stand for one week in an environment of 60° C. with respect to the average particle diameter of the disperse dye immediately after production was obtained, and evaluation was performed according to the following criteria. For measurement of the average particle diameter, Microtrac UPA (manufactured by Nikkiso CO., LTD.) was used. It can be said that a larger variation rate of the average particle diameter indicates lower storage stability.

A: Variation rate of average particle diameter is less than 5%.
B: Variation rate of average particle diameter is equal to or greater than 5% and less than 10%.
C: Variation rate of average particle diameter is equal to or greater than 10% and less than 15%.
D: Variation rate of average particle diameter is equal to or greater than 15% and less than 20%.
E: Variation rate of average particle diameter is equal to or greater than 20%.

These results are summarized in Table 5-3.

TABLE 5-3

| | Storage stability |
|---|---|
| Example A5-1 | A |
| Example A5-2 | B |
| Example A5-3 | B |
| Example A5-4 | B |
| Example A5-5 | B |
| Example A5-6 | B |
| Example A5-7 | C |
| Example A5-8 | C |
| Example A5-9 | B |
| Example A5-10 | C |
| Example A5-11 | B |
| Example A5-12 | B |
| Example A5-13 | C |
| Example A5-14 | C |
| Example A5-15 | B |
| Example A5-16 | B |
| Example A5-17 | C |
| Example A5-18 | C |
| Example A5-19 | C |
| Example A5-20 | C |
| Example A5-21 | B |
| Comparative Example A5-1 | E |
| Comparative Example A5-2 | E |
| Comparative Example A5-3 | E |
| Comparative Example A5-4 | E |
| Comparative Example A5-5 | E |
| Comparative Example A5-6 | E |
| Comparative Example A5-7 | E |
| Comparative Example A5-8 | E |
| Comparative Example A5-9 | E |

As is apparent from Table 5-3, excellent results were obtained in the invention. On the contrary, satisfactory results were not obtained in the Comparative Examples.

[3] Preparation of Ink Jet Ink (Aqueous Ink Jet Composition)

Example B5-1

The stock solution for producing an ink jet in which had been prepared in Example A5-1, glycerin, 2-pyrrolidone, propylene glycol, Olfine EXP4300 (manufactured by Nissin Chemical Industry Co., Ltd.) as an acetylene-based surfactant, and pure water were mixed at a proportion as shown in Table 5-4, and the mixture was stirred with High Shear Mixer (manufactured by Silverson Machines, Inc.) at 3,000 rpm to produce an ink jet ink as an aqueous ink jet composition.

An average particle diameter of C.I. Disperse Blue 359 in the ink jet ink was 150 nm.

Examples B5-2 to B5-20

Ink jet inks as aqueous ink jet compositions were produced in the same manner as in Example B5-1, except that types of the stock solutions for producing ink jet inks were as shown in Table 5-4 and blending proportions of the respective components were as shown in Table 5-4.

Comparative Examples B5-1 to B5-9

Ink jet inks as aqueous ink jet compositions were produced in the same manner as in Example B5-1, except that types of the stock solutions for producing ink jet inks were as shown in Table 5-4 and blending proportions of the respective components were as shown in Table 5-4.

Conditions for the aqueous ink jet compositions (ink jet inks) of the respective Examples and Comparative Examples are summarized in Table 5-4. In the tables, glycerin is indicated as "Gly", 2-pyrrolidone is indicated as "2-Py", propylene glycol is indicated as "PG", BYK 348 (manufactured by BYK Chemie Japan) as a silicone-based surfactant is indicated as "BYK 348", and Olfine EXP4300 (manufactured by Nissin Chemical Industry Co., Ltd.) as an acetylene-based surfactant is indicated as "EXP 4300". In addition, each of the ink jet inks of Examples B5-1 to B5-20 had a viscosity which is a value within a range of equal to or greater than 2.0 mPa·s and equal to or less than 5.0 mPa·s, and surface tension which is a value within a range of equal to or greater than 20 mN/m and equal to or less than 35 mN/m. For the viscosity, measurement was performed at 20° C. using a viscoelasticity tester MCR-300 (manufactured by Physica) by raising Shear Rate from 10 s$^{-1}$ to 1,000 s$^{-1}$ and reading a viscosity at the time of Shear Rate 200. In addition, for the surface tension, measurement was performed by the Wilhelmy method at 20° C. using a surface tension meter (CBVP-7, manufactured by Kyowa Interface Science Co., Ltd.).

of 60° C. with respect to the average particle diameter of the disperse dye immediately after production was obtained, and evaluation was performed according to the following criteria. For measurement of the average particle diameter, Microtrac UPA (manufactured by Nikkiso Co., Ltd.) was used. It can be said that a larger variation rate of the average particle diameter indicates lower storage stability and a larger adverse effect on discharge stability.

A: Variation rate of average particle diameter is less than 5%.

B: Variation rate of average particle diameter is equal to or greater than 5% and less than 10%.

C: Variation rate of average particle diameter is equal to or greater than 10% and less than 15%.

TABLE 5-4

| | | Blending amount [parts by mass] | | | | | | |
|---|---|---|---|---|---|---|---|---|
| | Stock solution | | Solvent other than water | | | Surfactant | | Pure |
| | Type | | Gly | 2-Py | PG | BYK 348 | EXP 4300 | water |
| Example B5-1 | Example A5-2 | 50 | 10 | 5 | 5 | 0 | 1 | 29 |
| Example B5-2 | Example A5-3 | 50 | 10 | 5 | 5 | 0 | 1 | 29 |
| Example B5-3 | Example A5-4 | 50 | 10 | 5 | 5 | 0 | 1 | 29 |
| Example B5-4 | Example A5-5 | 50 | 10 | 5 | 5 | 0 | 1 | 29 |
| Example B5-5 | Example A5-6 | 50 | 10 | 5 | 5 | 0 | 1 | 29 |
| Example B5-6 | Example A5-7 | 50 | 10 | 5 | 5 | 0 | 1 | 29 |
| Example B5-7 | Example A5-10 | 0.66 | 15 | 5 | 5 | 0 | 1 | 73.34 |
| Example B5-8 | Example A5-10 | 1.33 | 15 | 5 | 5 | 0 | 1 | 72.67 |
| Example B5-9 | Example A5-15 | 50 | 10 | 5 | 5 | 0 | 1 | 29 |
| Example B5-10 | Example A5-16 | 50 | 10 | 5 | 5 | 0 | 1 | 29 |
| Example B5-11 | Example A5-17 | 50 | 10 | 5 | 5 | 0 | 1 | 29 |
| Example B5-12 | Example A5-18 | 50 | 10 | 5 | 5 | 0 | 1 | 29 |
| Example B5-13 | Example A5-19 | 50 | 10 | 5 | 5 | 0 | 1 | 29 |
| Example B5-14 | Example A5-20 | 50 | 10 | 5 | 5 | 0 | 1 | 29 |
| Example B5-15 | Example A5-1 | 50 | 10 | 5 | 5 | 0 | 1 | 29 |
| Example B5-16 | Example A5-1 | 0.66 | 15 | 5 | 5 | 0 | 1 | 73.34 |
| Example B5-17 | Example A5-2 | 1.33 | 15 | 5 | 5 | 0 | 1 | 72.67 |
| Example B5-18 | Example A5-2 | 0.66 | 15 | 5 | 5 | 0 | 1 | 73.34 |
| Example B5-19 | Example A5-2 | 66 | 10 | 5 | 5 | 0 | 1 | 13 |
| Example B5-20 | Example A5-4 | 1.23 | 15 | 5 | 5 | 0 | 1 | 72.77 |
| Comparative Example B5-1 | Comparative Example A5-1 | 50 | 10 | 5 | 5 | 0 | 1 | 29 |
| Comparative Example B5-2 | Comparative Example A5-2 | 50 | 10 | 5 | 5 | 0 | 1 | 29 |
| Comparative Example B5-3 | Comparative Example A5-3 | 50 | 10 | 5 | 5 | 0 | 1 | 29 |
| Comparative Example B5-4 | Comparative Example A5-4 | 50 | 10 | 5 | 5 | 0 | 1 | 29 |
| Comparative Example B5-5 | Comparative Example A5-5 | 50 | 10 | 5 | 5 | 0 | 1 | 29 |
| Comparative Example B5-6 | Comparative Example A5-6 | 50 | 10 | 5 | 5 | 0 | 1 | 29 |
| Comparative Example B5-7 | Comparative Example A5-7 | 50 | 10 | 5 | 5 | 0 | 1 | 29 |
| Comparative Example B5-8 | Comparative Example A5-8 | 50 | 10 | 5 | 5 | 0 | 1 | 29 |
| Comparative Example B5-9 | Comparative Example A5-9 | 50 | 10 | 5 | 5 | 0 | 1 | 29 |

[4] Evaluation on Ink Jet Ink
[4-1] Storage Stability (Change in Particle Diameter)

For each of the aqueous ink jet compositions (ink jet inks) of the respective Examples and Comparative Examples, an average particle diameter of the disperse dye immediately after production and an average particle diameter of the disperse dye after being placed in a predetermined ink-holding container and left to stand for one week in an environment of 60° C. were obtained. From these values, a variation rate of the average particle diameter of the disperse dye after being left to stand for one week in an environment D: Variation rate of average particle diameter is equal to or greater than 15% and less than 20%.

E: Variation rate of average particle diameter is equal to or greater than 20%.

[4-2] Discharge Stability by Ink Jet Method

A predetermined ink-holding container was filled with each of the aqueous ink jet compositions (ink jet inks) of the respective Examples and Comparative Examples and was left to stand for 5 days in an environment of 60° C.

Thereafter, the holding container was mounted on a recording apparatus PX-H 6000 (manufactured by Seiko Epson Corporation), and the ink jet ink was discharged so that a solid pattern was adhered on TRANSJET Classic (manufactured by Cham Paper), which is an intermediate transfer medium, at a recording resolution of 1440×720 dpi. An operating environment of the recording apparatus (printer) was set at 40° C. and 20 RH %.

The number of times of nozzle omission at the time of recording 30 solid patterns on the intermediate transfer medium was examined, and evaluation was performed according to the following criteria.

A: Number of times of nozzle omission is 0.

B: Number of times of nozzle omission is equal to or greater than 1 and equal to or less than 9.

C: Number of times of nozzle omission is equal to or greater than 10 and equal to or less than 19.

D: Number of times of nozzle omission is equal to or greater than 20 and equal to or less than 29.

E: Number of times of nozzle omission is equal to or greater than 30.

[4-3] Clogging Recoverability

A predetermined ink-holding container was filled with each of the aqueous ink jet compositions (ink jet inks) of the respective Examples and Comparative Examples, and the holding container was mounted on a recording apparatus PX-H 6000 (manufactured by Seiko Epson Corporation).

After confirming that discharge normally occurs in all nozzles, the power of the recording apparatus was turned off in a normal state, and was left to stand for 1 month under an environment of 40° C.

Thereafter, the number of times taken to reach normal discharge by a suction-induced recovery operation was obtained, and evaluation was performed according to the following criteria.

A: Normalization is achieved with 1 to 3 recovery operations.

B: Normalization is achieved with 4 to 6 recovery operations.

C: Normalization is achieved with 7 to 9 recovery operations.

D: Normalization is achieved after 9 recovery operations, being left to stand for 12 hours at room temperature, and then 1 to 3 further recovery operations.

E: Normalization is not achieved after 9 recovery operations, being left to stand for 12 hours at room temperature, and then 3 further recovery operations.

[4-4] Color Developing Property (OD Value)

An adhesion side of the aqueous ink jet composition on the thirtieth intermediate transfer medium to which the ink jet ink had been adhered in [4-3] was brought into close contact with cloth (polyester 100%, Amina, manufactured by Toray Industries, Inc.) which is a white recording medium. In this state, sublimation transfer was carried out by performing heating using a heat press machine (TP-608M, manufactured by Taiyo Seiki Co., Ltd.) at a condition of 180° C. and 60 seconds, so that each recorded matter was obtained.

For each recorded matter obtained, evaluation on color developing property was performed. Specifically, for each recorded matter obtained, an OD value was measured using a colorimeter (Gretag Macbeth Spectrolino, manufactured by X-Rite), and evaluation was performed according to the following criteria.

A: OD value is equal to or greater than 1.50.

B: OD value is equal to or greater than 1.45 and less than 1.50.

C: OD value is equal to or greater than 1.40 and less than 1.45.

D: OD value is equal to or greater than 1.35 and less than 1.40.

E: OD value is less than 1.35.

These results are summarized in Table 5-5.

TABLE 5-5

|  | Storage stability | Discharge stability | Clogging recoverability | Color developing property |
| --- | --- | --- | --- | --- |
| Example B5-1 | B | A | B | A |
| Example B5-2 | B | A | B | A |
| Example B5-3 | B | A | B | A |
| Example B5-4 | B | A | B | A |
| Example B5-5 | B | A | B | A |
| Example B5-6 | C | B | C | A |
| Example B5-7 | C | A | A | E |
| Example B5-8 | C | A | A | E |
| Example B5-9 | B | A | B | A |
| Example B5-10 | B | A | B | A |
| Example B5-11 | C | B | C | A |
| Example B5-12 | C | B | C | A |
| Example B5-13 | C | B | C | A |
| Example B5-14 | C | B | C | A |
| Example B5-15 | A | A | A | A |
| Example B5-16 | A | A | C | E |
| Example B5-17 | B | A | A | E |
| Example B5-18 | B | A | B | E |
| Example B5-19 | B | C | A | A |
| Example B5-20 | B | A | B | E |
| Comparative Example B5-1 | E | C | E | E |
| Comparative Example B5-2 | E | C | E | E |
| Comparative Example B5-3 | E | E | E | A |
| Comparative Example B5-4 | E | E | E | A |
| Comparative Example B5-5 | E | E | E | A |
| Comparative Example B5-6 | E | E | E | A |
| Comparative Example B5-7 | E | E | E | A |
| Comparative Example B5-8 | E | E | E | A |
| Comparative Example B5-9 | E | E | E | A |

As is apparent from Table 5-5, excellent results were obtained in the invention. On the contrary, satisfactory results were not obtained in the Comparative Examples.

Hereinafter, a sixth suitable embodiment of the invention will be described in detail.

Aqueous Ink Jet Composition

Among various disperse dyes, C.I. Disperse Blue 359 has features such as an excellent color developing property while having the following problems. That is, in a case where C.I. Disperse Blue 359 is used as a constituent component of an aqueous ink jet composition in the related art, the C.I. Disperse Blue 359 does not make it possible for the aqueous ink jet composition to have a sufficiently excellent storage stability, which remarkably causes a problem that clogging occurs in a nozzle of a liquid droplet discharge head during discharge by an ink jet method after long-term storage.

Therefore, the present inventor has conducted intensive studies aimed at providing an aqueous ink jet composition capable of effectively preventing occurrence of the problems as mentioned above while making full use of the excellent features of C.I. Disperse Blue 359.

As a result, the present inventor has reached the invention.

That is, the aqueous ink jet composition of the invention contains C.I. Disperse Blue 359, a substance A which is at least one type of compound selected from the group consisting of a compound represented by Formula (2-1), a compound represented by Formula (2-2), an ethylene oxide adduct of tristyrylphenol, and a derivative of the ethylene oxide adduct of tristyrylphenol, and an anionic dispersing agent.

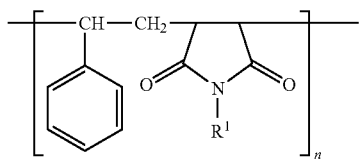

(2-1)

(In Formula (2-1), $R^1$ is a hydrocarbon group having 6 or less carbon atoms, or $-(CH_2)_m-NR^8R^9$ (where m is an integer of equal to or less than 6, and $R^8$ and $R^9$ are each independently a hydrogen atom or a hydrocarbon group having 6 or less carbon atoms), and n is an integer of equal to or greater than 1)

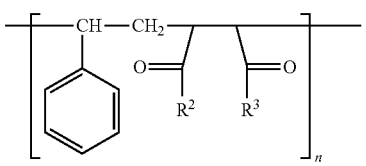

(2-2)

(In Formula (2-2), one of $R^2$ and $R^3$ is $-OH$ and the other is $-NR^4R^5$ (where $R^4$ and $R^5$ are each independently a hydrogen atom or a hydrocarbon group having 6 or less carbon atoms), and n is an integer of equal to or greater than 1.)

With such a constitution, it is possible to provide an aqueous ink jet composition which has effects obtained by containing C.I. Disperse Blue 359 that is a disperse dye having features such as an excellent color developing property in a low-temperature process due to a relatively small molecular weight, while hardly causing clogging in a nozzle of a liquid droplet discharge head during discharge by an ink jet method. In particular, even in a case where the aqueous ink jet composition is stored under harsh environments (for example, under a high-temperature environment, under a low-temperature environment, under an environment with a large temperature change, and the like), a case of being stored for a long time, a case where mass printing is carried out, or the like (hereinafter these storage conditions and use conditions may be collectively simply referred to as "during long-term storage or the like", excellent discharge stability can be maintained. In addition, once even clogging occurs in a nozzle, the clogging can be suitably eliminated by making the nozzle capped (nozzle capping) or by a suction-induced recovery operation, and excellent discharge stability can be easily recovered.

On the contrary, in a case where the above conditions are not satisfied, satisfactory results cannot be obtained.

For example, in a case where the above-mentioned substance A is not used, dispersion stability of C.I. Disperse Blue 359 in the aqueous ink jet composition cannot be ensured, so that discharge stability according to an ink jet method is decreased during long-term storage of the aqueous ink jet composition, or the like. In addition, once clogging occurs in a nozzle, it becomes difficult to achieve recovery.

In addition, in a case where the anionic dispersing agent is not used or in a case where another dispersing agent (for example, a nonionic dispersing agent, a cationic dispersing agent, or the like) is used in place of the anionic dispersing agent, dispersion stability of C.I. Disperse Blue 359 in the aqueous ink jet composition cannot be ensured, so that discharge stability according to an ink jet method is decreased during long-term storage of the aqueous ink jet composition, or the like. In addition, once clogging occurs in a nozzle, it becomes difficult to achieve recovery.

In addition, in the present specification, the aqueous ink jet composition is a concept including not only an ink itself to be discharged by an ink jet method but also a stock solution used for preparing the ink. In other words, the aqueous ink jet composition of the invention may be subjected to discharge by an ink jet method as it is, or may be subjected to discharge by an ink jet method after treatments such as dilution.

Substance A

The aqueous ink jet composition of the invention contains a substance A which is at least one type of compound selected from the group consisting of a compound represented by Formula (1), a compound represented by Formula (2), an ethylene oxide adduct of tristyrylphenol, and a derivative of the ethylene oxide adduct of tristyrylphenol.

By using the substance A in combination with C.I. Disperse Blue 359 and the anionic dispersing agent, dispersion stability of C.I. Disperse Blue 359 in the aqueous ink jet composition and storage stability of the aqueous ink jet composition can be made excellent, and occurrence of clogging in a nozzle of a liquid droplet discharge head during discharge by an ink jet method can be effectively prevented even in a case of being stored for a long time or the like. As a result, it is possible to stably perform discharge of the aqueous ink jet composition for a long period of time, and it is possible to keep quality of a recorded matter obtained by an ink jet method in a stable and excellent manner. In addition, the substance A is a component which hardly causes an adverse effect on quality of a recorded matter and an adverse effect in sublimation printing.

For the substance A, the aqueous ink jet composition of the invention may contain one type of compound or may contain plural types of compounds. More specifically, the substance A may be, for example, a mixture of the compound represented by Formula (2-1) and the compound represented by Formula (2-2).

A content of the substance A in the aqueous ink jet composition is preferably equal to or greater than 0.1% by mass and equal to or less than 4.5% by mass, more preferably equal to or greater than 0.2% by mass and equal to or less than 4.0% by mass, and even more preferably equal to or greater than 0.5% by mass and equal to or less than 3.0% by mass.

Accordingly, storage stability of the aqueous ink jet composition is further improved, and occurrence of clogging in a nozzle of a liquid droplet discharge head during long-term storage or the like is more effectively prevented.

In particular, in a case where the aqueous ink jet composition is an ink itself to be discharged by an ink jet method, a content of the substance A in the ink is preferably equal to or greater than 0.1% by mass and equal to or less than 3.0% by mass, more preferably equal to or greater than 0.2% by mass and equal to or less than 2.0% by mass, and even more preferably equal to or greater than 0.5% by mass and equal to or less than 1.5% by mass.

In addition, in a case where the aqueous ink jet composition is a stock solution used for preparing an ink to be discharged by an ink jet method, a content of the substance A in the stock solution is preferably equal to or greater than 0.5% by mass and equal to or less than 4.5% by mass, more preferably equal to or greater than 1.0% by mass and equal to or less than 4.0% by mass, and even more preferably equal to or greater than 1.5% by mass and equal to or less than 3.0% by mass.

In a case where the substance A constituting the aqueous ink jet composition contains plural types of compounds, for the content, a sum of contents of these plural types of compounds is adopted.

Anionic Dispersing Agent

The aqueous ink jet composition of the invention contains an anionic dispersing agent.

The anionic dispersing agent is not particularly limited as long as the anionic dispersing agent is ionized to form an anion, and is preferably at least one of a compound represented by Formula (2-3), a sodium salt of a naphthalene sulfonic acid formalin condensate, and lignin sulfonic acid.

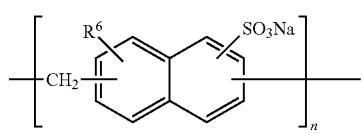

(2-3)

(In Formula (2-3), $R^6$ is a hydrocarbon group having 4 or less carbon atoms, and n is an integer of equal to or greater than 1.)

Accordingly, hydrophobicity of the dispersing agent is improved, and adsorption of the dispersing agent onto C.I. Disperse Blue 359 is promoted, so that long-term stability of the aqueous ink jet composition is further improved.

It is sufficient that $R^6$ in Formula (2-3) is a hydrocarbon group having 4 or less carbon atoms. Among these, $R^6$ is preferably a hydrocarbon group (a methyl group or an ethyl group) having 2 or less carbon atoms.

Accordingly, it is possible to make more suitable balance between hydrophobicity and hydrophilicity of the anionic dispersing agent, and it is possible to achieve further excellent dispersion stability of C.I. Disperse Blue 359 in the aqueous ink jet composition.

A weight average molecular weight Mw of the anionic dispersing agent is preferably equal to or greater than 1,000 and equal to or less than 20,000, more preferably equal to or greater than 2,000 and equal to or less than 10,000, and even more preferably equal to or greater than 3,000 and equal to or less than 5,000.

Accordingly, storage stability of the aqueous ink jet composition is further improved, and occurrence of clogging in a nozzle of a liquid droplet discharge head during long-term storage or the like is more effectively prevented.

For the anionic dispersing agent, the aqueous ink jet composition may contain two or more types of compounds.

A content of the anionic dispersing agent in the aqueous ink jet composition is preferably equal to or greater than 0.2% by mass and equal to or less than 30% by mass, more preferably equal to or greater than 0.3% by mass and equal to or less than 20% by mass, and even more preferably equal to or greater than 0.4% by mass and equal to or less than 15% by mass.

Accordingly, storage stability of the aqueous ink jet composition is further improved, and occurrence of clogging in a nozzle of a liquid droplet discharge head during long-term storage or the like is more effectively prevented.

In particular, in a case where the aqueous ink jet composition is an ink itself to be discharged by an ink jet method, a content of the anionic dispersing agent in the ink is preferably equal to or greater than 0.2% by mass and equal to or less than 12% by mass, more preferably equal to or greater than 0.3% by mass and equal to or less than 9.0% by mass, and even more preferably equal to or greater than 0.4% by mass and equal to or less than 7.0% by mass.

In addition, in a case where the aqueous ink jet composition is a stock solution used for preparing an ink to be discharged by an ink jet method, a content of the anionic dispersing agent in the stock solution is preferably equal to or greater than 5.5% by mass and equal to or less than 30% by mass, more preferably equal to or greater than 8.0% by mass and equal to or less than 20% by mass, and even more preferably equal to or greater than 10% by mass and equal to or less than 15% by mass.

In a case where the anionic dispersing agent constituting the aqueous ink jet composition contains plural types of compounds, for the content, a sum of contents of these plural types of compounds is adopted.

C.I. Disperse Blue 359

The aqueous ink jet composition contains C.I. Disperse Blue 359 as a disperse dye.

An average particle diameter of C.I. Disperse Blue 359 in the aqueous ink jet composition is preferably equal to or greater than 50 nm and equal to or less than 300 nm, more preferably equal to or greater than 75 nm and equal to or less than 250 nm or less, and even more preferably equal to or greater than 100 nm and equal to or less than 200 nm.

Accordingly, storage stability of the aqueous ink jet composition is further improved. In addition, a recorded portion formed by using the aqueous ink jet composition can be more effectively sublimated, and application to sublimation printing can be more suitably achieved.

In the present specification, the average particle diameter refers to an average particle diameter on a volume basis unless otherwise specified. The average particle diameter can be obtained, for example, by measurement using Microtrac UPA (manufactured by Nikkiso CO., LTD.).

A content of C.I. Disperse Blue 359 in the aqueous ink jet composition is preferably equal to or greater than 0.1% by mass and equal to or less than 30% by mass, more preferably equal to or greater than 0.3% by mass and equal to or less than 25% by mass, and even more preferably equal to or greater than 0.5% by mass and equal to or less than 20% by mass.

Accordingly, it is possible to obtain a higher color density in a recorded portion formed by using the aqueous ink jet composition, while further improving storage stability of the aqueous ink jet composition and more effectively preventing occurrence of clogging in a nozzle of a liquid droplet discharge head during long-term storage or the like.

In particular, in a case where the aqueous ink jet composition is an ink itself to be discharged by an ink jet method, a content of C.I. Disperse Blue 359 in the ink is preferably equal to or greater than 0.1% by mass and equal to or less than 15% by mass, more preferably equal to or greater than 0.3% by mass and equal to or less than 10% by mass, and even more preferably equal to or greater than 0.5% by mass and equal to or less than 8.0% by mass.

In addition, in a case where the aqueous ink jet composition is a stock solution used for preparing an ink to be discharged by an ink jet method, a content of C.I. Disperse Blue 359 in the stock solution is preferably equal to or greater than 5.0% by mass and equal to or less than 30% by mass, more preferably equal to or greater than 10% by mass and equal to or less than 25% by mass, and even more preferably equal to or greater than 15% by mass and equal to or less than 20% by mass.

In the aqueous ink jet composition, in a case where a content of C.I. Disperse Blue 359 is set as XD [% by mass] and a content of the substance A is set as XA [% by mass], it is preferable that a relationship of $0.01 \leq XA/XD \leq 1.5$ be satisfied, it is more preferable that a relationship of $0.03 \leq XA/XD \leq 0.90$ be satisfied, and it is even more preferable that a relationship of $0.06 \leq XA/XD \leq 0.34$ be satisfied.

Accordingly, storage stability of the aqueous ink jet composition is further improved, and occurrence of clogging in a nozzle of a liquid droplet discharge head during long-term storage or the like is more effectively prevented.

In the aqueous ink jet composition, in a case where a content of C.I. Disperse Blue 359 is set as XD [% by mass] and a content of the anionic dispersing agent is set as XB [% by mass], it is preferable that a relationship of $0.4 \leq XB/XD \leq 2.0$ be satisfied, it is more preferable that a relationship of $0.5 \leq XB/XD \leq 1.5$ be satisfied, and it is even more preferable that a relationship of $0.6 \leq XB/XD \leq 1.2$ be satisfied.

Accordingly, storage stability of the aqueous ink jet composition is further improved, and occurrence of clogging in a nozzle of a liquid droplet discharge head during long-term storage or the like is more effectively prevented.

In the aqueous ink jet composition, in a case where a content of the substance A is set as XA [% by mass] and a content of the anionic dispersing agent is set as XB [% by mass], it is preferable that a relationship of $0.02 \leq XA/XB \leq 1.0$ be satisfied, it is more preferable that a relationship of $0.10 \leq XA/XB \leq 0.75$ be satisfied, and it is even more preferable that a relationship of $0.15 \leq XA/XB \leq 0.70$ be satisfied.

Accordingly, storage stability of the aqueous ink jet composition is further improved, and occurrence of clogging in a nozzle of a liquid droplet discharge head during long-term storage or the like is more effectively prevented.

Water

The aqueous ink jet composition contains water.

A content of water in the aqueous ink jet composition is not particularly limited. The content of water is preferably equal to or greater than 30% by mass and equal to or less than 85% by mass, more preferably equal to or greater than 35% by mass and equal to or less than 80% by mass, and even more preferably equal to or greater than 40% by mass and equal to or less than 75% by mass.

Accordingly, a viscosity of the aqueous ink jet composition can be more reliably adjusted to a suitable value, and discharge stability according to an ink jet method can be further improved.

Solvent Other than Water

The aqueous ink jet composition may contain a solvent other than water.

Accordingly, a viscosity of the aqueous ink jet composition can be suitably adjusted, and a moisture retaining property of the aqueous ink jet composition can be increased. As a result, liquid droplet discharge by an ink jet method can be performed in a more stable manner.

As the solvent other than water which is contained in the aqueous ink jet composition, for example, glycerin, propylene glycol, 2-pyrrolidone, and the like are mentioned.

By containing these solvents, a slow evaporation rate is achieved due to an excellent moisture retaining capability, which makes it possible to perform liquid droplet discharge in a more stable manner.

A content of the solvent other than water which is contained in the aqueous ink jet composition is preferably equal to or greater than 0% by mass and equal to or less than 45% by mass, more preferably equal to or greater than 10% by mass and equal to or less than 43% by mass, and even more preferably equal to or greater than 15% by mass and equal to or less than 40% by mass.

Accordingly, effects obtained by containing the solvent other than water as described above are exerted in a more remarkable manner.

Surfactant

The aqueous ink jet composition may contain a surfactant.

Accordingly, it is possible to achieve more suitable wettability of the aqueous ink jet composition with respect to a recording medium (base material), which is advantageous for obtaining better image quality.

As the surfactant contained in the aqueous ink jet composition, for example, various surfactants such as an anionic surfactant, a cationic surfactant, and a nonionic surfactant can be used.

More specifically, as the surfactant contained in the aqueous ink jet composition, for example, an acetylene-based surfactant, a silicone-based surfactant, a fluorine-based surfactant, and the like are mentioned.

In a case where the aqueous ink jet composition contains a silicone-based surfactant, it is possible to achieve more suitable wettability of the aqueous ink jet composition with respect to a recording medium (base material), and it is possible to form an image (recorded portion) with further excellent gradation properties.

In a case where the aqueous ink jet composition contains the silicone-based surfactant, a content of the silicone-based surfactant in the aqueous ink jet composition is preferably equal to or greater than 5.0 parts by mass and equal to or less than 150 parts by mass, more preferably equal to or greater than 7.0 parts by mass and equal to or less than 140 parts by mass, and even more preferably equal to or greater than 10 parts by mass and equal to or less than 70 parts by mass, with respect to 100 parts by mass of C.I. Disperse Blue 359.

Accordingly, effects obtained by containing the silicone-based surfactant as described above are exerted in a more remarkable manner.

As commercially available silicone-based surfactants, for example, BYK-306, BYK-307, BYK-333, BYK-337, BYK-341, BYK-345, BYK-346, BYK-347, BYK-348, BYK-349, BYK-378 (all trade names, manufactured by BYK Chemie Japan), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (all trade names, manufactured by Shin-Etsu Chemical Co., Ltd.), and the like are mentioned.

Other Components

The aqueous ink jet composition may contain a component (another component) other than the components as described above.

As the other component, for example, a coloring agents other than C.I. Disperse Blue 359, a dispersing agent other than the styrene maleic acid-based dispersing agent as described above, a penetrating agent such as triethylene glycol monomethyl ether, triethylene glycol monobutyl ether, diethylene glycol monomethyl ether, 1,2-hexanediol, 1,2-pentanediol, 1,2-butanediol, and 3-methyl-1,5-pentanediol, a pH adjusting agent, a chelating agent such as ethylenediamine tetraacetate (EDTA), an antiseptic or antifungal agent, an antirust agent, and the like are mentioned. As the antiseptic or antifungal agent, for example, a compound having an isothiazoline ring structure in a molecule can be suitably used.

A content (in a case where plural types of components are contained as the other component, the content is a sum of contents thereof) of the other component is preferably equal to or less than 6% by mass, and more preferably equal to or less than 5% by mass.

In particular, in a case where the aqueous ink jet composition of the invention contains a dispersing agent (another dispersing agent) other than the above-mentioned dispersing agents, a content of the dispersing agent (the other dispersing agent) is preferably equal to or less than 5% by mass, and more preferably equal to or less than 3% by mass.

Surface tension of the aqueous ink jet composition at 20° C. is preferably equal to or greater than 20 mN/m and equal to or less than 50 mN/m, more preferably equal to or greater than 21 mN/m and equal to or less than 40 mN/m, and even more preferably equal to or greater than 23 mN/m and equal to or less than 30 mN/m.

Accordingly, clogging in a nozzle of a liquid droplet discharge head or the like becomes harder to occur, and discharge stability of the aqueous ink jet composition is further improved. In addition, even in a case where clogging in the nozzle occurs, recoverability achieved by making the nozzle capped (nozzle capping) can be made further excellent.

As the surface tension, a value measured by the Wilhelmy method can be adopted. For measurement of the surface tension, a surface tension meter (for example, CBVP-7, manufactured by Kyowa Interface Science Co., Ltd., and the like) can be used.

A viscosity of the aqueous ink jet composition at 20° C. is preferably equal to or greater than 2.0 mPa·s and equal to or less than 30 mPa·s, more preferably equal to or greater than 3.0 mPa·s and equal to or less than 20 mPa·s, and even more preferably equal to or greater than 4.0 mPa·s and equal to or less than 10 mPa·s.

Accordingly, discharge stability of the aqueous ink jet composition is further improved.

For the viscosity, measurement can be performed at 20° C. using a viscoelasticity tester (for example, MCR-300, manufactured by Physica) by raising Shear Rate from $10\ s^{-1}$ to $1,000\ s^{-1}$ and reading a viscosity at the time of Shear Rate 200.

The aqueous ink jet composition of the invention is usually applied to a recording apparatus by an ink jet method in a state of being held in a container such as a cartridge, a bag, and a tank. In other words, the recording apparatus according to the invention includes a container (an ink cartridge or the like) for holding the aqueous ink jet composition of the invention.

Recording Method

The aqueous ink jet composition of the invention can be applied, for example, to a direct printing method, a thermal transfer printing method (for example, sublimation printing), and the like, and can be suitably applied to the thermal transfer printing method from the viewpoint that C.I. Disperse Blue 359 has sublimability.

As a recording method using the aqueous ink jet composition of the invention, an example of the thermal transfer printing method (sublimation printing) will be described below.

The recording method according to the present embodiment has an ink adhering step of adhering the aqueous ink jet composition to an intermediate transfer medium by an ink jet method and a transfer step of heating the intermediate transfer medium to which the aqueous ink jet composition has been adhered, to transfer, to a recording medium, C.I. Disperse Blue 359 as a sublimable dye which is contained in the aqueous ink jet composition.

Ink Adhering Step

In the ink adhering step, the aqueous ink jet composition is adhered to the intermediate transfer medium by an ink jet method. Discharge of the aqueous ink jet composition by an ink jet method can be carried out using a known ink jet recording apparatus. As a discharge method, a piezo method, a method of discharging an ink by foams (bubbles) generated by heating the ink, or the like can be used. Among these, the piezo method is preferable from the viewpoints of difficulty in deterioration of the aqueous ink jet composition, and the like.

In the ink adhering step, an ink other than the aqueous ink jet composition according to the invention may be used in combination.

Intermediate Transfer Medium

As the intermediate transfer medium, for example, paper such as plain paper, a recording medium (referred to as ink jet special paper, coated paper, or the like) provided with an ink receiving layer, or the like can be used. Among these, paper provided with an ink receiving layer formed of inorganic fine particles such as silica is preferable. Accordingly, it is possible to obtain an intermediate transfer medium, in which bleeding or the like is suppressed, by a process of drying the aqueous ink jet composition which has been adhered to the intermediate transfer medium. In addition, in a subsequent transfer step, sublimation of C.I. Disperse Blue 359 tends to progress more smoothly.

Transfer Step

Thereafter, the intermediate transfer medium to which the aqueous ink jet composition has been adhered is heated to transfer, to a recording medium, C.I. Disperse Blue 359 as a constituent component of the aqueous ink jet composition. Accordingly, a recorded matter is obtained.

A heating temperature in the present step is preferably equal to or higher than 160° C. and equal to or lower than 220° C., and more preferably equal to or higher than 170° C. and equal to or lower than 200° C.

Accordingly, energy required for transfer can be further decreased, and productivity of the recorded matter can be further improved. In addition, a color developing property of the obtained recorded matter can be further improved.

A heating time in the present step varies depending on a heating temperature. The heating time is preferably equal to or longer than 30 seconds and equal to or shorter than 90 seconds, and more preferably equal to or longer than 45 seconds and equal to or shorter than 80 seconds.

Accordingly, energy required for transfer can be further decreased, and productivity of the recorded matter can be further improved. In addition, a color developing property of the obtained recorded matter can be further improved.

In addition, the present step may be carried out by heating a surface of the intermediate transfer medium, to which the aqueous ink jet composition has been adhered, in a state of being spaced apart at a certain distance from the recording medium and facing the same, or in a state of being in close contact with a surface of the recording medium. Preferably, the present step is carried out by heating the surface of the intermediate transfer medium, to which the aqueous ink jet composition has been adhered, in a state of being in close contact with the surface of the recording medium.

Accordingly, energy required for transfer can be further decreased, and productivity of the recorded matter can be further improved. In addition, a color developing property of the obtained recorded matter can be further improved.

Recording Medium

For the recording medium, there is no particular limitation thereto, and, for example, cloth (hydrophobic fiber cloth or the like), a resin (plastic) film, paper, glass, a metal, ceramics, and the like are mentioned. In addition, as the recording medium, an article having a three-dimensional shape such as a sheet shape, a spherical shape, and a rectangular parallelepiped shape may be used.

In a case where the recording medium is cloth, as fibers constituting the cloth, for example, polyester fibers, nylon fibers, triacetate fibers, diacetate fibers, polyamide fibers, a blended product obtained by using two or more types of these fibers, and the like are mentioned. In addition, blended products of these with recycled fibers such as rayon or natural fibers such as cotton, silk, and wool may be used.

In addition, in a case where the recording medium is a resin (plastic) film, as the resin (plastic) film, for example, a polyester film, a polyurethane film, a polycarbonate film, a polyphenylene sulfide film, a polyimide film, a polyamideimide film, and the like are mentioned.

The resin (plastic) film may be a stacked body in which a plurality of layers are stacked, or may be composed of a gradient material in which a material composition changes in a gradient manner.

Suitable embodiments of the invention have been described as above. However, the invention is not limited thereto.

For example, it is sufficient that the aqueous ink jet composition of the invention is used for discharge by an ink jet method. The aqueous ink jet composition of the invention may not be applied to the recording method as described above.

For example, the aqueous ink jet composition of the invention may be applied to a method having other further steps (pre-treatment step, intermediate treatment step, and post-treatment step) in addition to the above-described steps.

In this case, as the pre-treatment step, for example, a step of applying a coat layer to the recording medium, and the like are mentioned.

In addition, as the intermediate treatment step, for example, a step of preliminarily heating the recording medium, and the like are mentioned.

In addition, as the post-treatment step, for example, a step of washing the recording medium, and the like are mentioned.

In addition, the aqueous ink jet composition of the invention can also be suitably applied to sublimation transfer that does not use an intermediate transfer medium. As the sublimation transfer that does not use an intermediate transfer medium, for example, a method having a step of adhering the aqueous ink jet composition to an ink receiving layer of a recording medium (a film product or the like) by an ink jet method, in which the ink receiving layer is peelable and provided on the recording medium, a step of directly heating the recording medium provided with the ink receiving layer, to which the aqueous ink jet composition has been adhered, to perform sublimation and diffusion dyeing from the ink receiving layer to the recording medium at a lower layer side of the ink receiving layer, and a step of peeling the ink receiving layer from the recording medium, to obtain a recorded matter, and the like are mentioned.

Examples

Next, specific examples of the invention will be described.

[1] Preparation of Stock Solution (Aqueous Ink Jet Composition) for Producing Ink Jet Ink Example A6-1

First, C.I. Disperse Blue 359 as a disperse dye, an ethylene oxide adduct of tristyrylphenol (a substance of Formula (2-4) in which $R^7$ is H and an average value of n is 60 (EO60)) as a substance A, a methylnaphthalene sulfonic acid formalin condensate Na (a substance of Formula (2-3) in which $R^6$ is —$CH_3$) as an anionic dispersing agent, and pure water were mixed in a proportion shown in Table 6-3, and the mixture was stirred with High Shear Mixer (manufactured by Silverson Machines, Inc.) at 3,000 rpm to produce a slurry. Thereafter, the produced slurry and glass beads having a diameter of 0.5 mm were stirred and dispersed in a bead mill (LMZ015, Ashizawa Finetech Ltd.) under water cooling, so that a stock solution for producing an ink jet ink as an aqueous ink jet composition was produced.

An average particle diameter of C.I. Disperse Blue 359 in the stock solution for producing an ink jet ink was 150 nm.

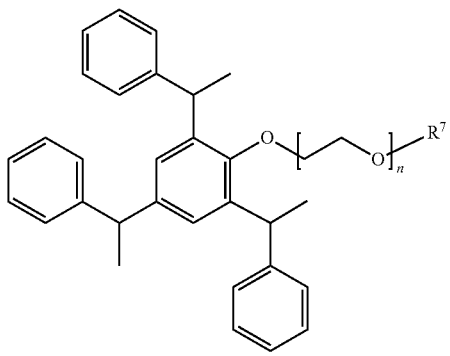

(2-4)

Examples A6-2 to A6-21

Stock solutions for producing ink jet inks as aqueous ink jet compositions were produced in the same manner as in Example A6-1, except that types of the substance A's and the anionic dispersing agents, and blending proportions of the respective components were as shown in Tables 6-1, 6-2, 6-3, and 6-4.

Comparative Examples A6-1 to A6-6

Stock solutions for producing ink jet inks as aqueous ink jet compositions were produced in the same manner as in Example A6-1, except that types of the disperse dyes, the substance A's, and the anionic dispersing agents, and blending proportions of the respective components were as shown in Tables 6-1, 6-2, and 6-4.

Relationship between abbreviations and conditions for the substance A's used for preparing the aqueous ink jet compositions (stock solutions for producing ink jet inks) of the respective Examples and Comparative Examples is shown in Table 6-1, relationship between abbreviations and conditions for the dispersing agents is shown in Table 6-2, and compositions of the aqueous ink jet compositions (stock solutions for producing ink jet inks) of the respective Examples and Comparative Examples are shown in Tables 6-3 and 6-4. In the tables, C.I. Disperse Blue 359 is indicated as "DB359", C.I. Disperse Blue 148 is indicated as "DB148", C.I. Disperse Blue 270 is indicated as "DB270", a polycarboxylic acid-based activator (CARRYBON L-400, manufactured by Sanyo Chemical Industries, Ltd.) is indicated as "A1'", and polyoxyethylene sorbitan fatty acid ester (Sorbon T-40, manufactured by Toho Chemical Industry Co., Ltd.) as a dispersing agent (a nonionic dispersing agent) other than the anionic dispersing agent is indicated as "B1'".

A3 as the substance A used in Example A4 and the like is represented by Formula (2-5). In addition, each of the ink jet inks of Examples A1 to A21 had a viscosity which is a value within a range of equal to or greater than 2.0 mPa·s and equal to or less than 30 mPa·s, and surface tension which is a value within a range of equal to or greater than 25 mN/m and equal to or less than 50 mN/m. For the viscosity, measurement was performed at 20° C. using a viscoelasticity tester MCR-300 (manufactured by Physica) by raising Shear Rate from 10 $s^{-1}$ to 1,000 $s^{-1}$ and reading a viscosity at the time of Shear Rate 200. In addition, for the surface tension, measurement was performed by the Wilhelmy method at 20° C. using a surface tension meter (CBVP-7, manufactured by Kyowa Interface Science Co., Ltd.).

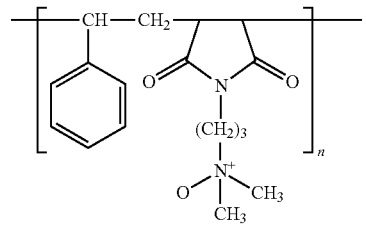

(2-5)

TABLE 6-1

| Abbreviation for substance A | Chemical formula | Condition in formula |
|---|---|---|
| A1 | Formula (4) | $R^7$ = H (average value of n is 60) |
| A2 | Formula (4) | $R^7$ = $SO_3H$ |
| A3 | Formula (1) (Formula (5)) | $R^1$ = $(CH_2)_3N^+(CH_3)_2O^-$ |
| A4 | Formula (2) | One of $R^2$ and $R^3$ is —OH, and the other is —N(CH$_2$)$_3$N(CH$_3$)$_2$O— |
| A5 | Formula (4) | $R^7$ = H (average value of n is 20) |

TABLE 6-2

| Abbreviation for anionic dispersing agent | Chemical formula or substance name | Condition in formula | Mw |
|---|---|---|---|
| B1 | Formula (3) | $R^6$ = $CH_3$ | 5,000 |
| B2 | Formula (3) | $R^6$ = $CH_2CH_3$ | 5,000 |
| B3 | Formula (3) | $R^6$ = $CH_2CH_2CH_3$ | 5,000 |
| B4 | Formula (3) | $R^6$ = $CH_2CH_2CH_2CH_3$ | 5,000 |
| B5 | Sodium salt of naphthalene sulfonic acid formalin condensate | — | 5,000 |
| B6 | Lignin sulfonic acid | — | 5,000 |

TABLE 6-3

| | Blending amount [parts by mass] | | | | | | | | | | | | | | | | | | |
|---|---|---|---|---|---|---|---|---|---|---|---|---|---|---|---|---|---|---|---|
| | Disperse dye | | | Substance A | | | | | Anionic dispersing agent | | | | | | Another component | | Pure | | | |
| | DB359 | DB148 | DB270 | A1 | A2 | A3 | A4 | A5 | B1 | B2 | B3 | B4 | B5 | B6 | A1' | B1' | water | XA/XD | XB/XD | XA/XB |
| Example A6-1 | 15 | 0 | 0 | 1.5 | 0 | 0 | 0 | 0 | 15 | 0 | 0 | 0 | 0 | 0 | 0 | 0 | 68.5 | 0.10 | 1.00 | 0.10 |
| Example A6-2 | 15 | 0 | 0 | 1.5 | 0 | 0 | 0 | 0 | 15 | 0 | 0 | 0 | 0 | 0 | 0 | 0 | 68.5 | 0.10 | 1.00 | 0.10 |
| Example A6-3 | 15 | 0 | 0 | 0 | 3 | 0 | 0 | 0 | 15 | 0 | 0 | 0 | 0 | 0 | 0 | 0 | 67 | 0.20 | 1.00 | 0.20 |
| Example A6-4 | 15 | 0 | 0 | 0 | 0 | 2 | 0 | 0 | 15 | 0 | 0 | 0 | 0 | 0 | 0 | 0 | 68 | 0.13 | 1.00 | 0.13 |
| Example A6-5 | 15 | 0 | 0 | 0 | 0 | 0 | 3 | 0 | 0 | 15 | 0 | 0 | 0 | 0 | 0 | 0 | 67 | 0.20 | 1.00 | 0.20 |

TABLE 6-3-continued

| | Blending amount [parts by mass] | | | | | | | | | | | | | | | | | | | |
|---|---|---|---|---|---|---|---|---|---|---|---|---|---|---|---|---|---|---|---|---|
| | Disperse dye | | | Substance A | | | | | Anionic dispersing agent | | | | | | Another component | | Pure | | | |
| | DB359 | DB148 | DB270 | A1 | A2 | A3 | A4 | A5 | B1 | B2 | B3 | B4 | B5 | B6 | A1' | B1' | water | XA/XD | XB/XD | XA/XB |
| Example A6-6 | 30 | 0 | 0 | 0 | 4 | 0 | 0 | 0 | 0 | 30 | 0 | 0 | 0 | 0 | 0 | 0 | 36 | 0.13 | 1.00 | 0.13 |
| Example A6-7 | 30 | 0 | 0 | 0 | 4 | 0 | 0 | 0 | 0 | 30 | 0 | 0 | 0 | 0 | 0 | 0 | 36 | 0.13 | 1.00 | 0.13 |
| Example A6-8 | 15 | 0 | 0 | 5 | 0 | 0 | 0 | 0 | 0 | 15 | 0 | 0 | 0 | 0 | 0 | 0 | 65 | 0.33 | 1.00 | 0.33 |
| Example A6-9 | 15 | 0 | 0 | 0 | 0 | 1.75 | 0 | 0 | 15 | 0 | 0 | 0 | 0 | 0 | 0 | 0 | 68.25 | 0.12 | 1.00 | 0.12 |
| Example A6-10 | 15 | 0 | 0 | 0 | 0 | 2 | 0 | 0 | 15 | 0 | 0 | 0 | 0 | 0 | 0 | 0 | 68 | 0.13 | 1.00 | 0.13 |
| Example A6-11 | 15 | 0 | 0 | 0 | 0 | 0 | 4 | 0 | 0 | 0 | 0 | 8 | 0 | 0 | 0 | 0 | 73 | 0.27 | 0.53 | 0.50 |
| Example A6-12 | 20 | 0 | 0 | 0 | 0 | 0 | 0 | 1.5 | 0 | 0 | 12 | 0 | 0 | 0 | 0 | 0 | 66.5 | 0.08 | 0.60 | 0.13 |
| Example A6-13 | 20 | 0 | 0 | 0 | 0 | 0 | 0 | 1.5 | 0 | 0 | 12 | 0 | 0 | 0 | 0 | 0 | 66.5 | 0.08 | 0.60 | 0.13 |
| Example A6-14 | 15 | 0 | 0 | 0 | 5 | 0 | 0 | 0 | 0 | 0 | 0 | 8 | 0 | 0 | 0 | 0 | 72 | 0.33 | 0.53 | 0.63 |

TABLE 6-4

| | Blending amount [parts by mass] | | | | | | | | | | | | | | | | | | | |
|---|---|---|---|---|---|---|---|---|---|---|---|---|---|---|---|---|---|---|---|---|
| | Disperse dye | | | Substance A | | | | | Anionic dispersing agent | | | | | | Another component | | Pure | | | |
| | DB359 | DB148 | DB270 | A1 | A2 | A3 | A4 | A5 | B1 | B2 | B3 | B4 | B5 | B6 | A1' | B1' | water | XA/XD | XB/XD | XA/XB |
| Example A6-15 | 15 | 0 | 0 | 4 | 0 | 0 | 0 | 0 | 0 | 0 | 0 | 10 | 0 | 0 | 0 | 0 | 71 | 0.27 | 0.67 | 0.40 |
| Example A6-16 | 15 | 0 | 0 | 0 | 0 | 0.8 | 0 | 0 | 10 | 0 | 0 | 0 | 0 | 0 | 0 | 0 | 74.2 | 0.05 | 0.67 | 0.08 |
| Example A6-17 | 15 | 0 | 0 | 0 | 0 | 0 | 0 | 8 | 0 | 10 | 0 | 0 | 0 | 0 | 0 | 0 | 67 | 0.53 | 0.67 | 0.80 |
| Example A6-18 | 15 | 0 | 0 | 4 | 0 | 0 | 0 | 0 | 0 | 0 | 0 | 0 | 10 | 0 | 0 | 0 | 71 | 0.27 | 0.67 | 0.40 |
| Example A6-19 | 15 | 0 | 0 | 0 | 2 | 0 | 0 | 0 | 0 | 0 | 0 | 0 | 0 | 10 | 0 | 0 | 73 | 0.13 | 0.67 | 0.20 |
| Example A6-20 | 15 | 0 | 0 | 0 | 5 | 0 | 0 | 0 | 0 | 15 | 0 | 0 | 0 | 0 | 0 | 0 | 65 | 0.33 | 1.00 | 0.33 |
| Example A6-21 | 35 | 0 | 0 | 0 | 4.5 | 0 | 0 | 0 | 0 | 35 | 0 | 0 | 0 | 0 | 0 | 0 | 25.5 | 0.13 | 1.00 | 0.13 |
| Comparative Example A6-1 | 0 | 15 | 0 | 1.5 | 0 | 0 | 0 | 0 | 15 | 0 | 0 | 0 | 0 | 0 | 0 | 0 | 68.5 | — | — | 0.10 |
| Comparative Example A6-2 | 0 | 0 | 15 | 1.5 | 0 | 0 | 0 | 0 | 15 | 0 | 0 | 0 | 0 | 0 | 0 | 0 | 68.5 | — | — | 0.10 |
| Comparative Example A6-3 | 15 | 0 | 0 | 0 | 0 | 0 | 0 | 0 | 15 | 0 | 0 | 0 | 0 | 0 | 0 | 0 | 70 | 0 | 1.00 | 0 |
| Comparative Example A6-4 | 15 | 0 | 0 | 0 | 0 | 0 | 0 | 0 | 0 | 15 | 0 | 0 | 0 | 0 | 1.5 | 0 | 68.5 | 0 | 1.00 | 0 |
| Comparative Example A6-5 | 15 | 0 | 0 | 1.5 | 0 | 0 | 0 | 0 | 0 | 0 | 0 | 0 | 0 | 0 | 0 | 15 | 68.5 | 0.10 | 0 | — |
| Comparative Example A6-6 | 15 | 0 | 0 | 1.5 | 0 | 0 | 0 | 0 | 0 | 0 | 0 | 0 | 0 | 0 | 0 | 0 | 83.5 | 0.10 | 0 | — |

[2] Evaluation on Stock Solution for Producing Ink Jet Ink
[2-1] Storage Stability (Change in Particle Diameter)

For each of the aqueous ink jet compositions (stock solutions for producing ink jet inks) of the respective Examples and Comparative Examples, an average particle diameter of the disperse dye immediately after production and an average particle diameter of the disperse dye after being placed in a predetermined container and left to stand for one week in an environment of 60° C. were obtained. From these values, a variation rate of the average particle diameter of the disperse dye after being left to stand for one week in an environment of 60° C. with respect to the average particle diameter of the disperse dye immediately after production was obtained, and evaluation was performed according to the following criteria. For measurement of the average particle diameter, Microtrac UPA (manufactured by Nikkiso CO., LTD.) was used. It can be said that a larger variation rate of the average particle diameter indicates lower storage stability.

A: Variation rate of average particle diameter is less than 5%.
B: Variation rate of average particle diameter is equal to or greater than 5% and less than 10%.
C: Variation rate of average particle diameter is equal to or greater than 10% and less than 15%.
D: Variation rate of average particle diameter is equal to or greater than 15% and less than 20%.
E: Variation rate of average particle diameter is equal to or greater than 20%.

These results are summarized in Table 6-5.

TABLE 6-5

| | Storage stability |
|---|---|
| Example A6-1 | A |
| Example A6-2 | A |
| Example A6-3 | A |
| Example A6-4 | A |
| Example A6-5 | B |
| Example A6-6 | B |
| Example A6-7 | B |
| Example A6-8 | B |
| Example A6-9 | A |
| Example A6-10 | A |
| Example A6-11 | B |
| Example A6-12 | B |
| Example A6-13 | B |
| Example A6-14 | B |

TABLE 6-5-continued

| | Storage stability |
|---|---|
| Example A6-15 | B |
| Example A6-16 | C |
| Example A6-17 | C |
| Example A6-18 | B |
| Example A6-19 | B |
| Example A6-20 | B |
| Example A6-21 | D |
| Comparative Example A6-1 | E |
| Comparative Example A6-2 | E |
| Comparative Example A6-3 | E |
| Comparative Example A6-4 | E |
| Comparative Example A6-5 | E |
| Comparative Example A6-6 | E |

As is apparent from Table 6-5, excellent results were obtained in the invention. On the contrary, satisfactory results were not obtained in the Comparative Examples.

[3] Preparation of Ink Jet Ink (Aqueous Ink Jet Composition)

Example B6-1

The stock solution for producing an ink jet ink prepared in Example A6-1, glycerin, 2-pyrrolidone, propylene glycol, BYK 348 (manufactured by BYK Chemie Japan) as a silicone-based surfactant, and pure water were mixed at a proportion as shown in Table 6-6, and the mixture was stirred with High Shear Mixer (manufactured by Silverson Machines, Inc.) at 3,000 rpm to produce an ink jet ink as an aqueous ink jet composition.

An average particle diameter of C.I. Disperse Blue 359 in the ink jet ink was 150 nm.

Examples B6-2 to B6-19

Ink jet inks as aqueous ink jet compositions were produced in the same manner as in Example B6-1, except that types of the stock solutions for producing ink jet inks were as shown in Table 6-6 and blending proportions of the respective components were as shown in Table 6-6.

Comparative Examples B6-1 to B6-6

Ink jet inks as aqueous ink jet compositions were produced in the same manner as in Example B6-1, except that types of the stock solutions for producing ink jet inks were as shown in Table 6-6 and blending proportions of the respective components were as shown in Table 6-6.

Conditions for the aqueous ink jet compositions (ink jet inks) of the respective Examples and Comparative Examples are summarized in Table 6-6. In the tables, glycerin is indicated as "Gly", 2-pyrrolidone is indicated as "2-Py", propylene glycol is indicated as "PG", BYK 348 (manufactured by BYK Chemie Japan) as a silicone-based surfactant is indicated as "BYK 348", and Olfine EXP4300 (manufactured by Nissin Chemical Industry Co., Ltd.) as an acetylene-based surfactant is indicated as "EXP 4300". In addition, each of the ink jet inks of Examples B1 to B19 had a viscosity which is a value within a range of equal to or greater than 2.0 mPa·s and equal to or less than 5.0 mPa·s, and surface tension which is a value within a range of equal to or greater than 20 mN/m and equal to or less than 35 mN/m. For the viscosity, measurement was performed at 20° C. using a viscoelasticity tester MCR-300 (manufactured by Physica) by raising Shear Rate from 10 s$^{-1}$ to 1,000 s$^{-1}$ and reading a viscosity at the time of Shear Rate 200. In addition, for the surface tension, measurement was performed by the Wilhelmy method at 20° C. using a surface tension meter (CBVP-7, manufactured by Kyowa Interface Science Co., Ltd.).

TABLE 6-6

| | Stock solution | | Solvent other than water | | | Surfactant | | Pure water |
|---|---|---|---|---|---|---|---|---|
| | Type | | Gly | 2-Py | PG | BYK 348 | EXP 4300 | |
| Example B6-1 | Example A6-1 | 50.0 | 10.0 | 5.0 | 5.0 | 1.0 | 0 | 29.0 |
| Example B6-2 | Example A6-1 | 5.0 | 20.0 | 5.0 | 5.0 | 1.0 | 0 | 64.0 |
| Example B6-3 | Example A6-2 | 50.0 | 10.0 | 5.0 | 5.0 | 1.0 | 0 | 29.0 |
| Example B6-4 | Example A6-3 | 50.0 | 10.0 | 5.0 | 5.0 | 1.0 | 0 | 29.0 |
| Example B6-5 | Example A6-4 | 50.0 | 10.0 | 5.0 | 5.0 | 0 | 1.0 | 29.0 |
| Example B6-6 | Example A6-5 | 50.0 | 10.0 | 5.0 | 5.0 | 1.0 | 0 | 29.0 |
| Example B6-7 | Example A6-6 | 2.5 | 20.0 | 5.0 | 5.0 | 0 | 1.0 | 66.5 |
| Example B6-8 | Example A6-7 | 50.0 | 10.0 | 5.0 | 5.0 | 1.0 | 0 | 29.0 |
| Example B6-9 | Example A6-8 | 50.0 | 10.0 | 5.0 | 5.0 | 1.0 | 0 | 29.0 |
| Example B6-10 | Example A6-9 | 50.0 | 10.0 | 5.0 | 5.0 | 0 | 1.0 | 29.0 |
| Example B6-11 | Example A6-10 | 2.5 | 20.0 | 5.0 | 5.0 | 1.0 | 0 | 66.5 |
| Example B6-12 | Example A6-11 | 50.0 | 10.0 | 5.0 | 5.0 | 1.0 | 0 | 29.0 |
| Example B6-13 | Example A6-12 | 50.0 | 10.0 | 5.0 | 5.0 | 1.0 | 0 | 29.0 |
| Example B6-14 | Example A6-13 | 50.0 | 10.0 | 5.0 | 5.0 | 1.0 | 0 | 29.0 |
| Example B6-15 | Example A6-14 | 50.0 | 10.0 | 5.0 | 5.0 | 0 | 1.0 | 29.0 |
| Example B6-16 | Example A6-15 | 50.0 | 10.0 | 5.0 | 5.0 | 1.0 | 0 | 29.0 |
| Example B6-17 | Example A6-16 | 50.0 | 10.0 | 5.0 | 5.0 | 0 | 1.0 | 29.0 |
| Example B6-18 | Example A6-19 | 2.5 | 20.0 | 5.0 | 5.0 | 0 | 1.0 | 66.5 |
| Example B6-19 | Example A6-20 | 2.5 | 20.0 | 5.0 | 5.0 | 0 | 1.0 | 66.5 |
| Comparative Example B6-1 | Comparative Example A6-1 | 50.0 | 10.0 | 5.0 | 5.0 | 1.0 | 0 | 29.0 |
| Comparative Example B6-2 | Comparative Example A6-2 | 50.0 | 10.0 | 5.0 | 5.0 | 1.0 | 0 | 29.0 |
| Comparative Example B6-3 | Comparative Example A6-3 | 50.0 | 10.0 | 5.0 | 5.0 | 1.0 | 0 | 29.0 |
| Comparative Example B6-4 | Comparative Example A6-4 | 50.0 | 10.0 | 5.0 | 5.0 | 1.0 | 0 | 29.0 |

TABLE 6-6-continued

| | | Blending amount [parts by mass] | | | | | |
|---|---|---|---|---|---|---|---|
| | Stock solution | | Solvent other than water | | | Surfactant | Pure |
| | Type | | Gly | 2-Py | PG | BYK 348 EXP 4300 | water |
| Comparative Example B6-5 | Comparative Example A6-5 | 50.0 | 10.0 | 5.0 | 5.0 | 1.0    0 | 29.0 |
| Comparative Example B6-6 | Comparative Example A6-6 | 50.0 | 10.0 | 5.0 | 5.0 | 1.0    0 | 29.0 |

[4] Evaluation on Ink Jet Ink

[4-1] Storage Stability (Change in Particle Diameter)

For each of the aqueous ink jet compositions (ink jet inks) of the respective Examples and Comparative Examples, an average particle diameter of the disperse dye immediately after production and an average particle diameter of the disperse dye after being placed in a predetermined ink-holding container and left to stand for one week in an environment of 60° C. were obtained. From these values, a variation rate of the average particle diameter of the disperse dye after being left to stand for one week in an environment of 60° C. with respect to the average particle diameter of the disperse dye immediately after production was obtained, and evaluation was performed according to the following criteria. For measurement of the average particle diameter, Microtrac UPA (manufactured by Nikkiso Co., Ltd.) was used. It can be said that a larger variation rate of the average particle diameter indicates lower storage stability and a larger adverse effect on discharge stability.

A: Variation rate of average particle diameter is less than 5%.

B: Variation rate of average particle diameter is equal to or greater than 5% and less than 10%.

C: Variation rate of average particle diameter is equal to or greater than 10% and less than 15%.

D: Variation rate of average particle diameter is equal to or greater than 15% and less than 20/a %.

E: Variation rate of average particle diameter is equal to or greater than 20%.

[4-2] Discharge Stability by Ink Jet Method

A predetermined ink-holding container was filled with each of the aqueous ink jet compositions (ink jet inks) of the respective Examples and Comparative Examples and was left to stand for 5 days in an environment of 60° C.

Thereafter, the holding container was mounted on a recording apparatus PX-H 6000 (manufactured by Seiko Epson Corporation), and the ink jet ink was discharged so that a solid pattern was adhered on TRANSJET Classic (manufactured by Cham Paper), which is an intermediate transfer medium, at a recording resolution of 1440×720 dpi. An operating environment of the recording apparatus (printer) was set at 40° C. and 20 RH %.

The number of times of nozzle omission at the time of recording 30 solid patterns on the intermediate transfer medium was examined, and evaluation was performed according to the following criteria.

A: Number of times of nozzle omission is 0.

B: Number of times of nozzle omission is equal to or greater than 1 and equal to or less than 9.

C: Number of times of nozzle omission is equal to or greater than 10 and equal to or less than 19.

D: Number of times of nozzle omission is equal to or greater than 20 and equal to or less than 29.

E: Number of times of nozzle omission is equal to or greater than 30.

[4-3] Clogging Recoverability

A predetermined ink-holding container was filled with each of the aqueous ink jet compositions (ink jet inks) of the respective Examples and Comparative Examples, and the holding container was mounted on a recording apparatus PX-H 6000 (manufactured by Seiko Epson Corporation).

After confirming that discharge normally occurs in all nozzles, the power of the recording apparatus was turned off in a normal state, and was left to stand for 1 month under an environment of 40° C.

Thereafter, the number of times taken to reach normal discharge by a suction-induced recovery operation was obtained, and evaluation was performed according to the following criteria.

A: Normalization is achieved with 1 to 3 recovery operations.

B: Normalization is achieved with 4 to 6 recovery operations.

C: Normalization is achieved with 7 to 9 recovery operations.

D: Normalization is achieved after 9 recovery operations, being left to stand for 12 hours at room temperature, and then 1 to 3 further recovery operations.

E: Normalization is not achieved after 9 recovery operations, being left to stand for 12 hours at room temperature, and then 3 further recovery operations.

[4-4] Color Developing Property (OD Value)

An adhesion side of the aqueous ink jet composition on the thirtieth intermediate transfer medium to which the ink jet ink had been adhered in [4-3] was brought into close contact with cloth (polyester 100%, Amina, manufactured by Toray Industries, Inc.) which is a white recording medium. In this state, sublimation transfer was carried out by performing heating using a heat press machine (TP-608M, manufactured by Taiyo Seiki Co., Ltd.) at a condition of 180° C. and 60 seconds, so that each recorded matter was obtained.

For each recorded matter obtained, evaluation on color developing property was performed. Specifically, for each recorded matter obtained, an OD value was measured using a colorimeter (Gretag Macbeth Spectrolino, manufactured by X-Rite), and evaluation was performed according to the following criteria.

A: OD value is equal to or greater than 1.50.

B: OD value is equal to or greater than 1.45 and less than 1.50.

C: OD value is equal to or greater than 1.40 and less than 1.45.

D: OD value is equal to or greater than 1.35 and less than 1.40.

E: OD value is less than 1.35.

These results are summarized in Table 6-7.

TABLE 6-7

| | Storage stability | Discharge stability | Clogging recoverability | Color developing property |
|---|---|---|---|---|
| Example B6-1 | A | A | A | A |
| Example B6-2 | A | A | A | E |
| Example B6-3 | A | A | A | A |
| Example B6-4 | A | A | A | A |
| Example B6-5 | B | A | B | A |
| Example B6-6 | B | B | B | A |
| Example B6-7 | A | A | A | E |
| Example B6-8 | A | B | A | A |
| Example B6-9 | A | B | A | A |
| Example B6-10 | B | B | B | A |
| Example B6-11 | B | A | B | E |
| Example B6-12 | B | B | B | A |
| Example B6-13 | B | B | B | A |
| Example B6-14 | B | B | C | A |
| Example B6-15 | C | B | B | A |
| Example B6-16 | C | B | B | A |
| Example B6-17 | A | C | B | A |
| Example B6-18 | C | A | B | E |
| Example B6-19 | C | A | B | E |
| Comparative Example B6-1 | E | E | E | E |
| Comparative Example B6-2 | E | E | E | E |
| Comparative Example B6-3 | E | E | E | A |
| Comparative Example B6-4 | E | E | E | A |
| Comparative Example B6-5 | E | E | E | A |
| Comparative Example B6-6 | E | E | E | A |

As is apparent from Table 6-7, excellent results were obtained in the invention. On the contrary, satisfactory results were not obtained in the Comparative Examples.

The entire disclosure of Japanese Patent Application Nos.: 2018-062961, 2018-062962, 2018-062963, 2018-062964, 2018-062965, 2018-062966, all filed Mar. 28, 2018 and 2018-221458, filed Nov. 27, 2018 are expressly incorporated by reference herein.

What is claimed is:

1. An aqueous ink jet composition, comprising:
   at least one disperse dye selected from the group consisting of C.I. Disperse Yellow 54, C.I. Disperse Red 60, and C.I. Disperse Blue 359;
   a substance A which is at least one type of compound selected from the group consisting of a compound represented by the following Formula (2-2), an ethylene oxide adduct of tristyrylphenol, and a derivative of the ethylene oxide adduct of tristyrylphenol:

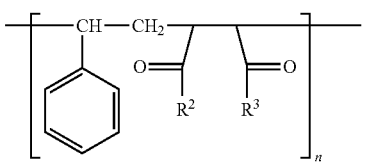

(2-2)

where one of $R^2$ and $R^3$ is —OH, the other is —$NR^4R^5$, where $R^4$ and $R^5$ are each independently a hydrogen atom or a hydrocarbon group having 6 or less carbon atoms, and n is an integer of equal to or greater than 1; and
   an anionic dispersing agent,
   wherein a content of the substance A is in a range of 0.05% to 8.0%, by mass,
   a surface tension of the aqueous ink jet composition at 20° C. is in a range of 20 mN/m to 50 mN/m, and
   a variation rate of a viscosity of the aqueous ink jet composition after being left to stand for one week in an environment of 60° C. with respect to a viscosity of the aqueous ink jet composition immediately after production is less than 15%.

2. The aqueous ink jet composition according to claim 1, wherein the anionic dispersing agent is at least one of a compound represented by the following Formula (2-3), a sodium salt of a naphthalene sulfonic acid formalin condensate, and lignin sulfonic acid:

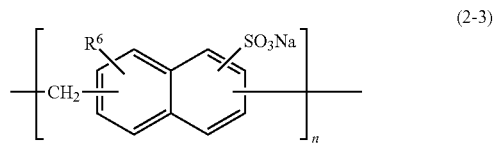

(2-3)

where $R^6$ is a hydrocarbon group having 4 or less carbon atoms, and n is an integer of equal to or greater than 1.

3. The aqueous ink jet composition according to claim 1, wherein when a content of the disperse dye is set as XD [% by mass] and a content of the substance A is set as XA [% by mass], a relationship of 0.002≤XA/XD≤1.5 is satisfied.

4. The aqueous ink jet composition according to claim 1, wherein when a content of the disperse dye is set as XD [% by mass] and a content of the anionic dispersing agent is set as XB [% by mass], a relationship of 0.3≤XB/XD≤2.0 is satisfied.

5. The aqueous ink jet composition according to claim 1, wherein when a content of the substance A is set as XA [% by mass] and a content of the anionic dispersing agent is set as XB [% by mass], a relationship of 0.002≤XA/XB≤1.5 is satisfied.

6. The aqueous ink jet composition according to claim 1, wherein a content of the disperse dye is equal to or greater than 0.1% by mass and equal to or less than 30% by mass.

7. The aqueous ink jet composition according to claim 1, wherein a content of the anionic dispersing agent is equal to or greater than 0.1% by mass and equal to or less than 30% by mass.

8. The aqueous ink jet composition according to claim 1, wherein the anionic dispersing agent has a weight average molecular weight of equal to or greater than 1,000 and equal to or less than 20,000.

* * * * *